(12) United States Patent
Dabar

(10) Patent No.: US 11,660,164 B2
(45) Date of Patent: May 30, 2023

(54) ENDODONTIC INSTRUMENTS AND ROOT CANAL TREATMENT METHODS

(71) Applicant: Naji B Dabar, Zalka (LB)

(72) Inventor: Naji B Dabar, Zalka (LB)

(\*) Notice: Subject to any disclaimer, the term of this patent is extended or adjusted under 35 U.S.C. 154(b) by 891 days.

(21) Appl. No.: 16/368,446

(22) Filed: Mar. 28, 2019

(65) Prior Publication Data

US 2020/0085533 A1 Mar. 19, 2020

Related U.S. Application Data

(63) Continuation of application No. 14/946,716, filed on Nov. 19, 2015, now abandoned.

(51) Int. Cl.
*A61C 5/42* (2017.01)

(52) U.S. Cl.
CPC ..................... *A61C 5/42* (2017.02)

(58) Field of Classification Search
CPC .... A61C 5/42; A61C 5/44; A61C 5/46; A61C 5/48; A61C 5/50
See application file for complete search history.

(56) References Cited

U.S. PATENT DOCUMENTS

| | | | | |
|---|---|---|---|---|
| 1,022,838 | A * | 4/1912 | Funk ...................... | A61C 5/42 433/102 |
| 5,873,721 | A | 2/1999 | Willoughby | |
| 6,293,794 | B1 | 9/2001 | McSpadden | |
| 6,491,522 | B1 | 12/2002 | Jensen | |
| 7,125,254 | B2 | 10/2006 | Calvert | |
| 8,807,999 | B2 | 8/2014 | Kuo et al. | |
| 2002/0119418 | A1 | 8/2002 | Matsutani | |
| 2003/0044752 | A1* | 3/2003 | Fischer .................... | A61C 5/42 433/102 |
| 2003/0077553 | A1* | 4/2003 | Brock ...................... | A61C 5/42 433/102 |
| 2003/0211442 | A1* | 11/2003 | Abel ........................ | A61C 5/42 433/102 |
| 2004/0214135 | A1* | 10/2004 | Ruddle .................... | A61C 5/40 433/102 |

(Continued)

OTHER PUBLICATIONS

Peters, O.A., "Rotary Instrumentation: An Endodontic Perspective," American Association of Endodontists, 2008, American Association of Endodontists.

(Continued)

*Primary Examiner* — Nicholas D Lucchesi
*Assistant Examiner* — Hao D Mai
(74) *Attorney, Agent, or Firm* — Samuel A Kassatly

(57) ABSTRACT

Instruments and associated methods for performing endodontic treatment and that demand less time and fatigue onto the dentists and patients, while presenting the following accomplishments: debride the root canals in three dimensions and performing the optimal treatment; shape the root canals to facilitate the irrigation; these instruments are resistant to breakage and pressure while operating at high speed and torque; the instruments are capable of bypassing most obstacles, broken files, hypercalcification, curved roots canals, shoulders, and residual resistant pastes; and they present an alternative to arduous and expensive surgeries like endodontic or implant surgeries. As a result, they prevent fractures and procedural errors in making false canals or perforations of the root canals.

19 Claims, 49 Drawing Sheets

(56) References Cited

U.S. PATENT DOCUMENTS

2007/0015107 A1     1/2007   Mannschedel
2015/0044634 A1     2/2015   Lasner

OTHER PUBLICATIONS

"Endodontic files and reamers," 2015. Available online at: https://en.wikipedia.org/wiki/Endodontic_files_and_reamers.

Carrotte, P., "Endodontics: Part 5, Basic instruments and materials for root canal treatment," British Dental Journal 2004; 197:455-464.

De-Deus G. et al., "The self-adjusting file optimizes debridement quality in oval-shaped root canals," J Endod. May 2011;37(5):701-5.

Siqueira JF et al. "Ability of chemomechanical preparation with either rotary instruments or self-adjusting file to disinfect oval-shaped root canals," J Endod. Nov. 2010;36(11):1860-5.

Metzger Z., et al. "The self-adjusting file (SAF). Part 1: respecting the root canal anatomy—a new concept of endodontic files and its implementation," J Endod. Apr. 2010;36(4): 679-90.

Bahcall J.K. et al., "The causes, prevention, and clinical management of broken endodontic rotary files," Dent Today. Nov. 2005;24(11):74, 76, 78-80; quiz 80.

Gambarini G. et al., "Cyclic fatigue of instruments for endodontic glide path," Odontology, DOI 10.1007/s10266-013-0138-x, The Society of The Nippon Dental University 2013.

Yared G. et al., "Canal preparation using only one Ni—Ti rotary instrument: preliminary observations," International Endodontic Journal 2007—doi:10.1111/j.1365-2591.2007.0135.

Dabar N., Decision to Grant, European Patent for Application/Patent No. 16199605.3-1126/3170471, dated Jan. 21, 2021.

\* cited by examiner

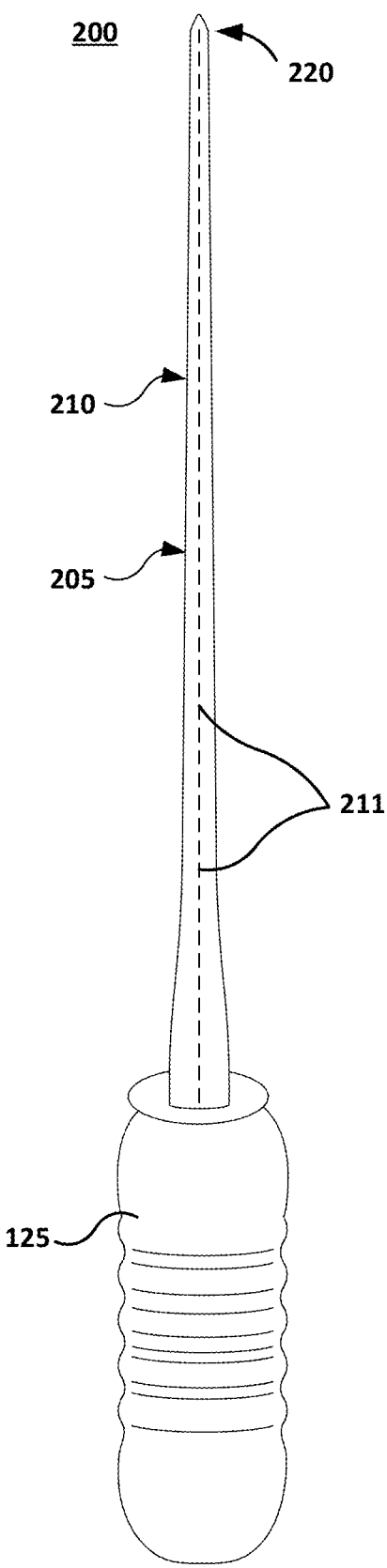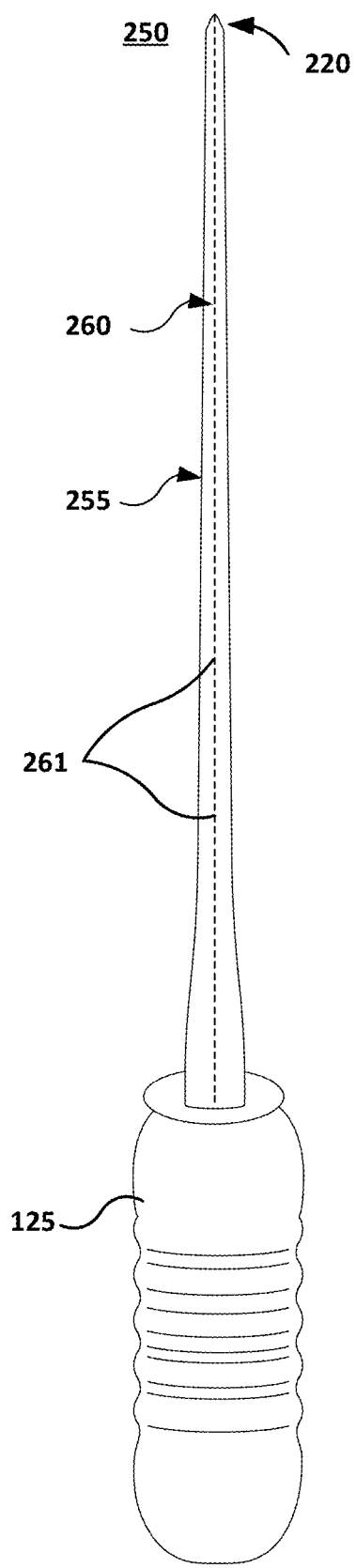
FIG. 2A  FIG. 2B

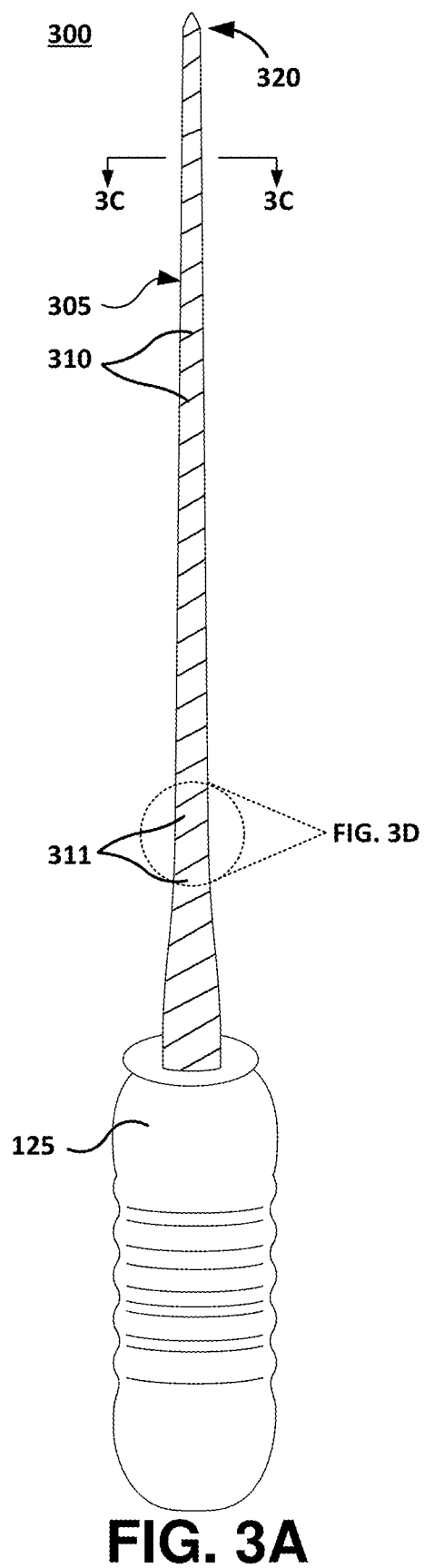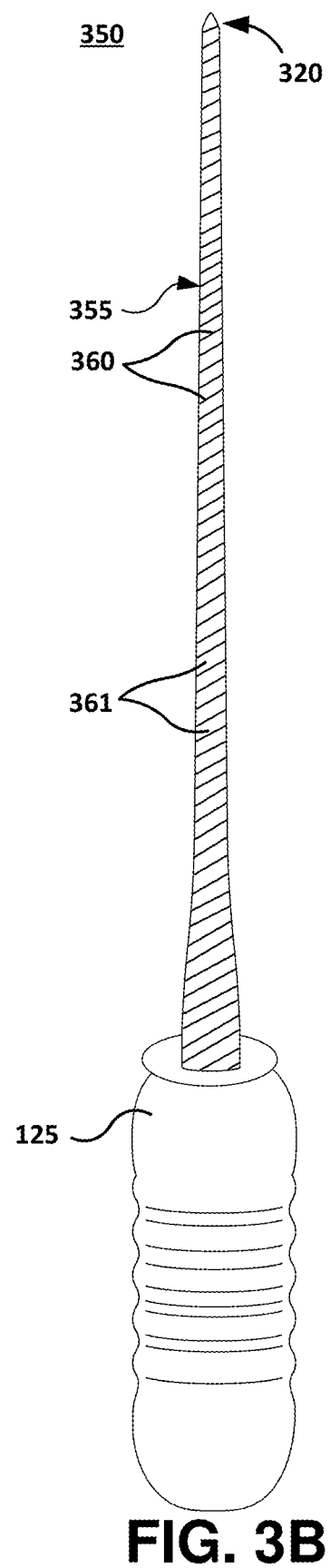
FIG. 3A
FIG. 3B

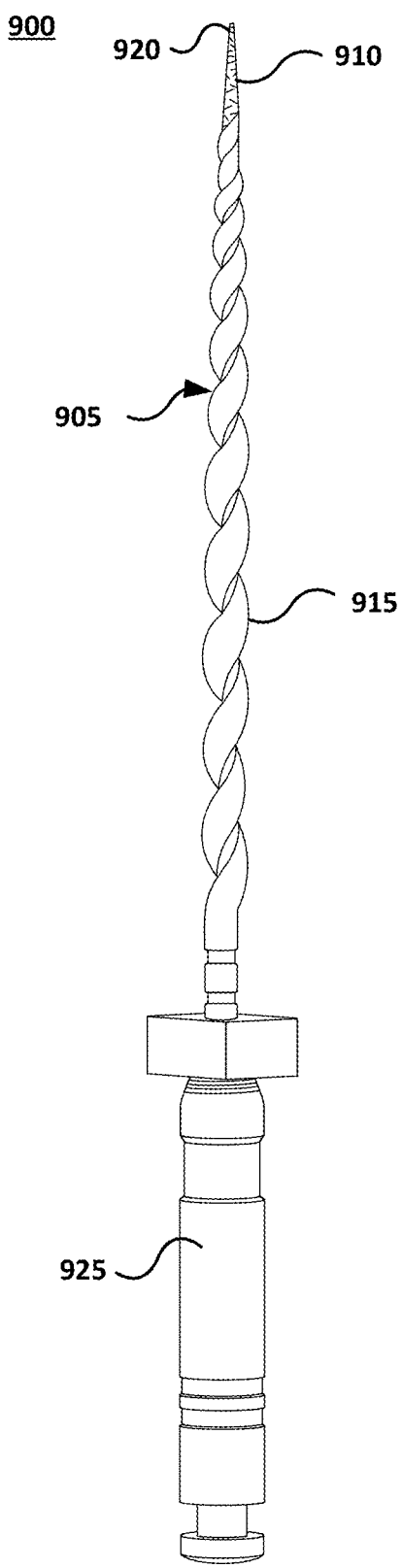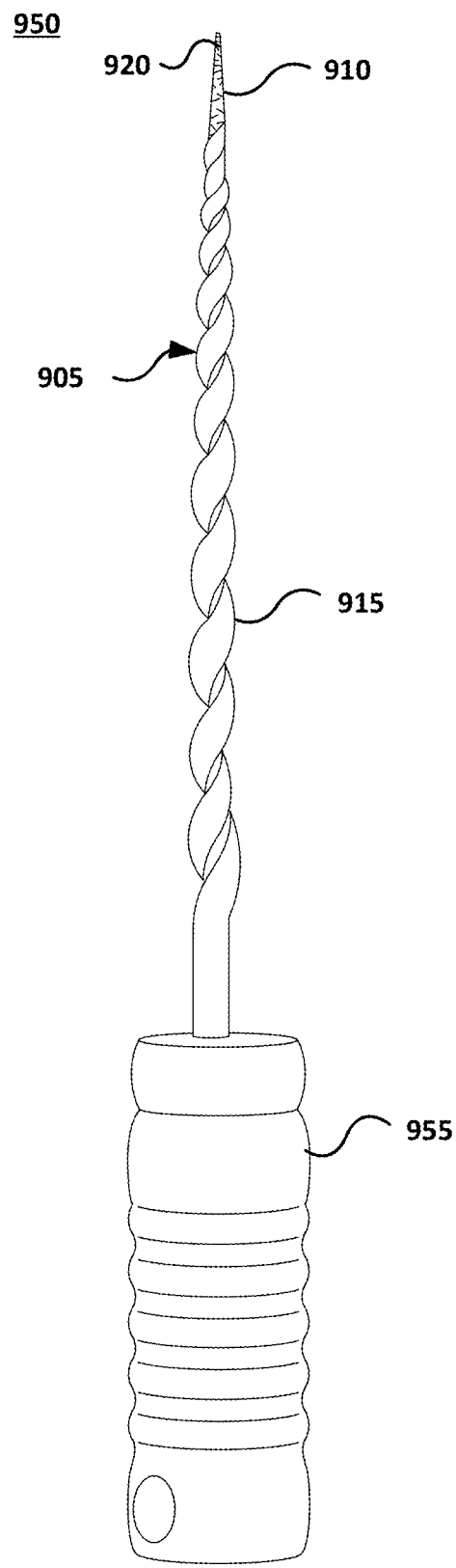
FIG. 9A                    FIG. 9B

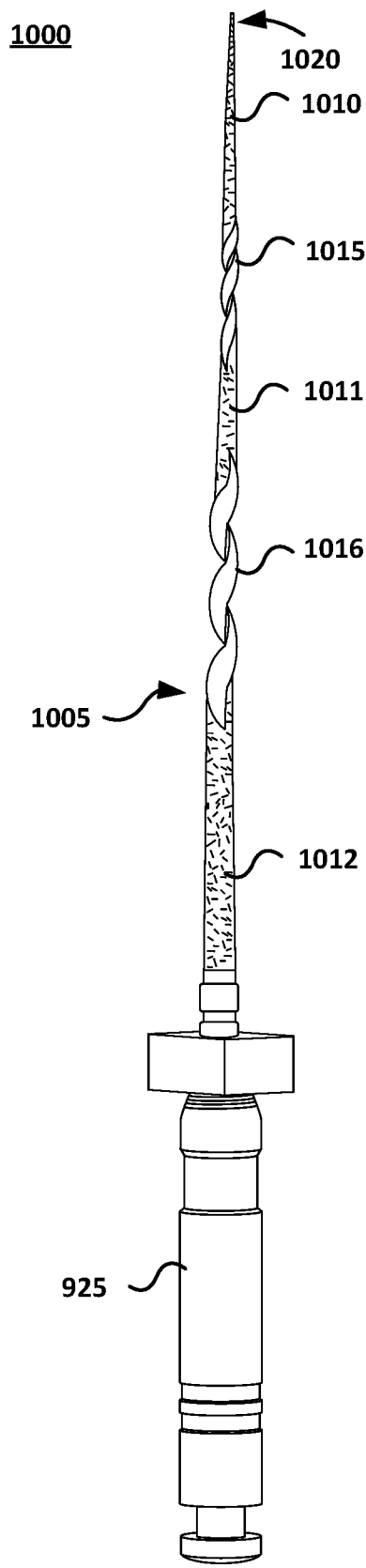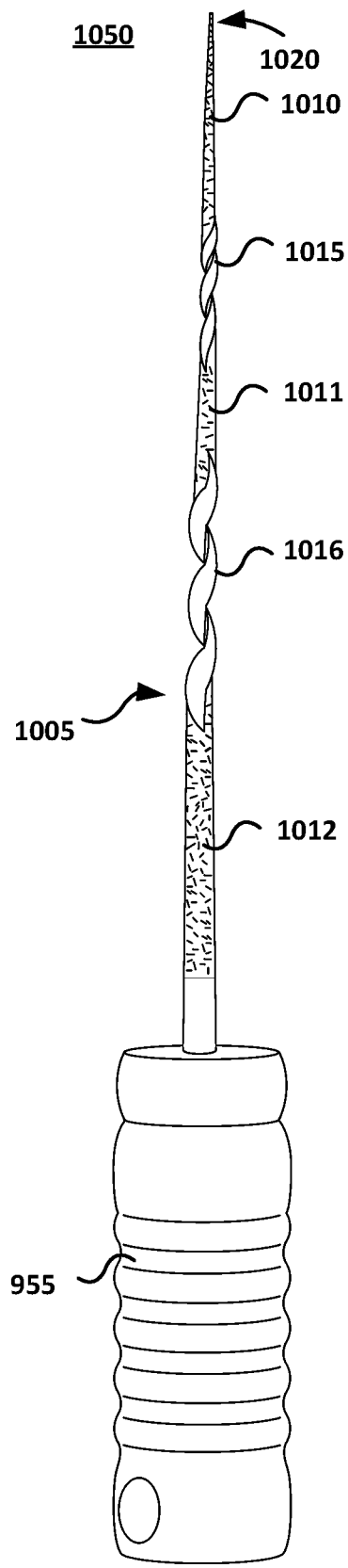
FIG. 10A  FIG. 10B

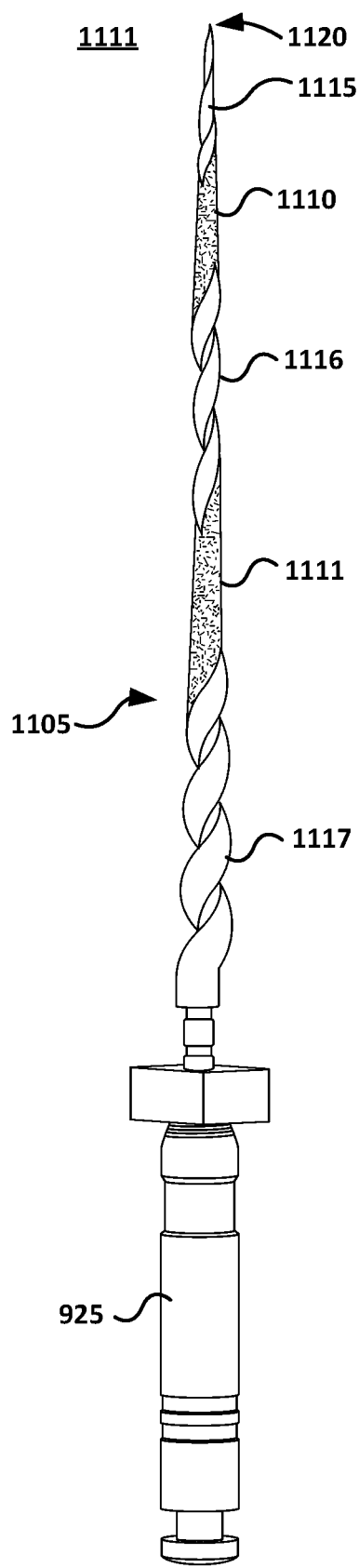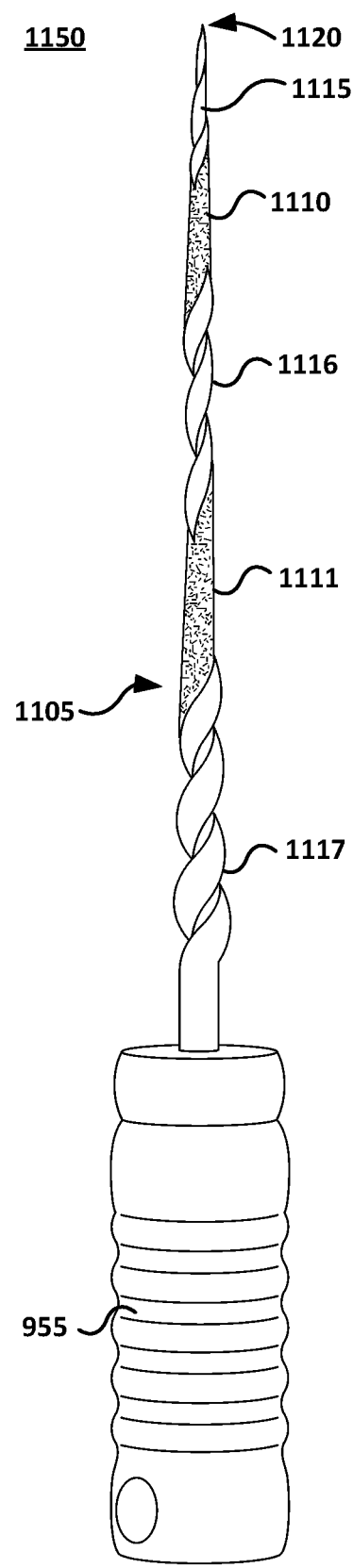
FIG. 11A  FIG. 11B

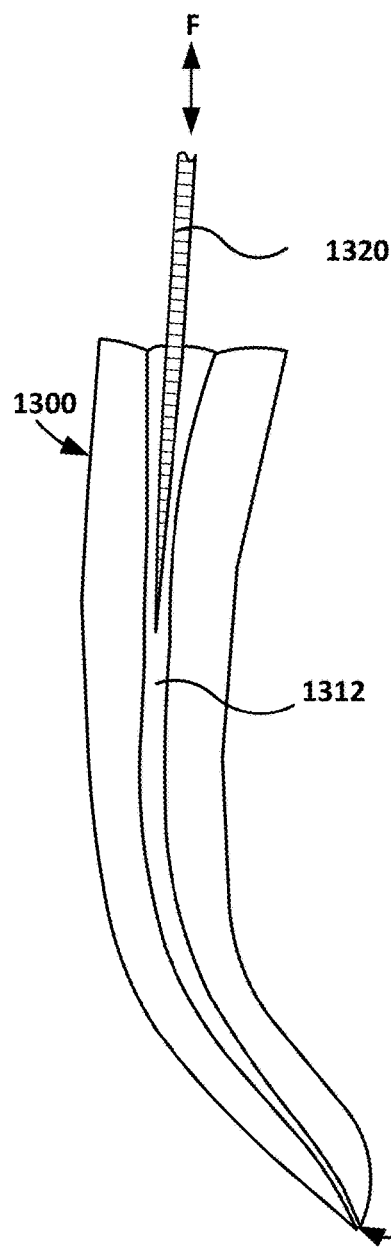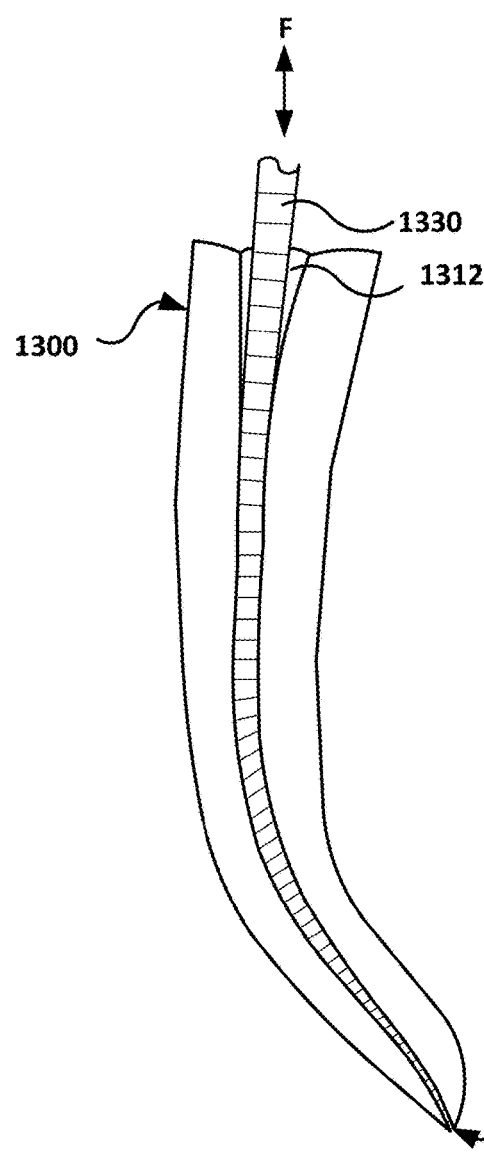
FIG. 13A  FIG. 13B

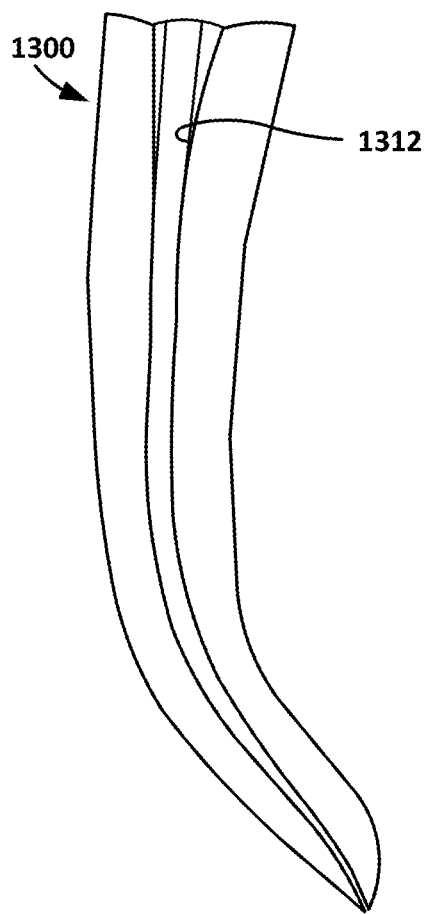
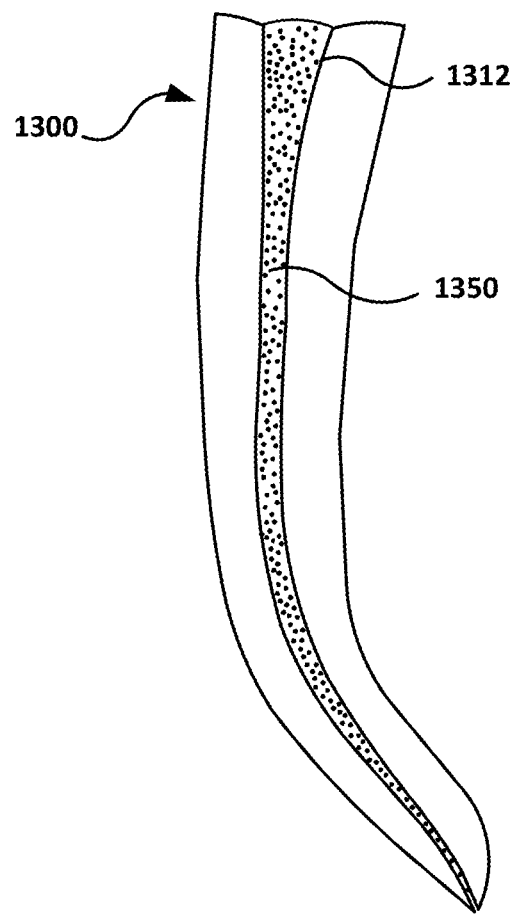
FIG. 13C   FIG. 13D

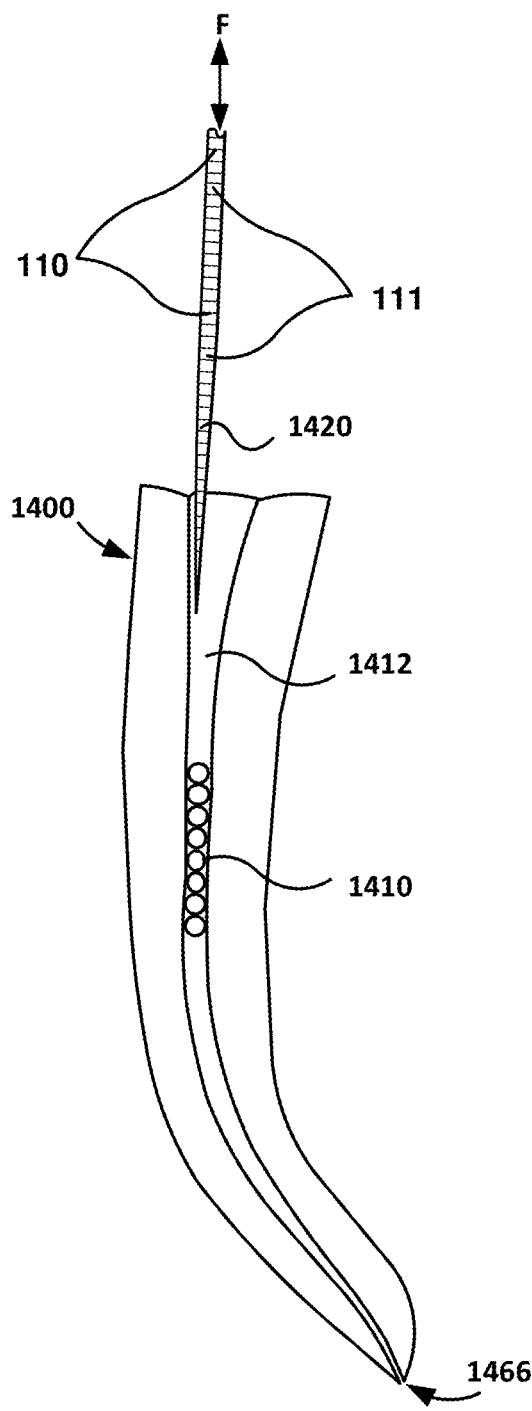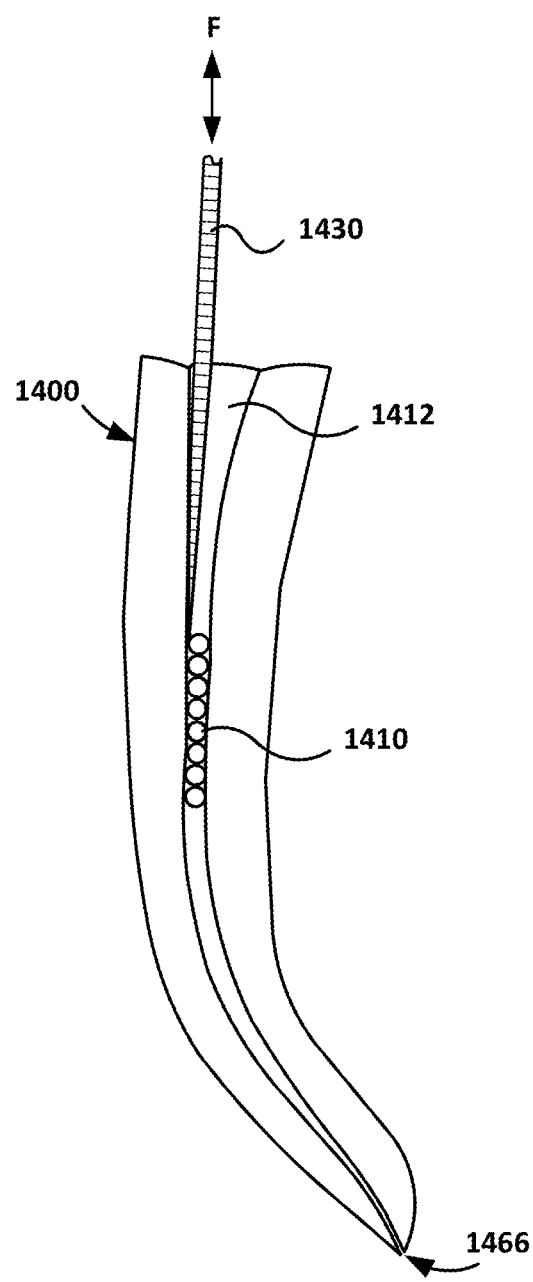
FIG. 14A  FIG. 14B

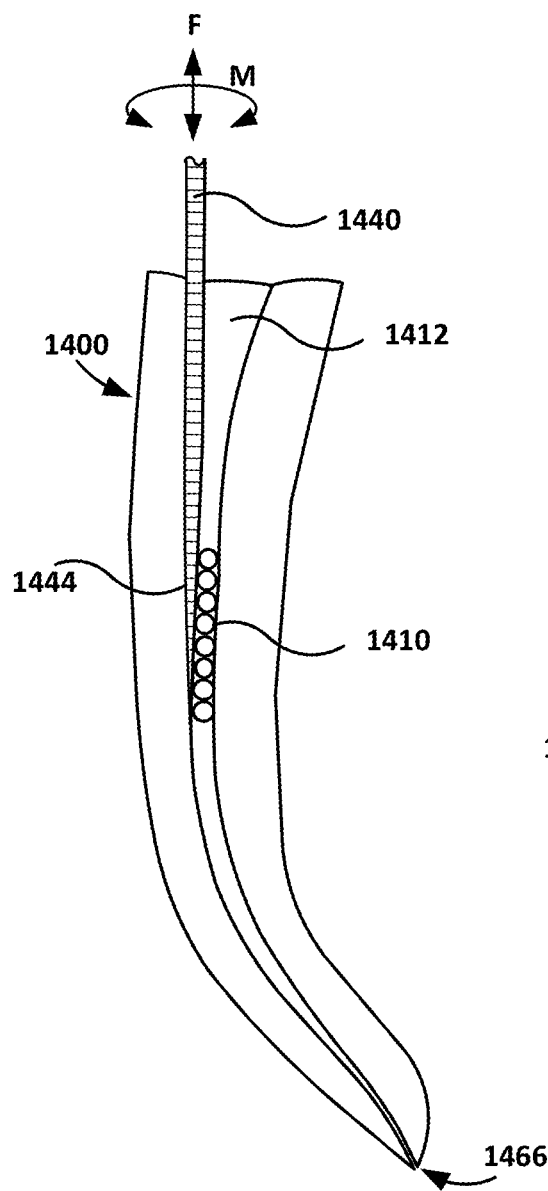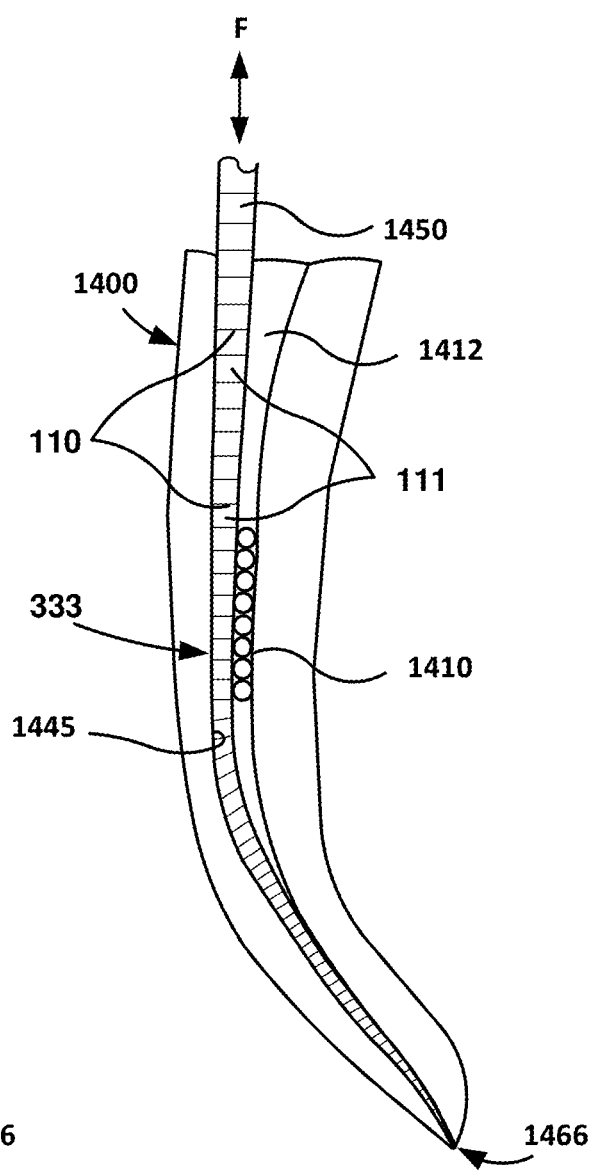
FIG. 14C  FIG. 14D

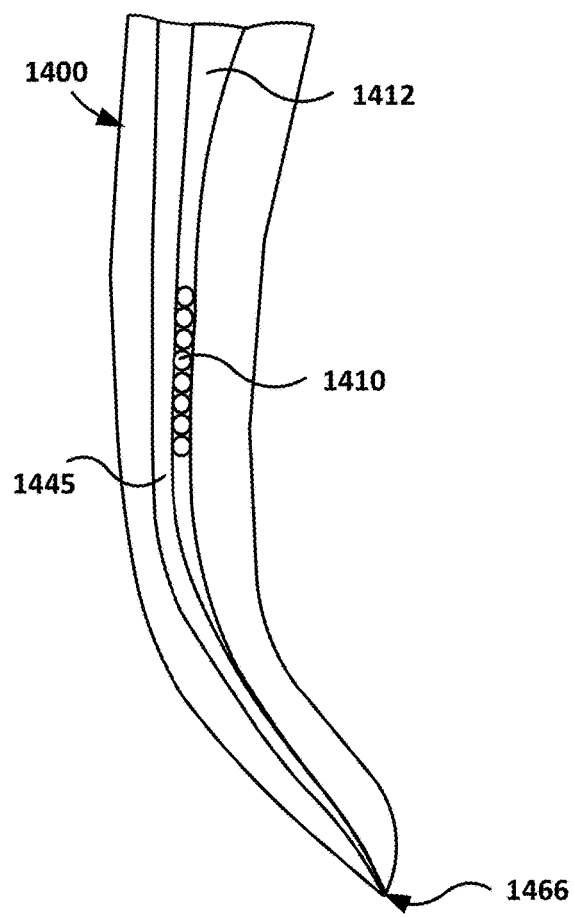 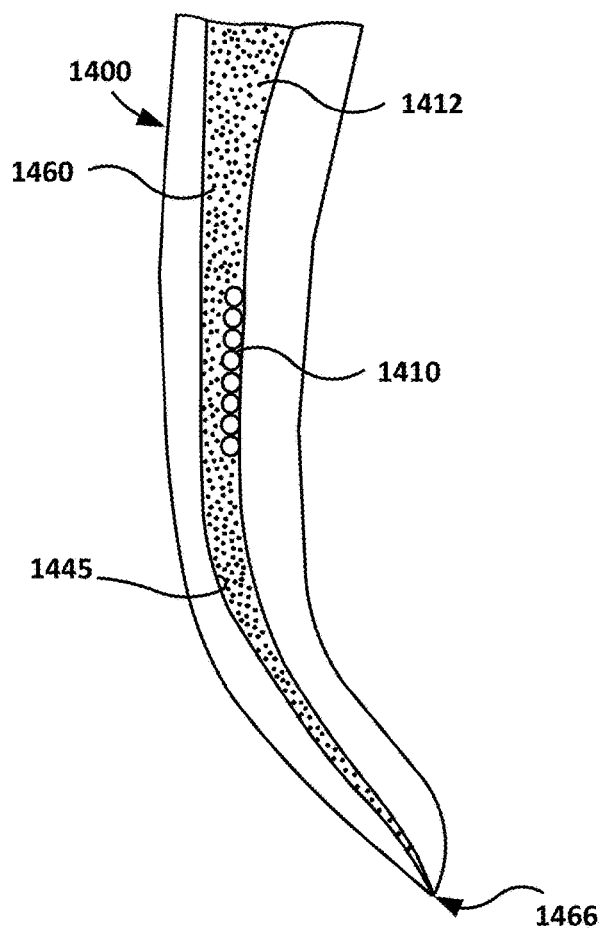
FIG. 14E  FIG. 14F

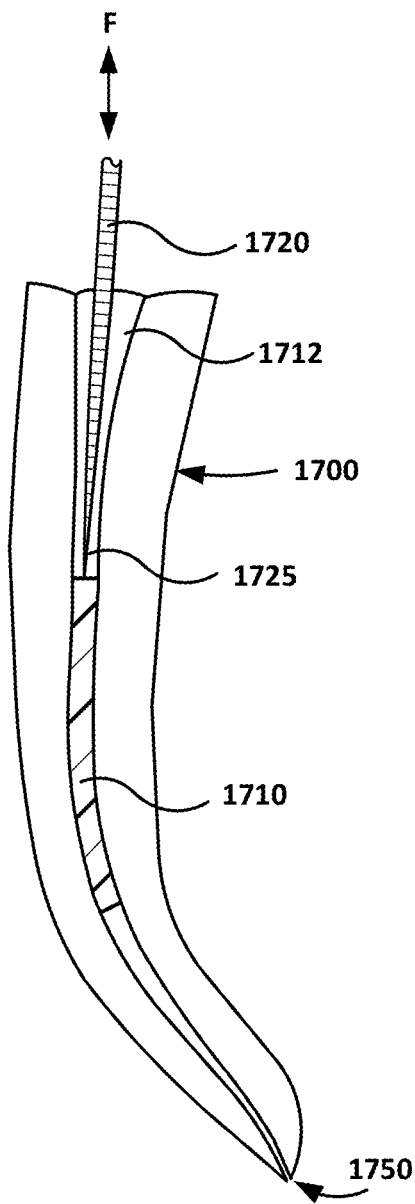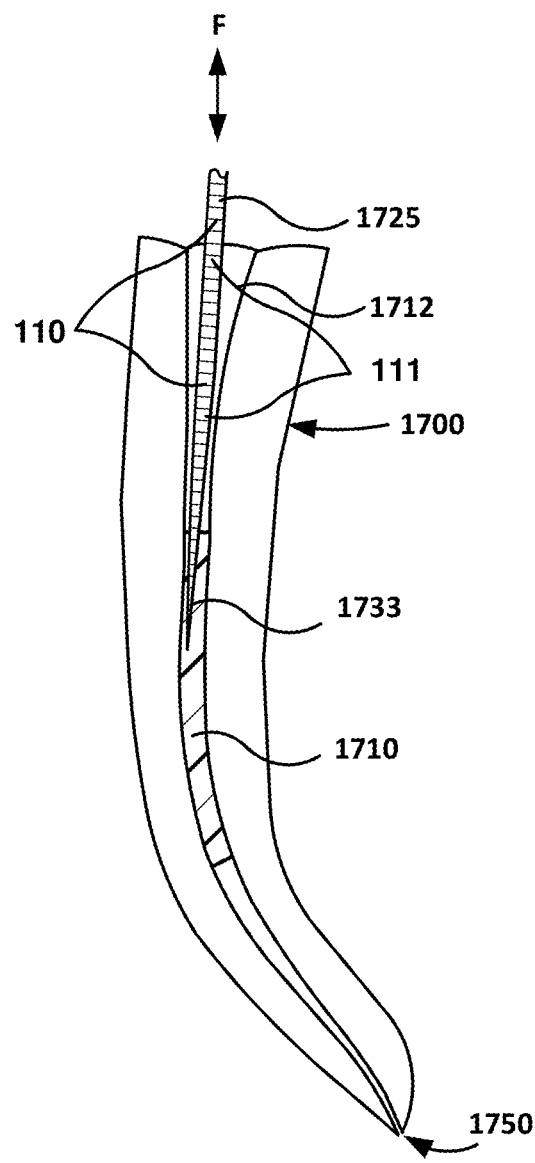
FIG. 17A   FIG. 17B

ENDODONTIC INSTRUMENTS AND ROOT CANAL TREATMENT METHODS

CROSS-REFERENCE TO RELATED APPLICATION

This application is a continuation of co-pending U.S. patent application Ser. No. 14/946,716, filed Nov. 19, 2015, titled "Endodontic Instruments And Root Canal Treatment Methods," which is incorporated herein in its entirety by this reference.

FIELD OF THE INVENTION

The present invention relates to instruments for endodontic use, and more particularly to apparatuses and associated methods for performing root canal treatment.

BACKGROUND OF THE INVENTION

In endodontics it is necessary to thoroughly debride a root canal (or pulp chamber) of a tooth, in order to reduce the chances of bacterial growth in the root canal, and to improve the healing potential of the remaining healthy tissue. As used herein, debridement includes for example, the removal of dead, damaged, or infected tissue of the dental pulp, as well as hypercalcification, residual resistant paste, various constrictions, broken instruments, and fragments or foreign material lodged in the root canal.

This debridement would ideally terminate at the apical foramen. The apical foramen is the opening at the apex of the root of the tooth, through which the nerve and blood vessels that supply the dental pulp pass. The dental pulp resides in the root canal and is comprised of living circulatory, connective, and nerve tissues.

As part of the endodontic therapy, and following the debridement of the root canal, the endodontic clinician shapes the root canal prior to inserting a filler material in place of the original dental pulp.

To this end, hand (i.e., manual) files and rotary files (i.e., electrically operated) commonly called spiral instruments are used for the treatment of root canals. Typically, these spiral instruments have a generally triangular, square, or rectangular cross section, and comprise edges (or corners) that attack the dental wall and strike the dentine wall at an acute angle. Consequently, these conventional files have a tendency to wear out prematurely and to break.

In addition, these conventional files may bind when resisted by obstacles and eventually break inside the root canal, as they do not have a sufficient thickness to resist torsion fatigue induced thereon. Moreover, such files do not generally perform a complete rubbing of the dental wall in order to achieve a hermetic obturation of the root canal, thus yielding to a risk of infection.

In addition, the tip of these spiral instruments is usually a non-cutting tip based on the assumption that a cutting tip will facilitate the formation of false canals.

Conventionally, withdrawing segments of fractured instruments that cause root obstructions, was done by means of ultrasonic files. An exemplary technique requires the use of conventional manual files from No. 8 to 15 having a taper of 2%, in order to open a cutting around the lodged segment of the fractured instrument. However, this withdrawal technique involves the risk of introducing additional breakage of the newly used instrument, as well as opening false canals. As a result, this conventional technique has not generally yielded optimal results.

Furthermore, in order to overcome obstructions resulting from hypercalcification, certain conventional treatment methods propose the enlargement of the root canal using files from No. 8 to 15 having a 2% taper, or C+ files followed by the use of rotary files (electrically operated) from No. 10 to 25 with a 2%, 4%, or 6% taper. However, this method also does not provide optimal results and introduces the risk of breakage of the newly used file, as well as opening false canals.

The weakness of the conventional endodontic files in fracture or in procedural errors, is due to their cyclic fatigue and torsional stress, and the difficulties of removing the broken files, as explained in the following publications:

Bahcall J K, et al., "The causes, prevention, and clinical management of broken endodontic rotary files," Dent Today. 2005 Nov.; 24(11):74, 76, 78-80; quiz 80, Department of Surgical Sciences, Marquette University School of Dentistry, USA, the abstract of which is available online at http://www.ncbi.nlm.nih.gov/pubmed/16358801.

Peters O. A., "Rotary Instrumentation: An endodontic perspective," American Association of Endodontists, Winter 2008, which is available online at https://www.aae.org/uploadedfiles/publications_and_research/endodontics_c olleagues_for_excellence_newsletter/winter08ecfe.pdf. This publication makes it clear that not all root canals lend themselves to rotary preparation, due to varying degrees of the clinicians' skills and case complexity, and to the fact that rotary files may fracture rather unexpectedly or create procedural errors.

The following references clarify that the fracture of an endodontic file may cause the endodontic treatment to have a lower success rate, and that fragments of files may be removed using a retrieval system; however, this procedure can be technically demanding, and several fragments may be left in-situ:

Metzger, Z. et al., "The Self-Adjusting File (SAF). Part 1: Respecting the Root Canal Anatomy—A New Concept of Endodontic Files and Its Implementation," Journal of Endodontics 36 (4): 679-90 (2010).

De-Deus, G. et al., "The Self-Adjusting File Optimizes Debridement Quality in Oval-shaped Root Canals," Journal of Endodontics 37 (5): 701-5 (2011).

Siqueira Jr., J. F., et al. "Ability of Chemomechanical Preparation with Either Rotary Instruments or Self-Adjusting File to Disinfect Oval-shaped Root Canals," Journal of Endodontics 36 (11): 1860-5 (2010).

Although cylindro conical instruments have been used by dentists only in root canal filing material (spreaders) with a smooth surface, they have not been used to probe, shape, debride, catheterize, penetrate or bypass obstacles in root canal treatments. Reference is made to Carrotte, P., "Endodontics: Part 5 Basic instruments and materials for root canal treatment," British Dental Journal 197,455-464 (2004), Published online: 23 Oct. 2004, at http://www.nature.com/bdj/journal/v197/n8/ful1/4811738a.htmlRoot canal filling instruments.

In addition to the risks involved with the use of conventional treatment methods, there is a potential for damaging the apex or causing a shear in the coronal part or in the apical part of the root canal.

Yet another disadvantage of the conventional treatment methods is that the instruments generally cannot penetrate difficult hypercalcifications, blockages, and narrow canals, nor can they probe the ledges or pierce the most resistant residual paste in the root canal.

In addition, they cannot bypass lodged segments of fractured instruments in the root canals, nor can they remove dental plugs. Moreover, they cannot penetrate blockages resulting from root canal treatment, nor can they penetrate the obliterated coronary infundibula due to the high fracture risk.

Still another disadvantage of the conventional treatment methods is that the instruments generally may not be totally suitable for use under elevated torque or high speed, due to the high fracture risk. In addition, the spiral instruments generally exert force on the dental wall and are therefore subjected to a reactive force. In fact, rubbing the dental wall does not facilitate penetration in the desired direction of the dental apex.

Wherefore, there still remains an unsatisfied need for new endodontic instruments and associated methods of use for performing better root canal treatment. These instruments should penetrate or bypass most, if not all blockages in the root canals, while achieving optimal root canal treatment with optimal root canal shape, in order to maximize irrigation and hermetic obturation of the root canals.

SUMMARY OF THE INVENTION

The present invention satisfies this need, and presents several preferred designs for endodontic instruments and associated methods of use for performing root canal treatment. These instruments penetrate or bypass most, if not all blockages in the root canal, while achieving optimal root canal treatment with optimal root canal shape, in order to maximize irrigation and hermetic obturation of the root canal.

In addition, the treatment of a root canal with the instruments and methods of the present invention, while avoiding damage to either the root canal or the apex, is ensured a very high rate of success.

Although the teeth and grooves of the endodontic instruments of the present invention may become worn with use, they will not easily break because they do not attack the radical dentine at weak pointed angles. In addition, the use of sandblasting to form the endodontic instrument helps to avoid corrosion of instrument resulting from stocking, storage, or usage.

The various instruments of the invention surpass the conventional stainless steel hand files and the NiTi rotary instruments, and present numerous advantages among which are the following:

The instruments are very flexible so that they may follow difficult curved root canals without damaging the apex, making a false canal, or causing a shear in the coronal part and the apex of the root canal.

They penetrate the difficult hypercalcifications, obstructions and narrow canals.

They probe the ledges of the root canal.

They pierce residual, resistant pastes.

They bypass fractured files, lentulos, posts, and fractured silver cones.

They do not create false canals, shears and dental plugs.

They allow the removal of pre-existing dental plugs.

They penetrate blockages caused by an inadequate use of other instruments.

They penetrate the obliterated coronary infundibula with low risk of fracture or of damaging the apex.

Furthermore, these instruments successfully perform and facilitate the complete endodontic procedure:

They penetrate root canals that other endodontic instruments fail to penetrate.

They resist increased torque and high speeds (ranging from approximately 1.5 N to 5 N and from approximately 300-600 rpm) due to their high resistance.

Their success in treating and retreating root canals helps to avoid expensive and painful endodontic surgeries and eventually implants in case of failure of endodontic treatments.

To this end, each instrument of the present invention comprises a handle that secures an elongated tapered shank. The shanks of the instruments include cylindro-conical files having a circular cross section, which penetrate the root canals using most, if not the entirety of their peripheral surfaces, thus providing a better ability to resist torsion fatigue, to preserve the initial circular dental canal anatomy, and to attain a hermetical obturation of the root canals. The shanks can assume a variety of designs based on a combination of characteristics, including but not limited to: a roughed surface, a cutting surface, a smooth area, a conical cutting tip, a non-cutting tip, a beveled tip, and a non-beveled tip.

Based upon the various designs of their shanks, the endodontic instruments may generally be categorized, as follows:

$1^{st}$ Category: Instruments for catheterization and for passing through root obstacles.

$2^{nd}$ Category: Instruments for fine and curved roots.

$3^{rd}$ Category: Instruments that may be used for enlarging and shaping root canals.

The instruments in the $1^{st}$ Class of the $1^{st}$ Category can be either hand operated or electrically rotating. Each of these instruments includes a lateral surface that contains a number of superficial horizontally, vertically, or transversally striated grooves that define slightly cutting edges, and that are either separated by smooth areas or sandblasted areas. The instruments in this class include a generally circular cross-section, and a conical tip that may be cutting or non-cutting, beveled or non-beveled. These instruments include hand operated files for root canal treatment that are preferably made from stainless steel (with nos. ranging from 10 to 25) or NiTi (with nos. ranging from 20 to 25) and electrically rotating NiTi files (with nos. ranging from 10 to 25), all with a taper of approximately 0, 1, 2, 3, or 4% and a length ranging from approximately 12 mm-32 mm.

The instruments in the $2^{nd}$ Class of the $1^{st}$ Category are hand operated instruments having a series of horizontally, vertically, or transversally striated deep grooves with cutting edges, that are separated by restricted smooth or sandblasted areas or even instruments that are completely sandblasted. The instruments in this class include a generally circular cross section, and a conical tip that may be cutting or non-cutting. The shanks of these instruments range from No. 6 to 20. The shanks may be made from stainless steel, and range from No. 6 to 20. The shanks may alternatively be made from NiTi, and range from No. 20 to 40. The shafts of all these instruments have a taper of approximately 0%, 1%, 2%, and 4%, and a length that ranges from approximately 12 mm to 32 mm.

The instruments of the $2^{nd}$ Category preferably include electrically operated rotating NiTi instruments, each having a tapered shank with a series of transversal, deep, striated grooves with cutting edges. In other embodiments can alternatively, the instruments include a series of horizontally or vertically striated, deep grooves with cutting edges, that are separated by either smooth or roughened (i.e., sandblasted) restricted areas. These instruments include electrically rotating files for root canal treatment with nos. 10 to 20, and having an approximate 2% taper and a length ranging from approximately 21 mm to 32 mm.

The instruments of the 3$^{rd}$ Category preferably include electrically operated rotating instruments, each having a shank with a generally circular cross section and a conical cutting or non-cutting tip, with a series of saw teeth that are separated by restricted smooth areas. In other embodiments, the shank can include horizontally, vertically, or transversally striated grooves. These instruments include electrically rotating files for root canal treatment with nos. ranging from 20 to 40, and having an approximate 4% to 10% taper and a length ranging from approximately 21 mm to 32 mm.

The endodontic procedure being administered determines the selection of the category, the instruments within each category, and the sequential use of the selected instruments.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIGS. 2A and 2B represent two schematic illustrations of an exemplary hand operated (or electrically rotating) instrument having a long, tapered shank which includes superficial vertically striated grooves with slightly cutting edges that are separated by smooth areas (FIG. 2A), and which includes deep vertically striated grooves with cutting edges that are separated by restricted smooth areas (FIG. 2B), according to preferred embodiments of the present invention;

FIGS. 3A and 3B represent two schematic illustrations of an exemplary hand operated (or electrically rotating) instrument having a long, tapered shank which includes discontinuous, superficial transversally striated grooves with slightly cutting edges that are separated by smooth areas (FIG. 3A), and which includes deep transversally striated grooves with cutting edges that are separated by restricted smooth areas (FIG. 3B), according to preferred embodiments of the present invention;

FIGS. 9A and 9B represent two schematic illustrations of an exemplary hand operated (FIG. 9B) and electrically rotating (FIG. 9A) spiral instrument with an upper cylindroconical part having a conical tip, wherein the cylindroconically shaped area is roughened, for example, by transversally grooved striations with cutting edges separated by restricted smooth or sandblasted areas, according to preferred embodiments of the present invention;

FIGS. 10A and 10B represent two schematic illustrations of an exemplary hand operated (FIG. 10B) and electrically rotating (FIG. 10A) instrument having a conical tip and a long, generally tapered shank that defines a series of cylindro-conically shaped areas (or sections) separated by spirally shaped sections, wherein the cylindro-conically shaped areas (or sections) are roughened by, for example, transversally grooved striations with cutting edges separated by restricted smooth areas, according to preferred embodiments of the present invention;

FIGS. 11A and 11B represent two schematic illustrations of an exemplary hand operated (FIG. 11B) and electrically rotating instrument (FIG. 11A) having a long, generally tapered shank that defines a series of spirally shaped sections separated by cylindro-conically shaped areas (or sections) that are roughened by, for example, transversally grooved striations with cutting edges separated by restricted smooth areas, according to preferred embodiments of the present invention;

FIGS. 13A, 13B, 13C, and 13D illustrate a cross-sectional view of an exemplary tooth, with the cross-hatching removed for clarity of illustration, showing the sequential steps of progressively treating a root canal without a resistive path, obstruction, or blockage, using the instrument and process of the present invention, wherein FIG. 13A illustrates a first step, FIG. 13B illustrates a second step, FIG. 13C illustrates a third step, and FIG. 13D illustrates a fourth step;

FIGS. 14A, 14B, 14C, 14D, 14E, and 14F illustrates a cross-sectional view of an exemplary tooth, with the cross-hatching removed for clarity of illustration, showing the sequential steps of progressively treating a root canal that is blocked by a fragment of a broken instrument, such as a file, by bypassing the lodged fragment using the instrument and process of the present invention, wherein FIG. 14A illustrates a first step, FIG. 14B illustrates a second step, FIG. 14C illustrates a third step, FIG. 14D illustrates a fourth step, FIG. 14E illustrates a fifth step, and FIG. 14F illustrates a sixth step;

FIGS. 15A, 15B, and 15C illustrate a cross-sectional view of an exemplary tooth, with the cross-hatching removed for clarity of illustration, showing the sequential steps of progressively treating a root canal that is blocked by hypercalcification, by piercing the hypercalcification using the instrument and process of the present invention, wherein FIG. 15A illustrates a first step, and FIG. 15B illustrates a second step;

FIGS. 16A, 16B, and 16C illustrate a cross-sectional view of an exemplary tooth, with the cross-hatching removed for clarity of illustration, showing the sequential steps of progressively treating a root canal that is partially blocked by a shoulder, by bypassing the shoulder using the instrument and process of the present invention, wherein FIG. 16A illustrates a first step, FIG. 16B illustrates a second step, and FIG. 16C illustrates a third step;

FIGS. 17A, 17B, and 17C illustrate a cross-sectional view of an exemplary tooth, with the cross-hatching removed for clarity of illustration, showing the sequential steps of progressively treating a root canal that is blocked by a residual resistant paste, by piercing and removing the resistant paste using the instrument and process of the present invention, wherein FIG. 17A illustrates a first step, FIG. 17B illustrates a second step, and FIG. 17C illustrates a third step;

FIGS. 19A and 19B represent a flow chart that illustrates the endodontic treatment method of bypassing root obstructions resulting from fractured instruments, by selectively using the instruments of FIGS. 1A, 1B, 2A, 2B, 3A, 3B, and 4 through 8 according to the present invention, wherein FIG. 19A illustrates a first part of the flow chart and FIG. 19B illustrates a second part of the flow chart;

FIGS. 20A and 20B represent a flow chart that illustrates the endodontic treatment method of penetrating root obstructions resulting from hypercalcification, by selectively using the instruments of FIGS. 1A, 1B, 2A, 2B, 3A, 3B, and 5 through 8 according to the present invention, wherein FIG. 20A illustrates a first part of the flow chart and FIG. 20B illustrates a second part of the flow chart;

FIGS. 21A and 21B represent a flow chart that illustrates the endodontic treatment method of bypassing root obstructions resulting from a shoulder obstruction, by selectively using the instruments of FIGS. 1A, 1B, 2A, 2B, 3A, 3B, and 5 through 8 according to the present invention, wherein FIG. 21A illustrates a first part of the flow chart and FIG. 21B illustrates a second part of the flow chart;

FIGS. 22A and 22B represent a flow chart that illustrates the endodontic treatment method of penetrating root obstructions resulting from a previous root canal treatment, by selectively using the instruments of FIGS. 1A, 1B, 2A, 2B, 3A, 3B, and 4 through 8 according to the present invention, wherein FIG. 22A illustrates a first part of the flow chart and FIG. 22B illustrates a second part of the flow chart; and FIGS. 23A, 23B, 23C, 24A, 24B, 24C, 25A, 25B, 25C, 25D, 26A, 26B, 27A, 27B, 27C, 28A, 28B, 28C, 28D, 29A, 29B, 29C, 30A, 30B, 31A, 31B, 32A, 32B, 32C, 33A, 33B, 33C, 33D, 34, 35, 36A, 36B, 36C, 37A, 37B, 38A, and 38B are X-ray views that illustrate various cases treated by the instruments and methods of the present invention, wherein: FIG. 23A is an X-ray view that illustrates an exemplary treatment case; FIG. 23B is another X-ray view that illustrates the treatment case of FIG. 23A; and FIG. 23C is yet another X-ray view that illustrates the treatment case of FIGS. 23A, 23B; FIG. 24A is an X-ray view that illustrates an exemplary treatment case; FIG. 24B is another X-ray view that illustrates the treatment case of FIG. 24A; and FIG. 24C is yet another X-ray view that illustrates the treatment case of FIGS. 24A, 24B; FIG. 25A is an X-ray view that illustrates an exemplary treatment case; FIG. 25B is another X-ray view that illustrates the treatment case of FIG. 23A; FIG. 25C is yet another X-ray view that illustrates the treatment case of FIGS. 23A, 23B; and FIG. 25D is still another X-ray view that illustrates the treatment case of FIGS. 25A, 25B, and 25C; FIG. 26A is an X-ray view that illustrates an exemplary treatment case; and FIG. 26B is another X-ray view that illustrates the treatment case of FIG. 24A; FIG. 27A is an X-ray view that illustrates an exemplary treatment case; FIG. 27B is another X-ray view that illustrates the treatment case of FIG. 27A; and FIG. 27C is yet another X-ray view that illustrates the treatment case of FIGS. 27A, 27B; FIG. 28A is an X-ray view that illustrates an exemplary treatment case; FIG. 28B is another X-ray view that illustrates the treatment case of FIG. 28A; FIG. 28C is yet another X-ray view that illustrates the treatment case of FIGS. 28A, 28B; and FIG. 28D is still another X-ray view that illustrates the treatment case of FIGS. 28A, 28B, and 28C; FIG. 29A is an X-ray view that illustrates an exemplary treatment case; and FIG. 29B is another X-ray view that illustrates the treatment case of FIG. 29A; FIG. 30A is an X-ray view that illustrates an exemplary treatment case; and FIG. 30B is another X-ray view that illustrates the treatment case of FIG. 30A; FIG. 31A is an X-ray view that illustrates an exemplary treatment case; and FIG. 31B is another X-ray view that illustrates the treatment case of FIG. 31A; FIG. 32A is an X-ray view that illustrates an exemplary treatment case; FIG. 32B is another X-ray view that illustrates the treatment case of FIG. 32A; and FIG. 32C is yet another X-ray view that illustrates the treatment case of FIGS. 32A, 32B; FIG. 33A is an X-ray view that illustrates an exemplary treatment case; FIG. 33B is another X-ray view that illustrates the treatment case of FIG. 33A; FIG. 33C is yet another X-ray view that illustrates the treatment case of FIGS. 33A, 33B; and FIG. 33D is still another X-ray view that illustrates the treatment case of FIGS. 33A, 33B, and 33C; FIG. 34 is an X-ray view that illustrates an exemplary treatment case; FIG. 35 is an X-ray view that illustrates an exemplary treatment case; FIG. 36A is an X-ray view that illustrates an exemplary treatment case; FIG. 36B is another X-ray view that illustrates the treatment case of FIG. 36A; and FIG. 36C is yet another X-ray view that illustrates the treatment case of FIGS. 36A, 36B; FIG. 37A is an X-ray view that illustrates an exemplary treatment case; FIG. 37B is another X-ray view that illustrates the treatment case of FIG. 37A; and FIG. 38A is an X-ray view that illustrates an exemplary treatment case; FIG. 38B is another X-ray view that illustrates the treatment case of FIG. 38A.

Figure 1A:
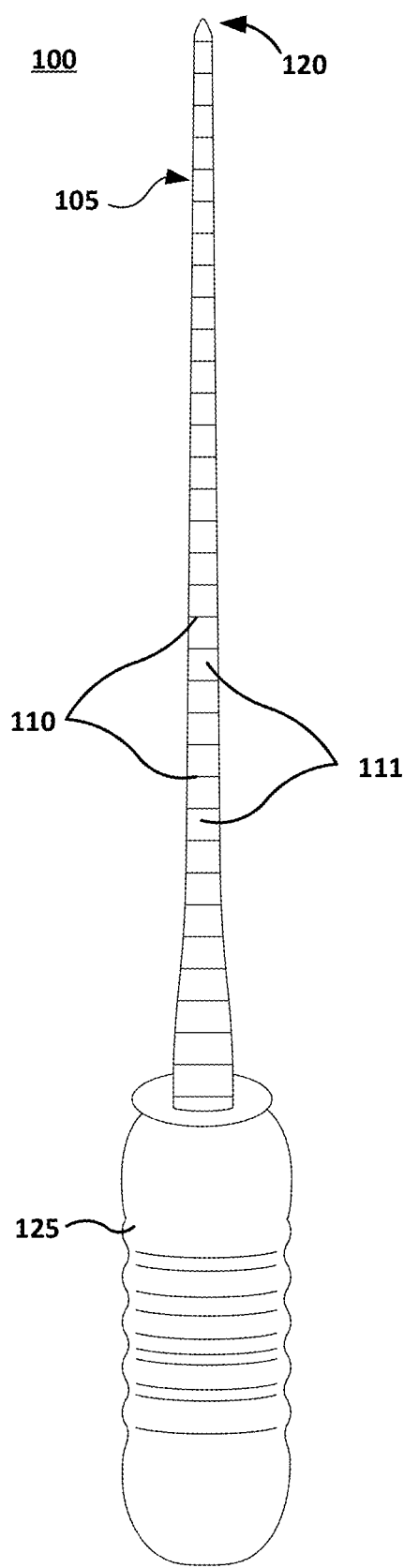
FIGS. 1A and 1B represent two schematic illustrations of an exemplary hand operated (or electrically rotating) instrument having a long, tapered shank which includes superficial horizontally striated grooves with slightly cutting edges that are separated by smooth areas (FIG. 1A), and which includes deep horizontally striated grooves with cutting edges that are separated by restricted smooth areas (FIG. 1B), according to preferred embodiments of the present invention.

It should be understood that the sizes of the different components in the figures might not be in exact proportion, and are shown for visual clarity and for the purpose of explanation.

DETAILED DESCRIPTION OF PREFERRED EMBODIMENTS

The instruments of the present invention can be used for probing, enlarging, penetrating, and bypassing difficult root canals obstructions, they may be hand operated or electrically operated, they may have a continued or a discontinued rotation, and they may have reciprocal (or bidirectional) rotation, a clockwise rotation, or an anti-clockwise rotation, so as to enable the reciprocating (or bidirectional) debridement of the root canal.

As it will be explained later in more specific details, each of these instruments comprises a handle that secures an elongated tapered shank. The cross section of the shank is generally circular, so as to eliminate sharp edges (or corners) that might otherwise attack the dental wall and strike the dentine wall at an acute angle, thus ultimately extending the life of the instrument.

The shank can assume a variety of designs, based on a combination of characteristics, including but not limited to: a roughed surface, a cutting surface, a smooth area, a conical cutting tip, a non-cutting tip, a beveled tip, and a non-beveled tip.

Based upon the various designs of their shanks, the endodontic instruments may be categorized as follows:

$1^{st}$ Category: Instruments for catheterization and for passing through root obstacles.

$2^{nd}$ Category: Instruments for fine and curved roots.

$3^{rd}$ Category: Instruments that may be used for enlarging and shaping root canals.

Each of these categories will now be described in more detail.

$1^{st}$ Category: Instruments for Catheterization and for Passing through Root Obstacles, Shoulders, Resistant Paste, and Hypercalcifications This category comprises two classes of instruments:

First ($1^{st}$) Class: Instruments for Passing through Root Obstacles, Shoulders, Resistant Paste, and Hypercalcifications This class includes hand operated and electrically rotating instruments having a number of superficial horizontally, vertically, or transversally striated grooves (also referred to as "shallow grooves") that define slightly cutting edges, and that are either separated by smooth areas or sandblasted areas or even instruments that are completely sandblasted. As used herein, the term "shallow" denotes a general depth that ranges between approximately 0.06 mm and 0.4 mm.

The instruments in this class include a generally circular cross-section, and a conical tip that may be cutting or non-cutting, beveled or non-beveled.

The shanks of the hand operated instruments may be made from stainless steel, and range from No. 10 to 25. The shanks of the hand operated instruments that are made from NiTi, preferably range from No. 20 to 25. The shafts of the electrically rotating NiTi instruments preferably range from No. 10 to 25. The shafts of all these instruments have a taper ranging from approximately 0% to 4%, and a length that ranges from approximately 12 mm to 32 mm. (FIGS. 1-5).

The more preferred embodiments of the instruments in this class that provide optimal results are the hand operated instruments Nos. 10, 15, and 20, with a shank taper with an approximate 2% taper, and that are made from stainless steel. Other preferred embodiments include the hand operated instruments No. 20 with an approximate 4% shank taper that is made from NiTi. Additional preferred embodiments include the electrically rotating instruments that are made from NiTi, Nos. 10, 15, and 20, with a shank taper of approximately 2%, and Nos. 20 and 25 with a shank taper of approximately 4%.

Sandblasted instruments with superficial grooves with slightly cutting edges, have provided good penetration results, namely in engraving a cutting adjacent to the fractured instrument without encroaching with the coils of the fractured instrument, and in removing the dentine of the root canal. Optimal penetration results have been obtained with instruments that are sandblasted with aluminum oxide.

Second ($2^{nd}$) Class: Instruments for Catheterization

This class includes hand operated instruments having a series of horizontally, vertically, or transversally striated deep grooves with cutting edges, that are separated by restricted smooth or sandblasted areas or even instruments that are completely sandblasted. As used herein, the term "deep" denotes a general depth that ranges between approximately between 0.12 mm and 0.8 mm. The instruments in this class include a generally circular cross section, and a conical tip that may be cutting or non-cutting.

Figure 6:
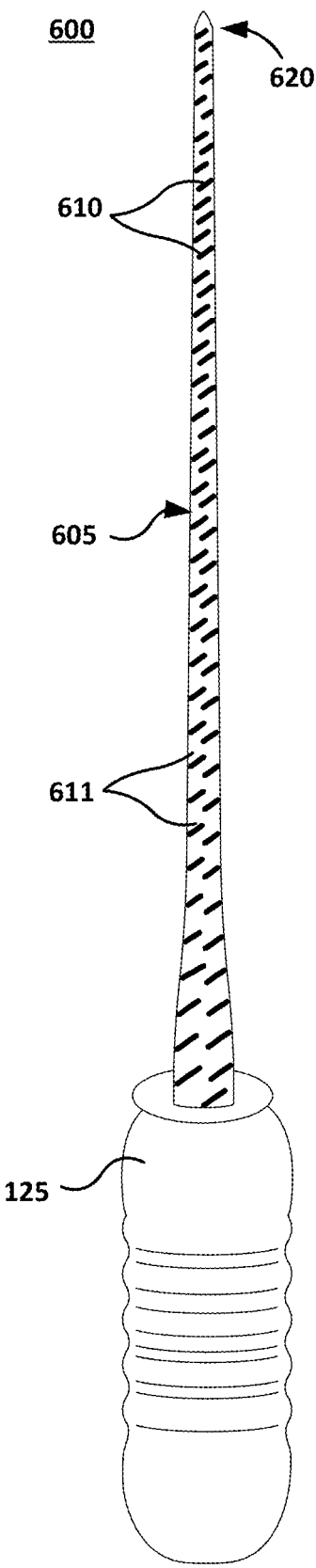
FIG. 6 is a schematic illustration of an exemplary hand operated instrument having a long, tapered shank with deep transversally striated grooves with cutting edges, separated by restricted smooth areas, according to a preferred embodiment of the present invention.

The shanks of these instruments range from No. 6 to 20. The shanks may be made from stainless steel, and range from No. 6 to 20. The shanks may alternatively be made from NiTi, and range from No. 20 to 40. The shafts of all these instruments have a taper of approximately 0%, 1%, 2%, and 4%, and a length that ranges from approximately 12 mm to 32 mm (FIG. 6). The preferred embodiments of the instruments in this class that provide optimal results are those made of stainless steel with Nos. 10, 15, and 20, with an approximate 2% taper. These preferred embodiments include instruments that are made from NiTi, No. 20, with an approximate 4% shank taper.

The instruments of this $1^{st}$ category will now be described with reference to FIGS. 1A through 6. FIG. 1A is a schematic illustration of an exemplary hand operated instrument (or file) 100 for use as a first category, first class instrument, according to a preferred embodiment of the present invention. The instrument 100 generally includes an elongated, tapered shank 105 with superficial horizontally striated grooves 110 with slightly cutting edges that are separated by smooth areas 111.

In one exemplary embodiment, the grooves 110 form horizontal linear striations that are approximately 1 mm wide. It should be understood that the grooves 110 might assume other different patterns. The width of each smooth area 111 varies between approximately 2 mm and 3 mm.

The instrument 100 further includes a tip 120 and a handle 125. The tip 120 may be cutting or non-cutting, beveled or non beveled, depending on the desired application. The handle 125 secures one end of the shank 105, and enables an endodontist to safely and ergonomically hold the instrument 100 while performing the treatment. It should be understood that the instrument 100 may alternatively be electrically rotating, in which case, the handle 125 is replaced with an appropriate handle or interface that connects the shank 105 to an external rotary source (not shown), as is known or available in the field.

The shank 105 can be made of any suitable material, including but not limited to stainless steel or NiTi (Nickel Titanium). The shank 105 may have a constant or variable taper along its axial length, ranging from approximately 0% to 4%, a length ranging from approximately 12 mm to 32 mm, and a width ranging from approximately No. 10 to 25.

Figure 1B:
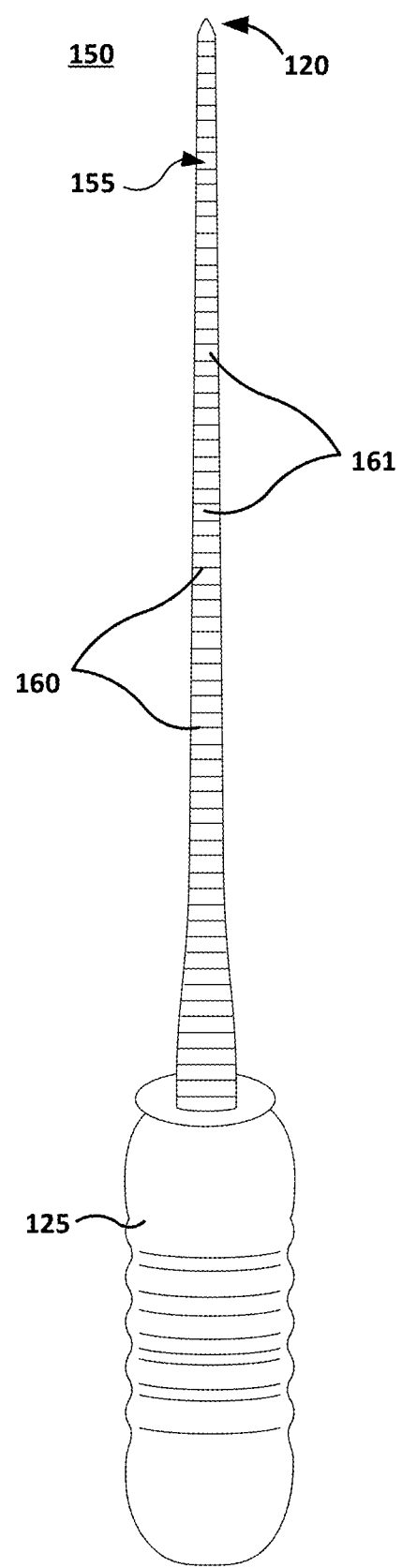

FIG. 1B illustrates another instrument 150 for use as a first category, second class instrument according to a preferred embodiment of the present invention. The instrument 150 may also be used as a second or third category instrument, as explained herein.

The instrument 150 is generally similar in design and construction to the instrument 100 of FIG. 1A, and comprises an elongated, tapered shank 155 with deep horizontally striated grooves 160 with cutting edges that are separated by restricted smooth areas 161. In one exemplary embodiment, the grooves 160 form horizontal linear striations that are approximately 2 to 3 mm wide. It should be understood that the grooves 160 might assume other patterns. The width of each smooth area 161 is approximately 1 mm.

The instrument 150 further includes a cutting or non-cutting tip 120 and a handle 125, whose design and function are explained earlier in connection with the instrument 100.

It should be understood that these instruments 100, 150 can be modified, as explained herein, for use as electrically rotating instruments.

FIGS. 2A, 2B respectively illustrate two exemplary hand operated instruments 200 (FIG. 2A) and 250 (FIG. 2B) that are generally similar in design and construction to the instruments 100, 150 (respectively) of FIGS. 1A, 1B. It should be understood that these instruments 200, 250 can be modified, as explained herein, for use as electrically rotating instruments.

The instrument 200 can be used as a first category, first class instrument. It includes an elongated, tapered shank 205 with superficial vertically striated grooves 210 with slightly cutting edges that are separated by smooth areas 211, according to a preferred embodiment of the present invention. In one exemplary embodiment, the grooves 210 form vertical linear striations that are approximately 1 mm in width. The smooth areas 211 separate the grooves 210 at a distance of approximately 2 to 3 mm.

The instrument 200 further includes a cutting or non-cutting tip 220 and a handle 125, which are respectively similar to the tip 120 and handle 125 of the instrument 100 of FIG. 1A.

The instrument 250 of FIG. 2B can be used as a first category, second class instrument, according to a preferred embodiment of the present invention. It may also be used as a second or third category instrument, as explained herein. The instrument 250 includes an elongated, tapered shank 255 having deep vertically striated grooves 260 with cutting edges that are separated by restricted smooth areas 261. In one exemplary embodiment, the grooves 260 form vertical linear striations that are approximately 2 to 3 mm in width. The smooth areas 261 separate the grooves 260 at a distance of approximately 1 mm.

The instrument 250 further includes a cutting or non-cutting tip 220 and a handle 125, which are respectively similar to the tip 120 and handle 125 of the instrument 150 of FIG. 1B.

FIGS. 3A, 3B respectively illustrate two exemplary hand operated instruments 300 (FIG. 3A) and 350 (FIG. 3B) that are generally, respectively similar in design and construction to the instruments 100, 150 of FIGS. 1A, 1B and 200, 250 of FIGS. 2A, 2B. It should be understood that these instruments 300, 350 can be modified, as explained herein, for use as electrically rotating instruments.

The instrument 300 can be used as a first category, first class instrument. It includes an elongated, tapered shank 305 with superficial transversally striated grooves 310 with slightly cutting edges that are separated by smooth areas 311, according to a preferred embodiment of the present invention. In one exemplary embodiment, the grooves 310 form transversally linear striations that are approximately 1 mm in width. The smooth areas 311 separate the grooves 310 at a distance of approximately 2 mm to 3 mm.

The instrument 300 further includes a cutting or non-cutting tip 320 and a handle 125, which are respectively similar to the tip 120 and handle 125 of the instrument 100 of FIG. 1A.

Figure 3C:
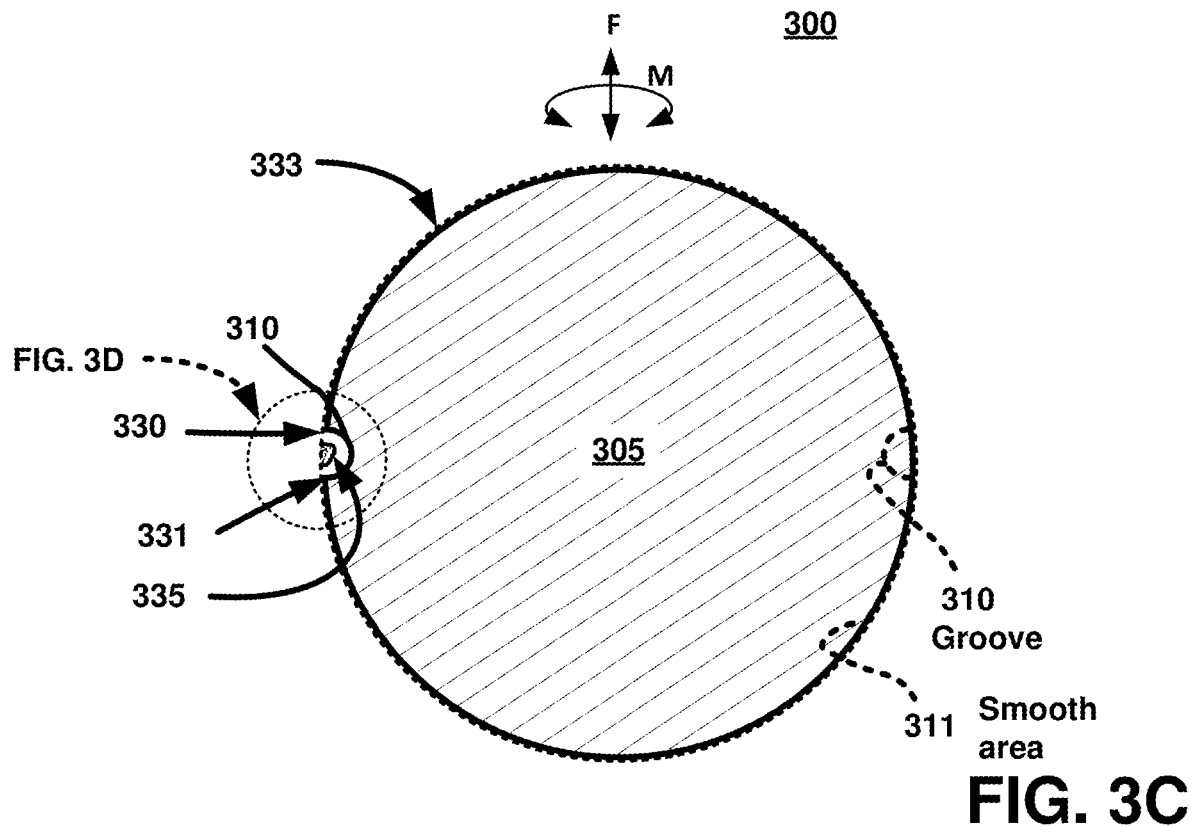
FIG. 3C is an enlarged cross-sectional view of the tapered shank of FIG. 3A, taken along line 3C-3C thereof, illustrating the circular construction of the shank, according to a preferred embodiment of the present invention.

With further reference to FIG. 3C, it is a cross-sectional view of the tapered shank 305 of FIG. 3A, taken along line 3C-3C thereof, and illustrates the circular construction of the shank 305, according to a preferred embodiment of the present invention. The circular cross section of the shank 305 eliminates sharp edges (or corners) that might otherwise attack and strike the dentine wall at an acute angle, thus ultimately extending the life of the instrument. This design enables the shank 305 to penetrate the root canal using most, if not the entirety of the shank 305 peripheral surface, thus providing a better ability to resist torsion fatigue, to preserve the initial circular dental canal anatomy, and to attain a hermetical obturation of the root canals.

FIGS. 3A, 3B, 3C, 3D, 3E, 3F, 3G, and 3H illustrates the alternating placement of the striations 310 relative to the smooth surfaces 311, along the length of the tapered shank 305. In this embodiment, the striations 310 restrict the smooth areas 311 so that adjacent striations 310 are separated completely by the intermediate smooth areas 311. In other terms, the striations 310 are discontinuous (i.e., the multiple striations 310 do not continue as an extended striation or striations along the shank 305, and are rather separate).

The striations 310 of FIG. 3A may include superficial transversally striated grooves with slightly cutting edges 330, 331, wherein the traversal striations (or grooves) 310 are separated by smooth, non-cutting areas 311 (FIGS. 3C, 3D, 3E, 3G, 3H). The striations 360 of FIG. 3B are generally similar to the striations 310 of FIG. 3A, but may alternatively include deep transversally striated grooves with cutting edges that are separated by restricted smooth areas 361, according to preferred embodiments of the present invention.

Figure 3D:
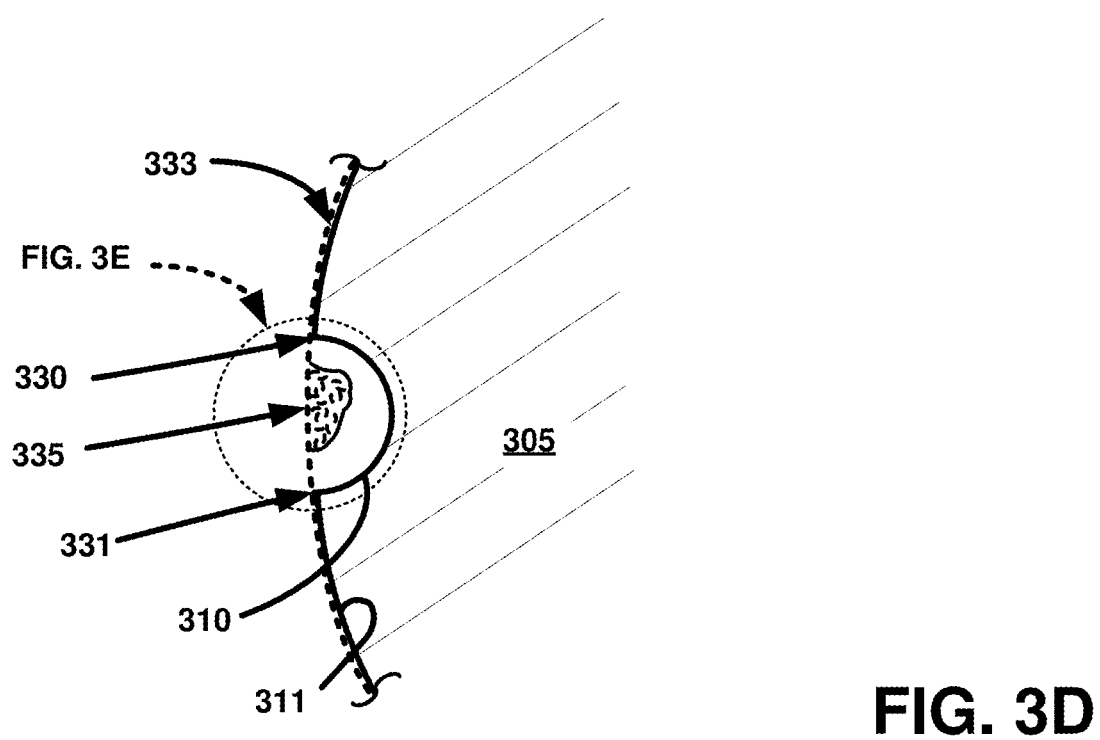
FIG. 3D is a greatly enlarged view of one of the striated grooves of the shank of FIGS. 3A, 3B, 3C, illustrating the debridement of the dentine wall by a groove edge, according to a preferred embodiment of the present invention.
Figure 3E:
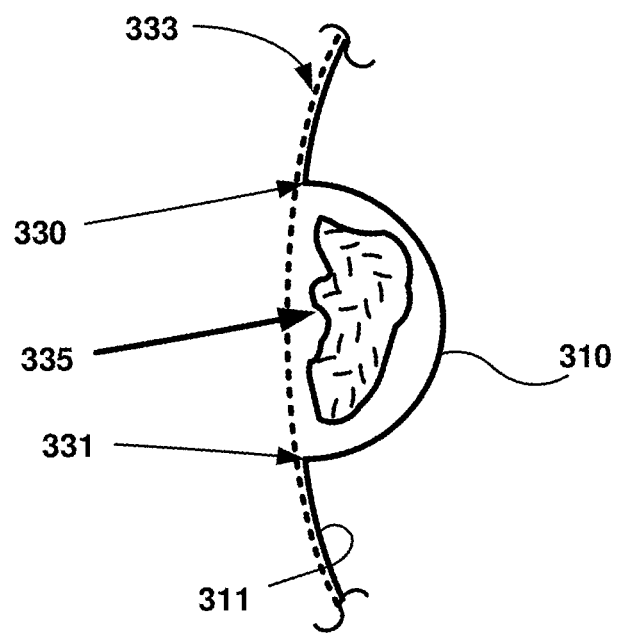
FIG. 3E is a greatly enlarged view of the groove of FIG. 3D, illustrating the capture of debris within the groove, according to a preferred embodiment of the present invention.
Figure 3F:
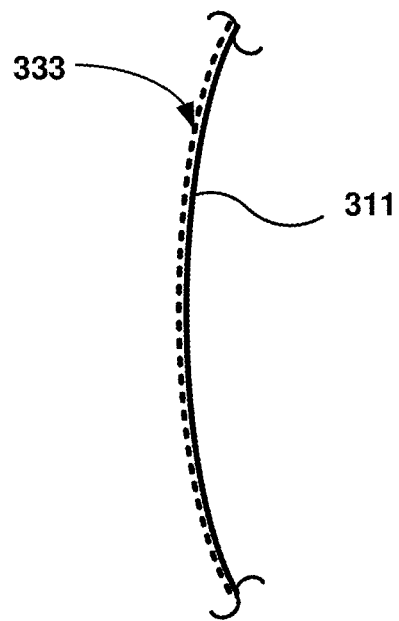
FIG. 3F is a greatly enlarged view of the sliding action of one of the smooth areas of FIGS. 3A, 3B, 3C, 3D, 3E, against the dentine wall, according to a preferred embodiment of the present invention.
Figure 3G:
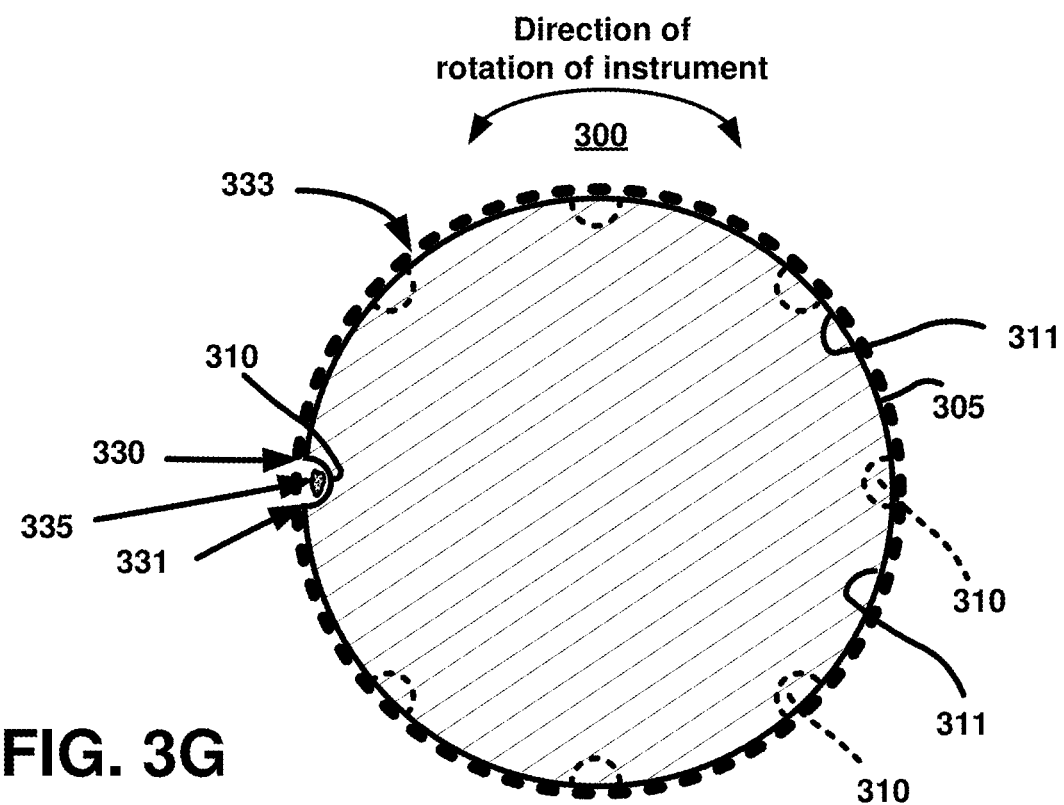
FIG. 3G shows another cross-sectional view of the tapered shank of FIGS. 3A, taken along line 3C-3C thereof, illustrating various exemplary placements of the grooves, shown in dotted lines, along the tapered shank, according to a preferred embodiment of the present invention.
Figure 3H:
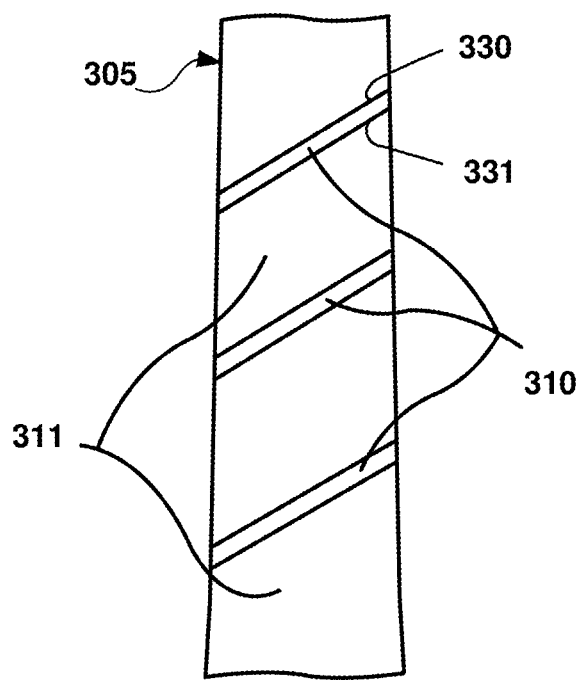
FIG. 3H is an enlarged, side, fragmentary view of the tapered shank of FIGS. 3A, 3B, illustrating three exemplary striated grooves that are separated by smooth areas, along the tapered shank, according to a preferred embodiment of the present invention.

FIG. 3H is an enlarged, side, fragmentary view of the tapered shank 305 of FIGS. 3A, 3B, illustrating three exemplary striated grooves 310 that are separated by smooth areas 311, along the tapered shank 305, according to a preferred embodiment of the present invention. Referring to FIG. 3H, and as illustrated in greater detail in FIGS. (FIGS. 3C, 3D, 3E, 3G), each groove 310 is clearly delineated by two edges 330, 331, along the lateral surface of the shank 305. In addition, the grooved striations 310 illustrated in FIG. 3G may be being distributed equidistally around the periphery of the shank 305. Alternatively, the distribution grooved striations 310 may be irregular. Furthermore, and with reference to FIG. 3H, the separation between two adjacent grooved striations 310, which defines the smooth area 311, may be equidistal or irregular along the length of the shank 305. FIG. 3G shows another cross-sectional view of the tapered shank 305 of FIGS. 3A, taken along line 3C-3C thereof, illustrating various exemplary placements of the grooves 310, shown in dotted lines, along the tapered shank 305, according to a preferred embodiment of the present invention.

The two cutting edges 310, 311 of each grooved striation 310 are adapted to perform a debridement of the root canal (also referred to herein as dental wall or dentine wall) 333. Some of the resulting characteristics of the present design are as follows:

[A] As the shank 305 penetrates the dentine wall 333, and depending on the translational and rotational directions of the instrument (300, 350) along arrows F and M, one of cutting edges (e.g., 330) of the grooved striations 310 debrides the dentine wall 333. When the directional movement of the instrument 300, 350 is reversed, the other cutting edge (e.g., 331) of the grooved striations 310 debrides the dentine wall 333. FIG. 3D illustrates one of the striated grooves 310 of the shank 305, showing the debridement of the dentine wall 333 by either groove edge 330 or groove edge 331. Although the groove 310 is shown as having a semi-circular shape, it should be understood that the shape of the groove 310 is not determinative of the present invention, and it can assume various other shapes or forms.

[B] The cutting edges 330, 331 are generally flush with the lateral surface of the shank 305, and do not protrude therefrom. [Reference to FIGS. 1A, 1B, 3A, 3B, 4, 5, 6, 7, 8, 13A, 13B, 14A, 14B, 14C, 14D, 15A, 15B, 15C, 16A, 16B, 16C, 17A, 17B, and 17C]

[C] As the shank 305 penetrates the dentine wall 333, debris 335 from the debridement action are collected within the striated grooves (310, 360) for eventual removal from the root canal 333, and disposition. FIGS. 3E, 3G illustrate a groove 310 that captures debris 335 therewithin, according to a preferred embodiment of the present invention;

[D] The smooth, non-cutting surfaces (311, 361) serve the important functions of reducing friction between the instrument 300, 350 and the root canal 333, thus reducing the resulting debridement temperature; and preventing the formation of a screw-type (also referred to as spiral or helical) engagement between the shank 305 and the root canal 333, as the shank 305 advances within the root canal 333, by allowing the shank 305 to slide along the root canal 333. FIG. 3F illustrates the sliding action of one of the smooth areas 311 of FIGS. 3A, 3B, 3C, 3D, 3E, against the dentine wall 33, according to a preferred embodiment of the present invention.

The instrument 350 of FIG. 3B can also be used as a first category, second class hand operated instrument, according to a preferred embodiment of the present invention. It may also be used as a second or third category instrument, as explained herein. The instrument 350 includes an elongated, tapered shank 355 with deep transversally striated grooves 360 with cutting edges that are separated by restricted smooth areas 361. In one exemplary embodiment, the grooves 360 form transversally linear striations that are approximately 2 to 3 mm in width. The smooth areas 361 separate the grooves 360 at a distance of approximately 1 mm.

The instrument 350 further includes a cutting or non-cutting tip 320 and a handle 125, which are respectively similar to the tip 120 and handle 125 of the instrument 150 of FIG. 1B.

Figure 4:
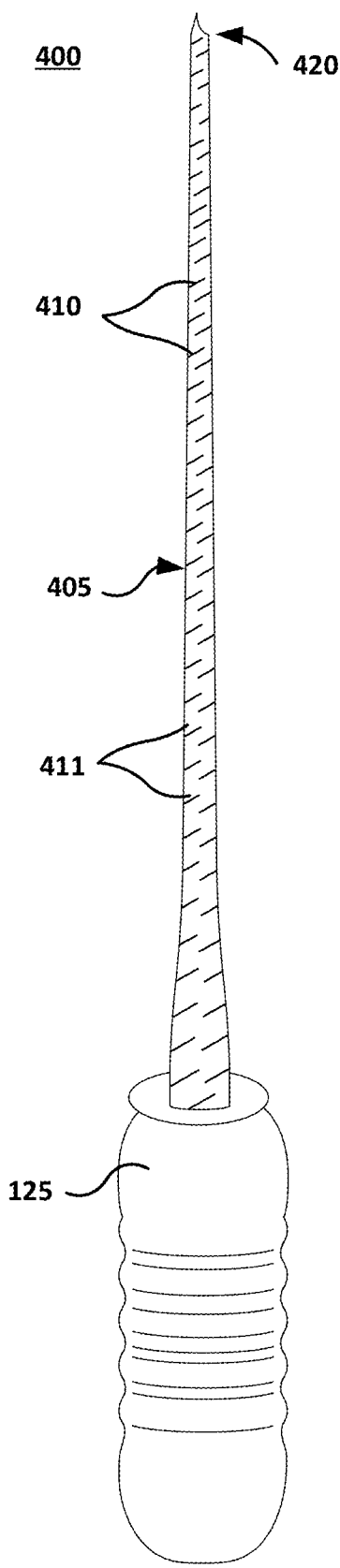
FIG. 4 is a schematic illustration of an exemplary hand operated (or electrically rotating) instrument having a long, tapered shank with a beveled tip, and discontinuous, superficial transversally striated grooves with slightly cutting edges, separated by smooth areas, according to a preferred embodiment of the present invention.

FIG. 4 illustrates an exemplary hand operated instrument 400 that is generally similar in design and construction to the instrument 300 of FIG. 3A. It should be understood that the instrument 400 can be modified, as explained herein, for use as an electrically rotating instrument.

The instrument 400 can be used as a first category, first class instrument. It includes an elongated, tapered shank 405 with superficial transversally striated grooves 410 with slightly cutting edges that are separated by smooth areas 411, according to a preferred embodiment of the present invention. In one exemplary embodiment, the grooves 410 form short, transversally linear striations that are approximately 1 mm in width. The distance between two consecutive grooves 410 may be adjusted so that it can be either fixed or variable, along the axial length of the shank 405. As an example only, the separation of the grooves 410 (which constitutes the width of the smooth areas 411) can vary between approximately 2 mm and 3 mm.

The instrument 400 further includes a pointed, beveled cutting tip 420 and a handle 125.

Figure 5:
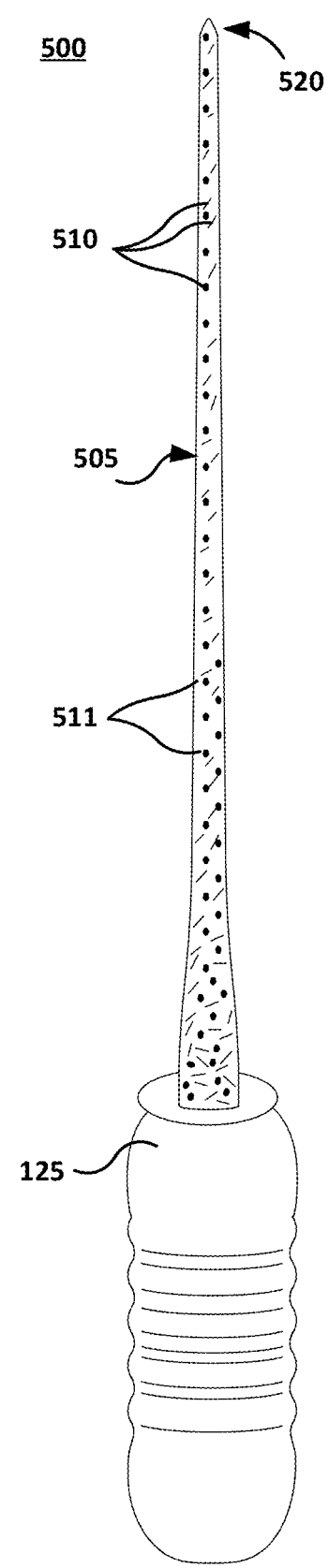
FIG. 5 is a schematic illustration of an exemplary hand operated (or electrically rotating) instrument having a long, tapered shank with superficial transversally striated grooves with slightly cutting edges, separated by roughened areas (such as by sandblasting), according to a preferred embodiment of the present invention.

FIG. 5 illustrates an exemplary hand operated instrument 500 that is generally similar in design and construction to the instrument 300 of FIG. 3A. It should be understood that the instrument 500 can be modified, as explained herein, for use as an electrically rotating instrument.

The instrument 500 can be used as a first category, first class instrument. It includes an elongated, tapered shank 505 with superficial transversally striated grooves 510 with slightly cutting edges that are separated by roughened areas 511, according to a preferred embodiment of the present invention. In one exemplary embodiment, the grooves 510 form short, transversally linear striations.

In a most preferred embodiment, the roughened areas 511 are formed by sandblasting. The instrument 500 further includes a cutting or non-cutting tip 520 and a handle 125.

FIG. 6 illustrates an exemplary hand operated instrument 600 that is generally similar in design and construction to the instrument 350 of FIG. 3B. It should be understood that the instrument 600 can be modified, as explained herein, for use as an electrically rotating instrument.

The instrument 600 can be used as a first category, second class instrument. It includes an elongated, tapered shank 605 with deep transversally striated grooves 610 with cutting edges that are separated by restricted smooth areas 611, according to a preferred embodiment of the present invention. In one exemplary embodiment, the grooves 610 form short, transversally linear striations that are approximately 2 to 3 mm in width. The separation distance between the grooves 610 may be adjusted so that it can be either fixed or variable, along the axial length of the shank 605. As an example only, the separation of the grooves 610 (which constitutes the width of the smooth areas 611) is 1 mm.

The instrument 600 further includes a pointed, cutting or non-cutting tip 620 and a handle 125.

$2^{nd}$ Category: Instruments for Penetrating Fine and Curved Root Canals

Figure 7:
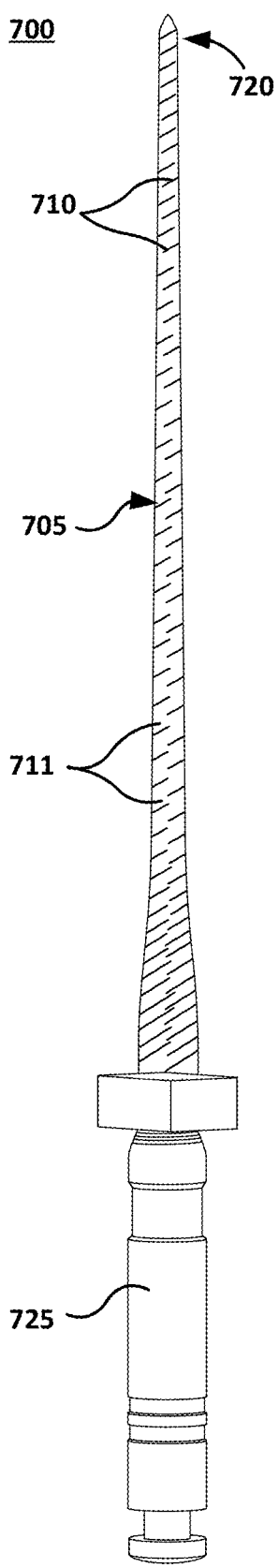
FIG. 7 is a schematic illustration of an exemplary electrically rotating instrument having a long, tapered shank with deep transversally striated grooves with cutting edges, separated by restricted smooth areas, according to a preferred embodiment of the present invention.

As illustrated in FIG. 7, this category comprises electrically operated rotating instruments (e.g., 700) that are preferably (but not exclusively) made for example of NiTi, from No. 10 to 20, with a shank 705 having a taper of approximately 2%. Although the illustrated instrument 700 is shown to include a series of transversal, deep, striated grooves 710 with cutting edges, it should be understood that other embodiments can alternatively include a series of horizontally or vertically striated, deep grooves with cutting edges, that are separated by either smooth or roughened (i.e., sandblasted) restricted areas 711, or even instruments that are completely sandblasted.

The shank 705 of the instrument 700 has a generally circular cross-section, and a conical cutting or non-cutting tip 720, with a length ranging from approximately 21 to 32 mm. The circular cross section and conical tip 720 of the shank 705 helps create a space around the segment(s) of the fractured instruments that are lodged within the root canal, thus enabling the instruments of the $1^{st}$ category, $1^{st}$ class, to bypass the lodged fractured segment(s).

A handle 725 secures the shank 705 to an external motorized source (not shown).

Figure 8:
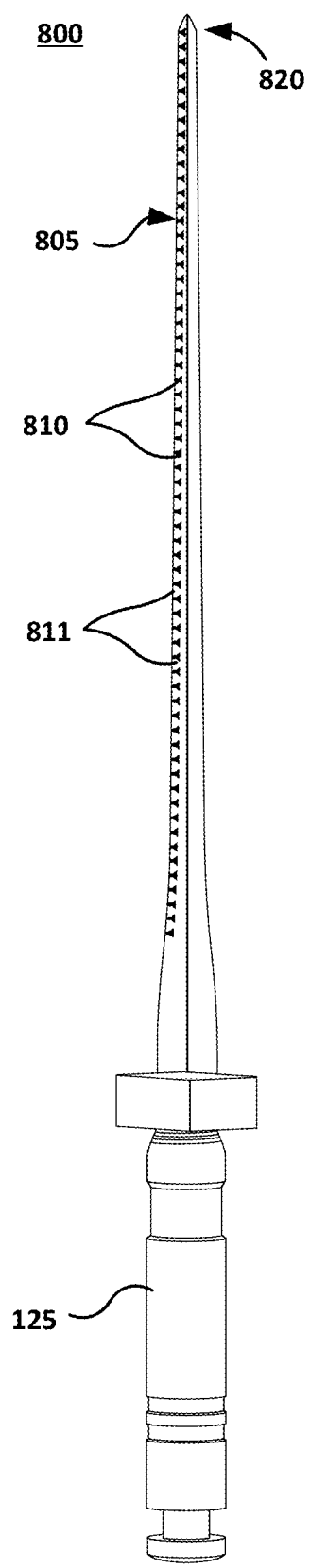
FIG. 8 is a schematic illustration of an exemplary electrically rotating (or hand operated) instrument having a long, tapered shank with a series of saw teeth separated by restricted smooth areas, according to a preferred embodiment of the present invention.

$3^{rd}$ Category: Instruments Which may be used for Enlarging and Shaping Root Canals As illustrated in FIG. 8, this category comprises electrically operated rotating instruments (e.g., 800) made of NiTi from No. 20 to 40, with a shank 805 having a generally circular cross section. Although the illustrated instrument 800 is shown to include a conical cutting or non-cutting tip 820, with a series of saw teeth 810 that are separated by restricted smooth areas 811, it should be understood that other embodiments can further include horizontally, vertically, or transversally striated grooves.

The saw teeth configuration expels the dental debris from the root canal and lessens the rubbing force of the instrument on the walls of the root canal, especially when using files from Nos. 20 to 40, thus avoiding root canal cracks.

The taper of the shank 805 ranges from approximately 4% to 10%, and has a length of approximately 21 mm to 32 mm.

It is important to note that the shanks of the instruments in all the foregoing three categories may or may not be sandblasted. It is also noteworthy to indicate that the instruments of the above three categories successfully penetrate root hypercalcifications that are formed in the root canal. In addition, a file instrument No. 20 with a 4% taper, and a file instrument No. 17 with a 4% taper, have shown remarkable utility in creating a space around fractured, lodged fragments of previously used instruments, so that the instruments of the $1^{st}$ category, $1^{st}$ class, may be used in order to bypass these fractured instruments.

Alternative embodiments that are contemplated by the present invention include but are not limited to the following hand operated and electrically operated instruments:

FIGS. 9A, 9B illustrate an electrically operated instrument 900 and a manually operated instrument 950 that is generally similar in design and function to the electrically operated instrument 900, and therefore only one instrument will be described in detail. The electrically operated instrument 900 generally includes an elongated, tapered shank 905 that defines an upper cylindro-conical section 910 and a spirally (or helically) shaped lower section 915.

The cylindro-conical section 910 includes at its upper end, a tip 920 that may be cutting or non-cutting, depending on the desired application. While in this particular illustration the cylindro-conical section 910 is illustrated as being a roughened surface, it should be understood that the cylindro-conical section 910 could include striated grooves with cutting edges separated by smooth or sandblasted areas. The length of the shank 905 preferably ranges between approximately 12 mm and 32 mm, and its width preferably varies from No. 10 to 40. The taper of the instrument preferably ranges from approximately 2% to 10%. In a preferred embodiment, the entire shank 905 of the instrument 900 is sandblasted.

Section 910 is intended to penetrate root canal blockages while section 915 serves to debride and to shape the opened path.

The instrument 900 further includes a handle 925 that secures one end of the shank 905, and that enables an endodontist to connect the instrument 900 to an external rotary source (not shown) as is known or available in the field. Similarly, the instrument 950 further includes a manual handle 955 that secures one end of the shank 905, and that enables an endodontist to safely and ergonomically hold the instrument 950 while manually performing the treatment.

FIGS. 10A, 10B illustrate an electrically operated instrument 1000, and a manually operated instrument 1050 that is generally similar in design and function to the electrically operated instrument 1000, and therefore only one instrument will be described in detail. The electrically operated instrument 1000 generally includes an elongated, tapered shank 1005 that defines a plurality of roughened cylindro-conical sections 1010, 1011, 1012, that are separated by a plurality of spirally (or helically) shaped sections 1015, 1016.

The cylindro-conical section 1010 of the instrument 1000 comprise striated grooves with cutting edges separated by smooth or sandblasted areas and further includes at its forwardmost end, a tip 1020 that may be cutting or non-cutting, depending on the desired application. The length of the shank 1005 ranges from approximately 12 mm to 32 mm, and its width preferably varies from No. 10 to 40. The taper of the instrument preferably ranges from approximately 2% to 10%. In a preferred embodiment, the whole instrument will be sandblasted.

Section 1010 is intended to penetrate root canal blockages while section 1015 serves to debride and to shape the opened path.

The instruments illustrated in FIGS. 10A, 10B provide better penetration results than the instruments in FIG. 9. They are preferred in case of hard hypercalcifications and resistant paste.

FIGS. 11A, 11B respectively illustrate an electrically operated instrument 1100, and a manually operated instrument 1150 that is generally similar in design and function to the electrically operated instrument 1100, and therefore only one instrument will be described in detail. The electrically operated instrument 1100 generally includes an elongated, tapered shank 1105 that defines a plurality of roughened cylindro-conical sections 1110, 1111, which are separated by a plurality of spirally (or helically) shaped sections 1115, 1116, 1117.

The spiral section 1115 of the instrument 1100 further includes at its forwardmost end, a tip 1120 that may be cutting or non-cutting, depending on the desired application. The length of the shank 1105 ranges from approximately 12 mm to 32 mm, and its width preferably varies from No. 10 to 40. The taper of the instrument preferably ranges from approximately 2% to 10%.

In the exemplary embodiment of FIGS. 11A. 11B, the cylindro-conical sections 1110, 1111 may be striated with groves with cutting edges separated by smooth or sandblasted areas. In a preferred embodiment, the whole instrument will be sandblasted.

Figure 12A:
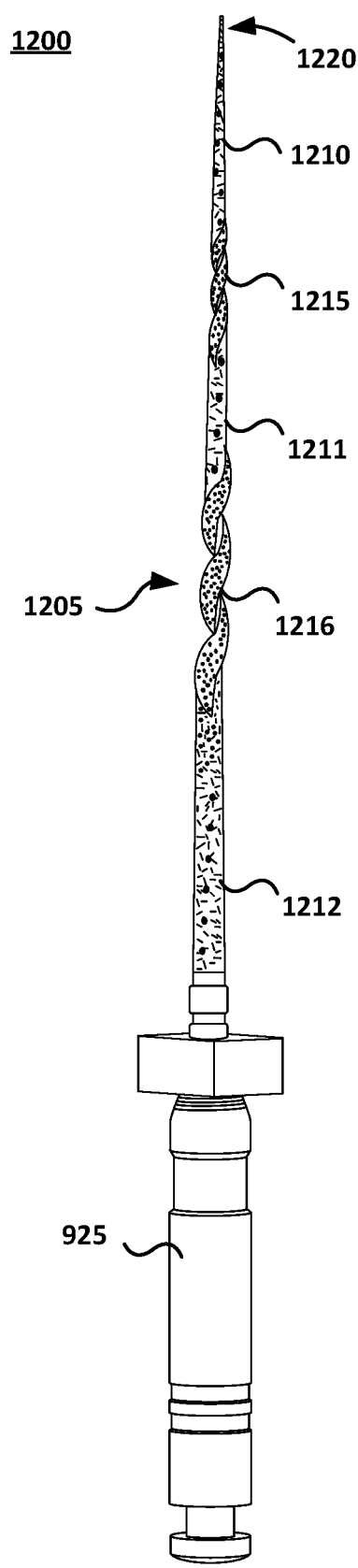
FIGS. 12A and 12B represent two schematic illustrations of an exemplary hand operated (FIG. 12B) and electrically rotating (FIG. 12A) instrument having a conical tip and a long, generally tapered sand blasted shank that defines a series of cylindro-conically shaped areas (or sections) separated by spirally shaped sections, wherein the cylindro-conically shaped areas (or sections) are roughened by, for example, transversally grooved striations with cutting edges separated by restricted sand blasted areas, according to preferred embodiments of the present invention.
Figure 12B:
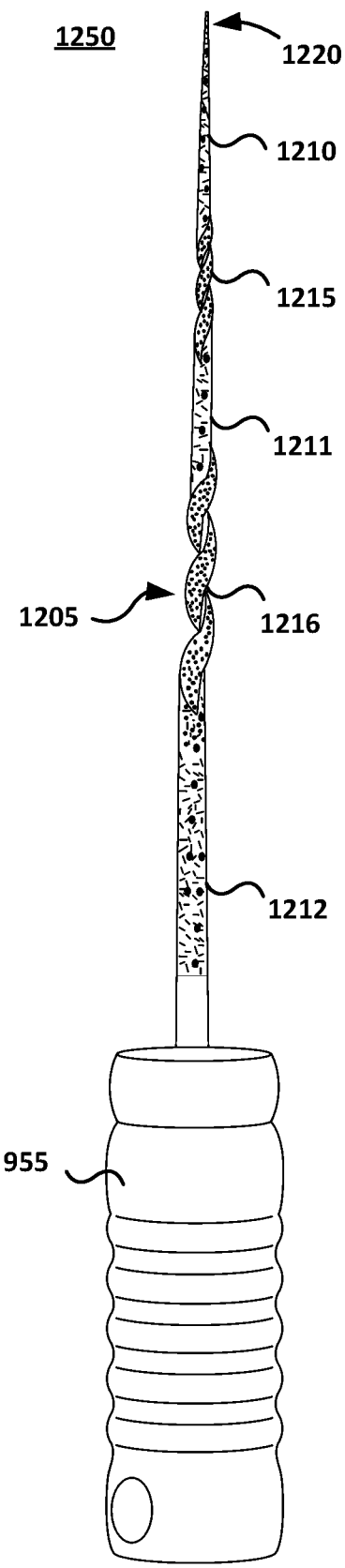

FIGS. 12A, 12B illustrate yet other alternative embodiments of an electrically operated instrument 1200 and a manually operated instrument 1250, that are respectively, generally similar in design and function to the instruments 1000, 1050 of FIGS. 10A, 10B.

The electrically operated instrument 1200 generally includes an elongated, tapered shank 1205 that defines a plurality of roughened cylindro-conical sections 1210, 1211, 1212, that are separated by a plurality of spirally (or helically) shaped sections 1215, 1216. The cylindro-conical section 1210 of the instrument 1200 further includes at its forwardmost end, a tip 1220 that may be cutting or non-cutting, depending on the desired application. The length of the shank 1205 ranges from approximately 12 mm to 32 mm, and its width preferably varies from No. 10 to 40. The taper of the instrument preferably ranges from approximately 2% to 10%.

In the exemplary embodiment of FIGS. 12A, 12B, the cylindro-conical sections 1210, 1211, 1212 may be striated with groves with cutting edges separated by smooth or sandblasted areas while the spiral sections may be similarly sandblasted.

Having described the exemplary instruments embodied by the present invention, the methods of using these instruments will now be described in more detail, in connection with the drawings, particularly FIGS. 13 through 18.

Methods of Using the Instruments in Treating Root Canals

The new root canal treatment method generally aims to bypass root obstructions resulting from fractured instruments and to penetrate hypercalcification, to bypass dental shoulders, to penetrate resistant paste, curved root canals and other obstructions resulting from a previous root treatment. More specifically, the following exemplary treatment methods will now be described in more detail:

I—Method of treating a root canal that does not exhibit signs of a resistive path, obstruction, or blockage.

II—Method of bypassing root obstructions resulting from fractured instruments.

III—Method of penetrating root obstructions resulting from hypercalcification.

IV—Method of penetrating root obstructions resulting from curved root canals.

V—Method of bypassing root obstructions resulting from a shoulder.

VI—Method of penetrating root obstructions resulting from a previous root canal treatment.

Figure 18:
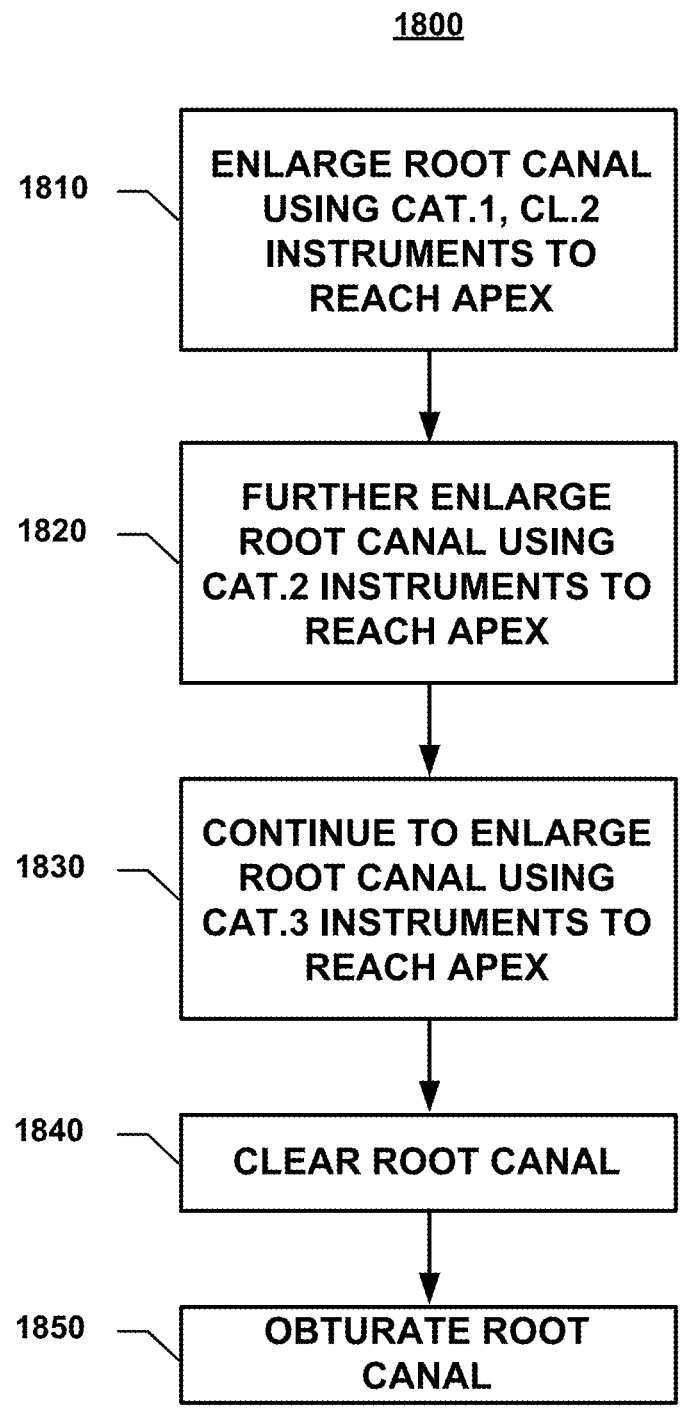
FIG. 18 is a flow chart that illustrates the endodontic treatment process that does not exhibit signs of a resistive path, obstruction, or blockage, by selectively using the instruments of FIGS. 1B, 2B, 3B, and 6 through 8 according to the present invention.

I—Method of Treating a Root Canal that does not Exhibit Signs of a Resistive Path, Obstruction, or Blockage FIGS. 13A, 13B, 13C, and 13D and illustrate an exemplary tooth 1300 that does not exhibit signs of a resistive path, obstruction, or blockage. With further reference to FIG. 18, an endodontic treatment method 1800 is performed according to the following steps:

As illustrated in FIG. 13A, the endodontist starts at step 1810 of FIG. 18, to enlarge the root canal 1312 by selectively and sequentially using the instruments (denoted with numeral reference 1320) of the $1^{st}$ category, $2^{nd}$ class (e.g., FIGS. 1B, 2B, 3B and 6), starting for example with a manual instrument No. 8 having an approximate 2% taper, in increasing order to No. 15 with an approximate 2% taper ($1^{st}$ category, $2^{nd}$ class), exerting a manual force with a clockwise 90-degree rotation along the arrow F, in order to reach the apex 1333 of the root canal 1312.

As illustrated at step 1820 of FIG. 18, the endodontist further enlarges the root canal 1312 using for example, an electrically rotating instrument (denoted with numeral reference 1330) selected from the $2^{nd}$ category (e.g., FIG. 7), starting with No. 10 having an approximate 2% taper, in an increasing order to No. 20, along the arrow F in order to reach the apex of the root canal 1333.

As illustrated at step 1830 of FIG. 18 and in FIG. 13B, the endodontist continues to enlarge the root canal 1312 using for example, an electrically rotating instrument 1320, which is selected from the $3^{rd}$ category (e.g., FIG. 8), starting with an instrument from No. 20 to No. 25 with an approximate 4% taper to No. 25 with an approximate 6% taper whenever possible, in order to reach the apex 1333 of the root canal 1312. In a preferred embodiment, an instrument with No. 20 having an approximate 4% taper can be used.

As illustrated at step 1840 and also in FIG. 13C, upon completion of step 1830 as described earlier, the endodontist clears the widened root canal 1312 of any debris, as is known in the field, in preparation for the final obturation step.

As illustrated at step 1850 and also in FIG. 13D, the endodontist obturates the root canal 1312 with the appropriate filling material 1350, as is known in the field.

II—Method of Bypassing Root Obstructions Resulting from Fractured Instruments

Figure 19A:
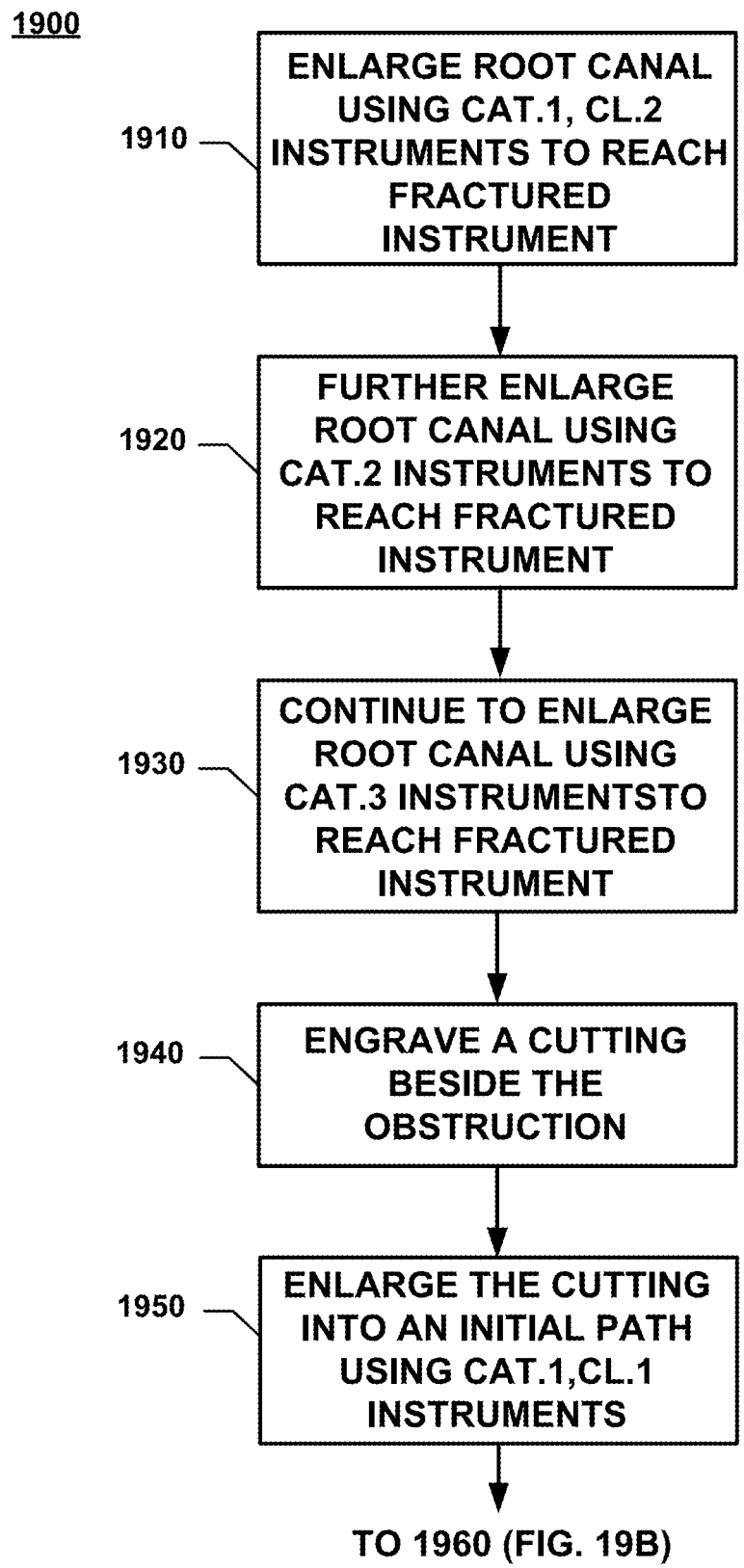
Figure 19B:
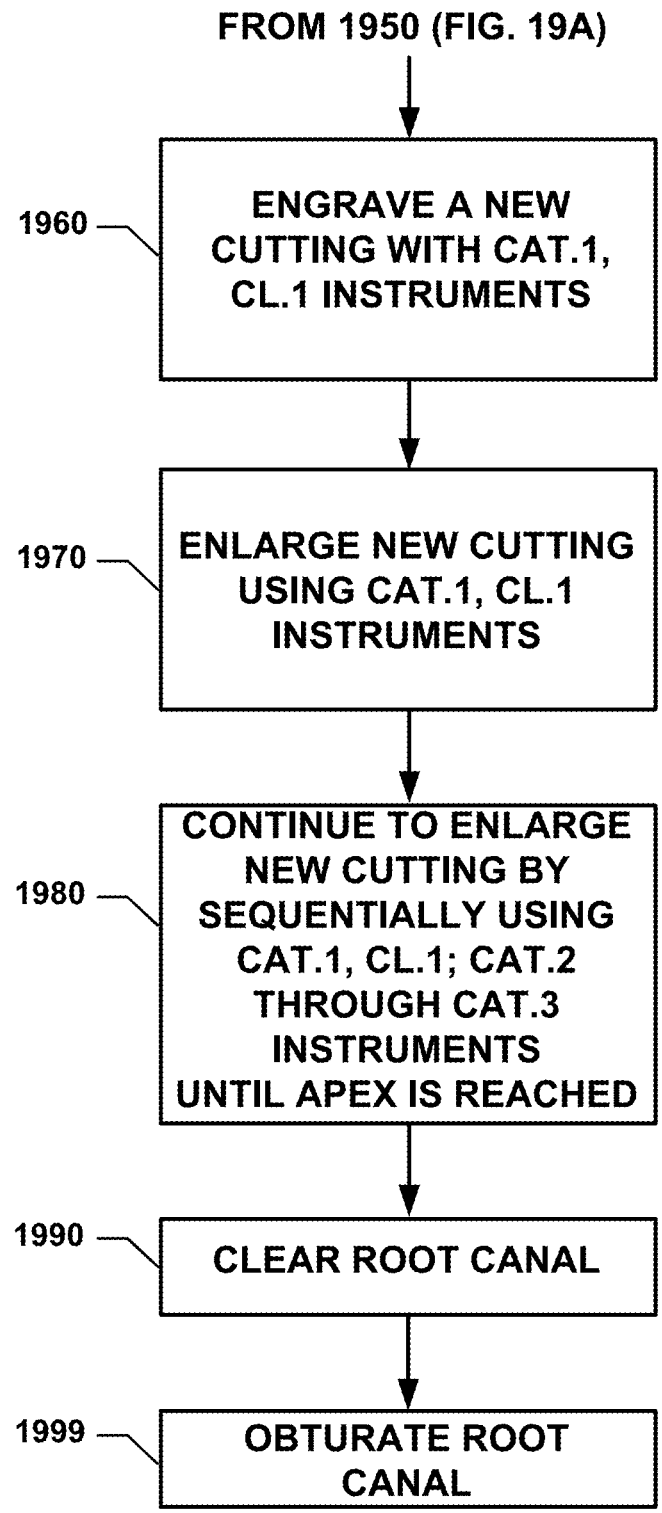

FIGS. 14A, 14B, 14C, 14D, 14E, and 14 illustrate an exemplary tooth 1400 having a root canal 1412 within which an obstruction, such as a fragment 1410 of a fractured instrument (such as a file) is lodged by a previous root canal treatment. With further reference to FIGS. 19A and 19B, the treatment method 1900 is performed according to the following steps:

As further illustrated in FIG. 14A, at step 1910 of FIG. 19A, the endodontist enlarges the root canal 1412 by selectively and sequentially using the instruments (denoted with numeral reference 1420) of the $1^{st}$ category, $2^{nd}$ class (e.g., FIGS. 1B, 2B, 3B and 6), starting for example with a manual instrument No. 8 having an approximate 2% taper, in increasing order to No. 15 with an approximate 2% taper ($1^{st}$ category, $2^{nd}$ class), exerting a manual force with a clockwise 90 degrees rotation in along the arrow F, in order to reach the fractured instrument 1410 of the root canal 1412.

As illustrated at step 1920 of FIG. 19A and also in FIG. 14B, the endodontist further enlarges the root canal 1412 using for example, an electrically rotating instrument (denoted with numeral reference 1430) selected from the $2^{nd}$ category (e.g., FIG. 7), starting with No. 10 having an approximate 2% taper, in an increasing order to No. 20, in order to reach the fractured instrument in the root canal 1412.

As illustrated at step 1930 of FIG. 19A and also in FIG. 14B, the endodontist continues to enlarge the root canal 1412 using for example, an electrically rotating instrument (denoted with numeral reference 1430) selected from the $3^{rd}$ category (e.g., FIG. 8), starting with an instrument from No. 20 to No. 25 with an approximate 4% taper to No. 25 with an approximate 6% taper whenever possible. In a preferred embodiment, an instrument with No. 20 having an approximate 4% taper can be used to reach the fractured instrument in the root canal 1412.

For relatively simple cases, each new instrument (whether manual or electrically operated) is capable of bypassing the obstruction after enlarging the root canal 1412 according to above steps 1910, 1920, and 1930.

However, for more complex cases, and as illustrated by step 1940 of FIG. 19A and FIG. 14C, the endodontist resumes process 1900 by engraving a cutting 1444 beside the obstruction 1410, using new manual instruments, selected for example from the $1^{st}$ category, $1^{st}$ class, and preferably made of NiTi, No. 20, with an approximate 4% taper and a cutting tip (e.g., 120, 220, 320, 520 or eventually 420). The endodontist starts by exerting a manual force with a clockwise 90-degree rotation, and then withdraws the instrument by exerting an anti-clockwise rotation of the same angle, along the rotational arrow M. The relatively large cross sectional surface of the cutting tip 120, 220, 320, 520 or eventually 420 avoids opening a false canal when exerting a relatively high manual force.

The endodontist then enlarges the cutting 1444 into an initial path using a manual instrument (also denoted by the numeral reference 1440) selected for example from the 1$^{st}$ category, 1$^{st}$ class, and preferably made of NiTi, No. 20 with an approximate 4% taper and a non-cutting tip (e.g. 1633 B), exerting a manual force with a clockwise 90 degrees rotation along the arrow F, in order to preserve the initial path 1444.

As further illustrated in FIG. 14D, and in order to further penetrate the obstructed canal through the opened initial path 1444, the endodontist uses, at step 1960 of FIG. 19B, a manual instrument 1450 selected for example from the 1$^{st}$ category, 1$^{st}$ class, and preferably made of stainless steel, No. 20, having an approximate 2% taper with a cutting tip (e.g., 1633 A), for engraving a new cutting 1445, adjacent to the obstruction 1410, exerting a manual force with a clockwise 90-degree rotation along the arrow F. As described earlier, the smooth surfaces or areas 111 enable the shaft of the instrument 1450 to slide between the dentine wall 333 and the obstruction 1410, such as a fractured file, and the new cutting 1445, and the advancement of the instrument 1450 in the direction of the apex 1466.

Thereafter, the endodontist preferably uses, at step 1970 of FIG. 19B, to manually enlarge the newly opened cutting 1445 using an instrument (still denoted by 1450) selected for example from the 1$^{st}$ category, 1$^{st}$ class, and preferably made of stainless steel, No. 20, having an approximate 2% taper with a non-cutting tip (e.g., 1633 B).

The endodontist continues to enlarge the new path 1445 using a manual instrument (still denoted by 1450) selected for example from the 1st category, 1$^{st}$ class, and preferably made of NiTi, No. 20, having an approximate 4% taper with a cutting tip (e.g., 1633 A), followed by No. 20 having an approximate 4% taper with a non-cutting tip (e.g., 1633 B), in order to preserve the new path 1445.

In case the endodontist encounters difficulty in penetrating the root canal 1412, and whenever suitable, the endodontist may use a manual instrument 1440 (FIG. 14C) selected for example from the 1$^{st}$ category, 1$^{st}$ class, and preferably made of stainless steel, No. 20, having an approximate 2% taper with a cutting tip (e.g., 1633 A), followed by No. 20 having an approximate 2% taper with a non-cutting tip (e.g., 1633 B).

Alternatively, the endodontist may use a manual instrument 1450 (FIG. 14D) selected for example from the 1$^{st}$ category, 1$^{st}$ class, and preferably made of stainless steel, No. 15, having an approximate 2% taper with a cutting tip (e.g., 1633 A) in order to create a new cutting. This step is then followed by the use of a manual instrument selected for example from the 1$^{st}$ category, 1$^{st}$ class, and preferably made of stainless steel, No. 15, having an approximately 2% taper with a non-cutting tip (e.g., 1633 B), in order to preserve the newly opened path 1445.

In the event the instruments that are collectively referenced by 1450 fail to open or enlarge the required path 1445, the endodontist uses a smaller instrument preferably made of stainless steel, in the same sequence as described above, until the apex 1466 of the root canal 1412 is reached (step 1980), as follows: The path 1445 is enlarged manually, at step 1970, using sequentially hand operated stainless steel instruments with cutting and non-cutting tips from No. 8 or 10 until No. 20 of approximately 2% taper (1$^{st}$ category 1$^{st}$ class). The introduction of the instrument with a cutting tip is followed by the use of the same instrument with a non-cutting tip. Alternatively, use may be made of NiTi instrument 1450, No. 20 with an approximate 4% taper (1$^{st}$ category, 1$^{st}$ class), first with instrument 1450 having a cutting tip (e.g., 1633 A), then with instrument 1450 having a non-cutting tip (e.g., 1633 B).

The endodontist starts at step 1980 with electrically operated instruments of the 1$^{st}$ category, 1$^{st}$ class, which are preferably made of NiTi, and having a non-cutting tip (e.g., 1633 B), in an increasing order starting by using instrument no. 10 with approximately 2% taper until reaching No. 20 of approximately 2% taper.

Then, the endodontist continues with electrically operated instruments of the 2$^{nd}$ category, which are preferably made of NiTi, and having a non-cutting tip (e.g., 1633 B), in an increasing order instruments from No. 20 to No. 25 having approximately 2% taper.

Finally, the endodontist completes the enlargement of the path 1445 with electrically operated instruments of the 3$^{rd}$ category, which are preferably made of NiTi, and having a non-cutting tip (e.g., 1633 B), namely instrument No. 20 or 25 having approximately 4% taper.

It should be noted that the use of files (or instruments) having a beveled tip is recommended only in case the aforesaid instruments fail to engrave a cutting or path adjacent to the fractured instrument 1410, particularly in case of difficult hypercalcification cases or in the case the cross section of the fractured instrument 1410 is relatively large.

As illustrated at step 1990 and also in FIG. 14E, upon completion of step 1980 as described earlier, the endodontist clears the widened root canal 1445 of any debris, as is known in the field, in preparation for the final obturation step.

As illustrated at step 1999 and also in FIG. 14F, the endodontist obturates the root canal 1445 with the appropriate filling material 1446, as is known in the field. It should be noted that the obturation may be performed with or without removing the fragment 1410 of the fractured instrument.

Although the conventional art describes that the use of electrically operated files may not be proper in case of treating dental roots with fractured instruments 1410, the present invention teaches that it is possible to directly reach the apex 1466, at step 1999, by using electrically operated instruments with non-cutting tips, made of NiTi, after step 1970, in an increasing order from No. 10 with an approximate 2% taper (selected from the 1$^{st}$ category, 1$^{st}$ class) to No. 20 with an approximate 4% taper (selected from the 1$^{st}$ category, 1$^{st}$ class), followed by the sequential use of instruments selected from the 2$^{nd}$ and 3$^{rd}$ categories, as deemed appropriate by the endodontist.

Alternatively, the present invention teaches that in less difficult cases, it is possible from step 1950 to directly reach the apex 1466, step 1999, by using electrically operated instruments with non-cutting tips, made of NiTi, starting by enlarging the initial path 1444 with No. 20 having an approximate 4% taper (1$^{st}$ category, 1$^{st}$ class); then using in an increasing order NiTi instruments with non-cutting tip from No. 10 with an approximate 2% taper (selected from the 1$^{st}$ category, 1$^{st}$ class) to No. 20 with an approximate 4% taper (selected from the 1$^{st}$ category, 1$^{st}$ class), followed sequentially by instruments selected from the 2$^{nd}$ and 3$^{rd}$ categories, as deemed appropriate by the endodontist.

It is worth noting that the root canal is irrigated with sodium hypochloride and EDTA (Ethylenediaminetetraacetic acid) at each relevant step of process 1900.

Figure 23A:
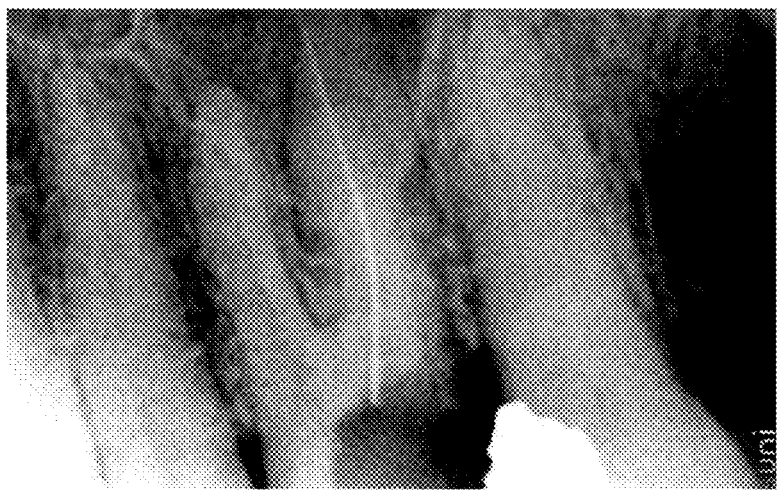
Figure 23B:
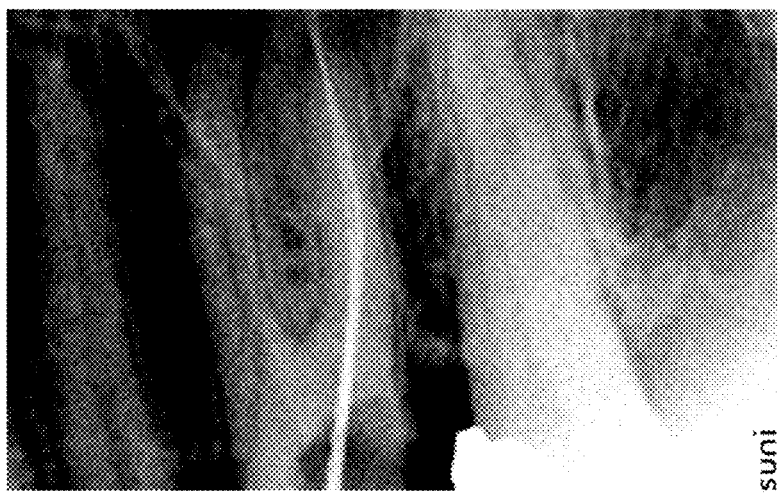
Figure 23C:

The following X-Rays FIGS. 23A, 23B, 23C, 24A, 24B, 24C, 25A, 25B, 25C, 25D, 26A, 26B, 27A, 27B, 27C, 28A, 28B, 28C, 28D, 29A, 29B, 29C, 30A, 30B, 31A, 31B, 32A, 32B, 32C, 33A, 33B, 33C, 33D, 34, 35, 36A, 36B, 36C, 37A, 37B, 38A, and 38B provide supporting illustrations of this novel process 1900:

FIG. 23A shows a broken file in tooth no. 26 blocking the totality of the root canal. FIG. 23B shows the bypassing of the broken file and reaching the apex with the new instrument according to the present invention. FIG. 23C shows the fully hermetic obturation of the treated root canal.

Figure 24A:
Figure 24B:
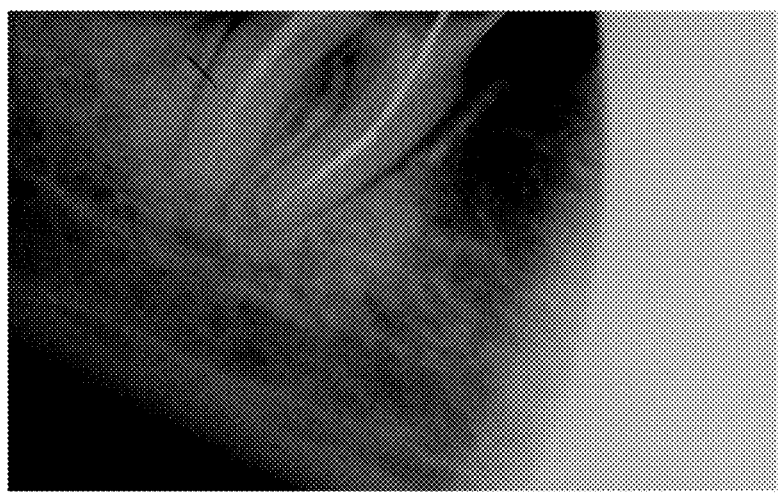
Figure 24C:

FIG. 24A shows a broken file in tooth no. 46 blocking the totality of the root canal. FIG. 24B shows the bypassing of the broken file and the piercing of the hypercalcification and reaching the apex with the new instrument according to the present invention. FIG. 24C shows the fully hermetic obturation of the treated root canal.

Figure 25A:
Figure 25B:
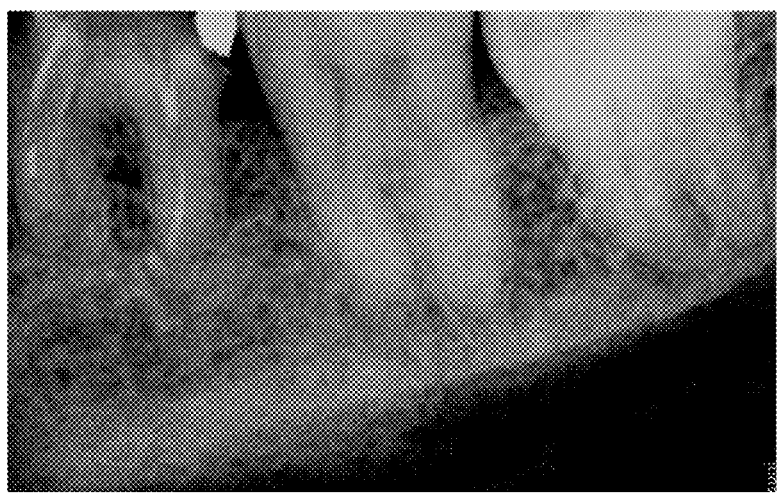
Figure 25C:
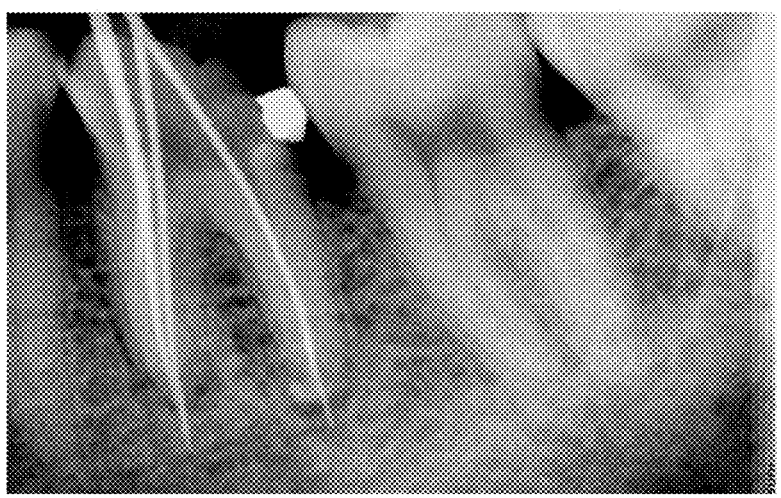
Figure 25D:
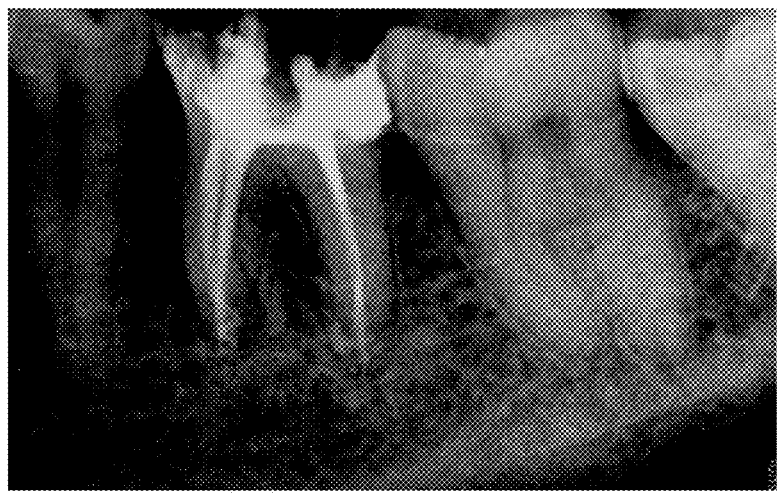

FIG. 25A shows a hypercalcification, a shoulder, and a broken file in the mesial canals of tooth no. 36. FIG. 25B shows the broken file. FIG. 25C shows the bypassing of the broken file, the penetration of the shoulder and the piercing of the hypercalcification in the $2^{nd}$ mesial canal and reaching the apex with the new instrument, according to the present invention. FIG. 25D shows the fully hermetic obturation of the treated root canal.

Figure 26A:
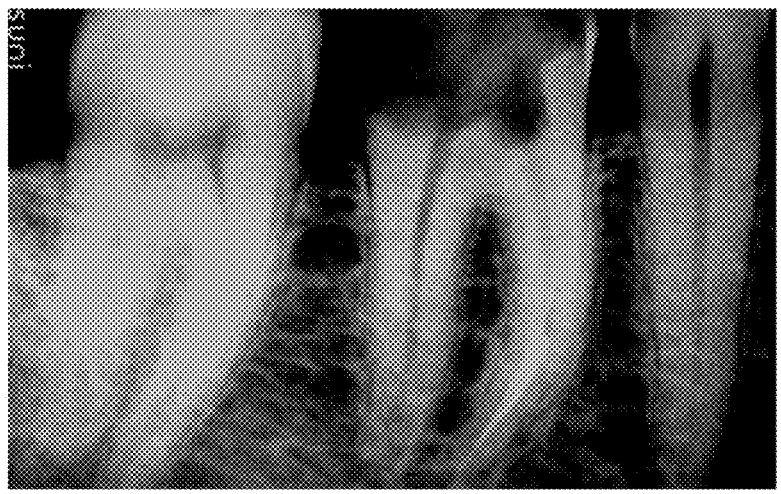
Figure 26B:
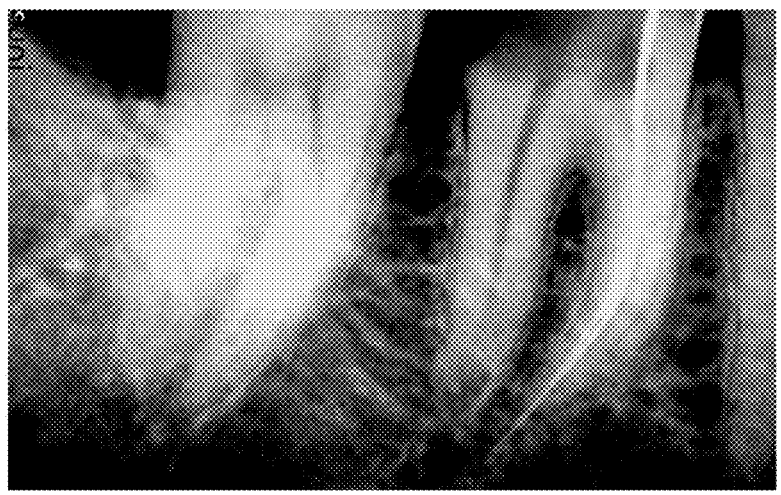

FIG. 26A shows two fractured files in the mesio vestibular canal in tooth no. 46, blocking the totality of the root canal. FIG. 26B shows the bypassing of the two broken files and reaching the apex with the new instrument according to the present invention.

Figure 27A:
Figure 27B:
Figure 27C:

FIG. 27A shows three broken files in tooth no. 35 blocking the totality of the root canal. FIG. 27B shows the bypassing of the three broken files and reaching the apex with the new instrument according to the present invention. FIG. 27C shows the fully hermetic obturation of the root canal.

Figure 28A:
Figure 28B:
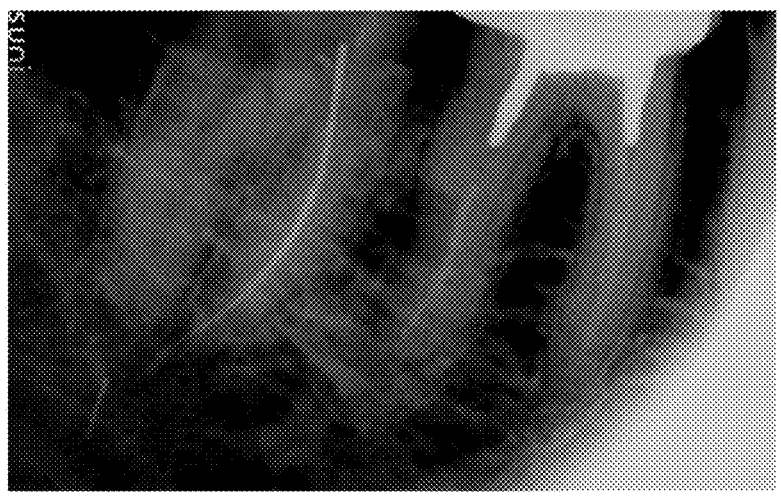
Figure 28C:
Figure 28D:
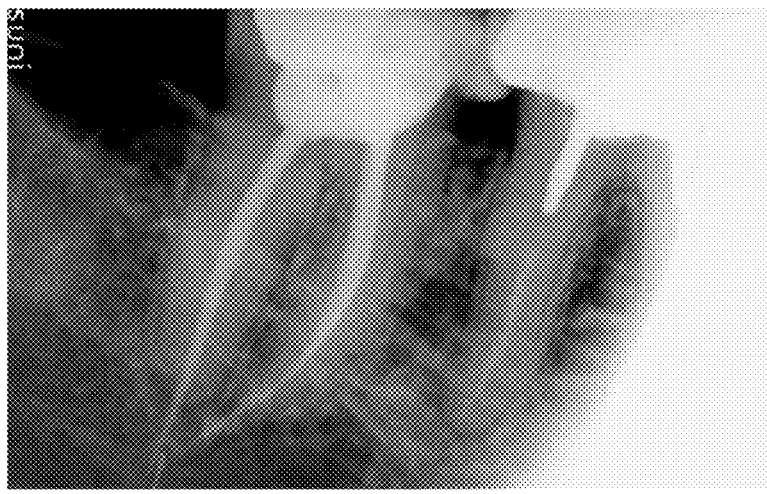

FIG. 28A shows a broken file in tooth no. 47 blocking the totality of the root canal due to hypercalcification. FIG. 28B shows a cutting made with the new instrument according to the invention, and a second broken file. FIG. 28C shows the bypassing of the two broken files and the piercing of the hypercalcification and reaching the apex with the new instrument according to the present invention. FIG. 28D shows the fully hermetic obturation of the treated root canal.

More specifically, and as a comparative illustration, instead of using the new instruments according to the invention, a conventional file was used to enlarge the cutting and to bypass the broken file. However, the conventional file was broken, as expected, while the new instrument according to the invention has successfully bypassed the two broken files, pierced the hypercalcification, and reached the apex, without making a false canal (FIG. 28C).

Figure 29A:
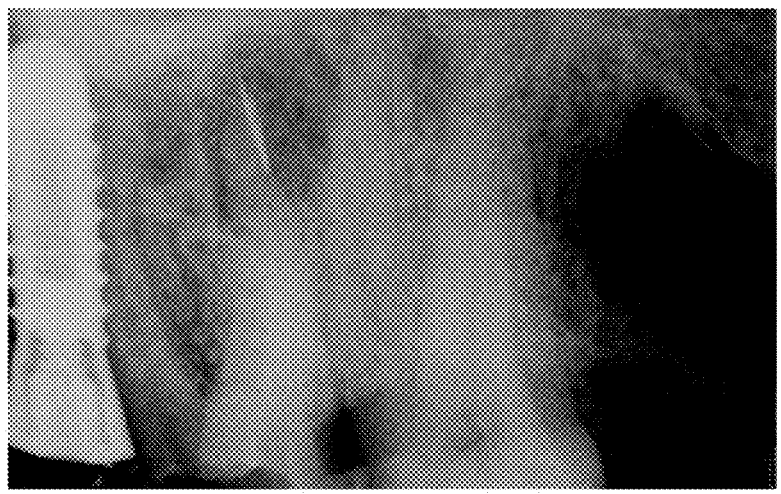
Figure 29B:
Figure 29C:
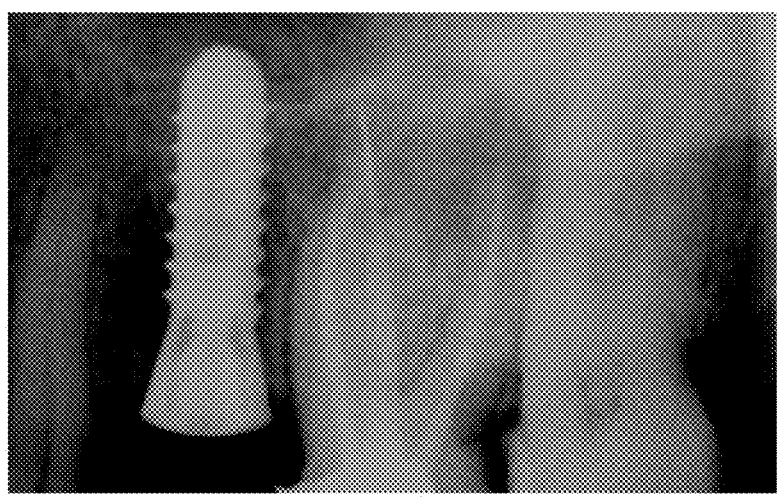

FIG. 29A shows two superposed broken files in tooth no. 26 blocking the third apical of the root canal. FIG. 29B shows the bypassing of the broken files and reaching the apex with the new instrument according to the present invention. FIG. 29C shows the fully hermetic obturation of the treated root canal.

Figure 30A:
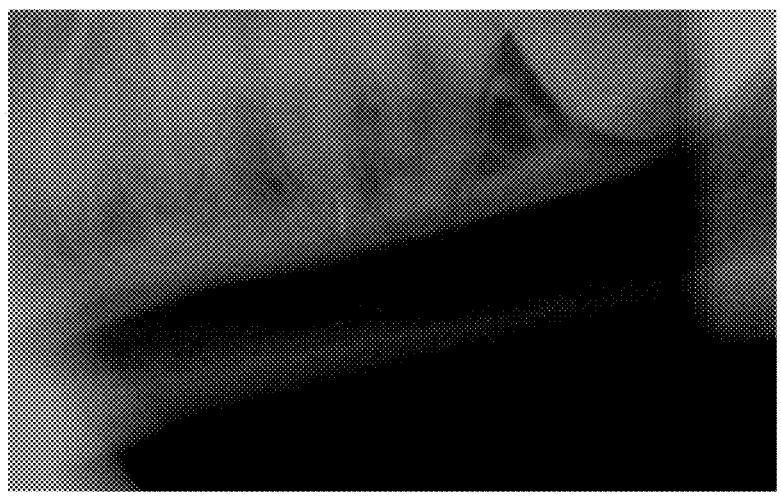
Figure 30B:
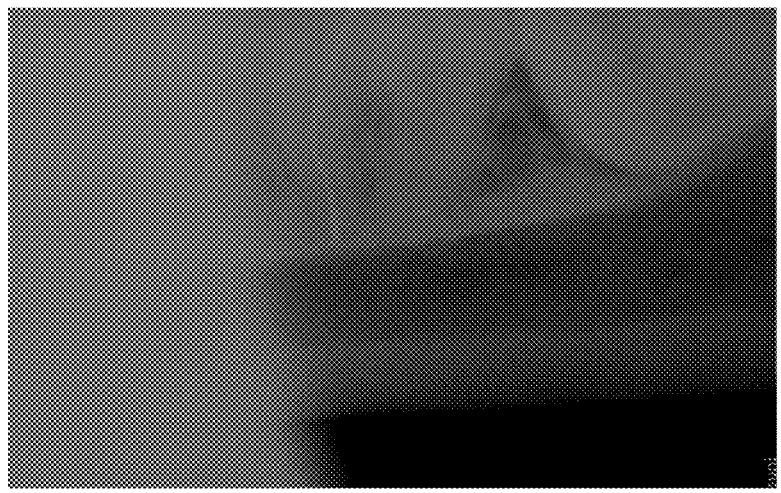

FIG. 30A shows a broken file in tooth no. 37 blocking the third apical of the root canal. FIG. 30B shows the bypassing of the broken file and reaching the apex with the new instrument according to the present invention.

Figure 31A:
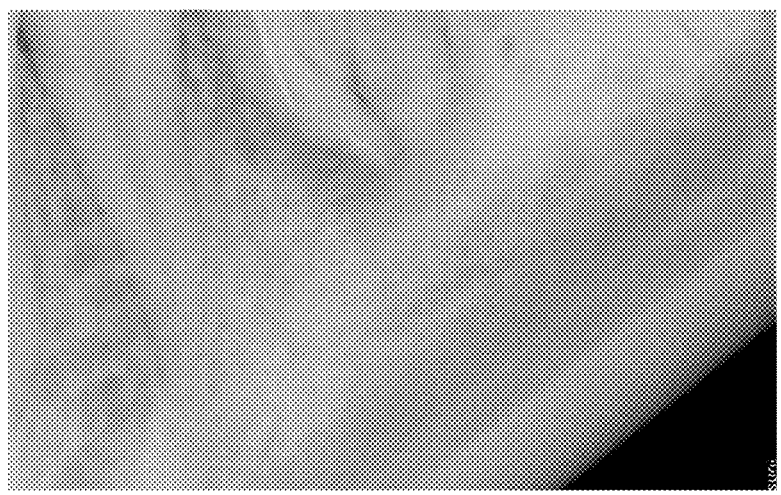
Figure 31B:
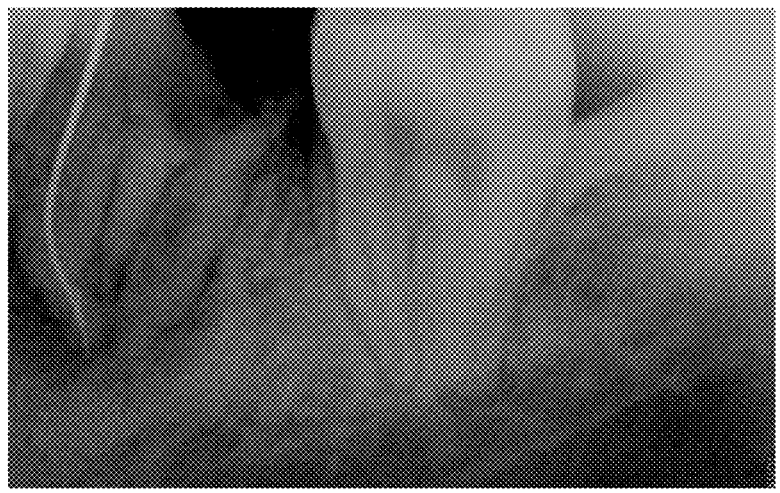

FIG. 31A shows a false canal and two broken files in tooth no. 36 blocking the apex of the root canal. FIG. 31B shows the avoidance of the false canal and the bypassing of the broken file and reaching the apex with the new instrument according to the present invention.

Figure 32A:
Figure 32B:
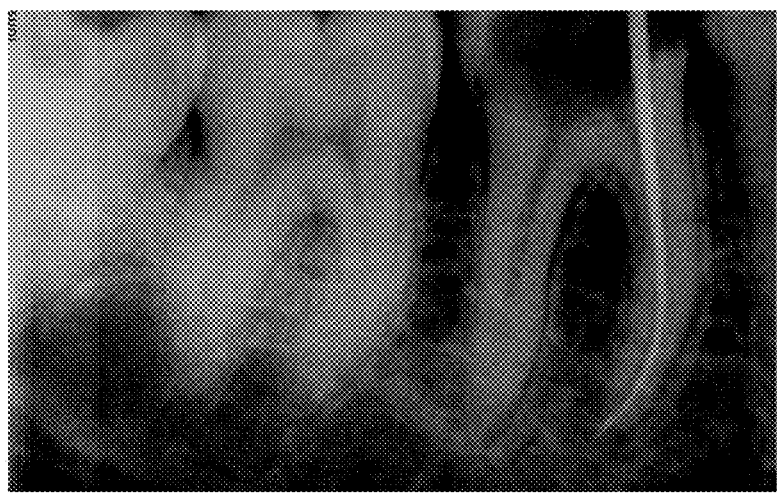
Figure 32C:
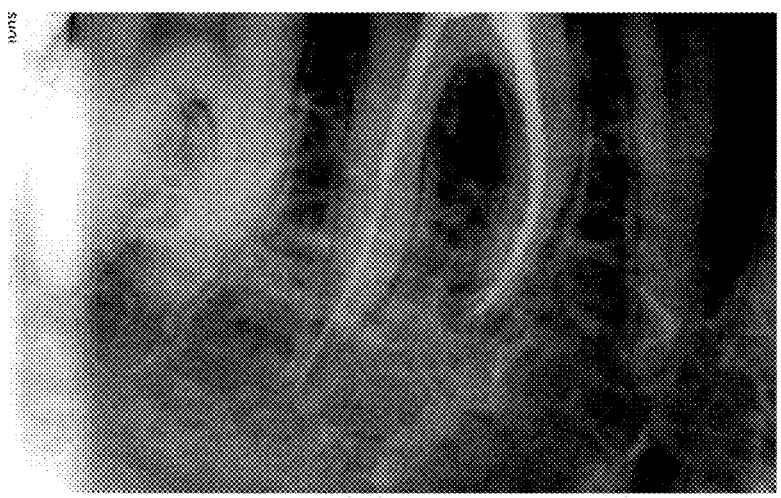

FIG. 32A shows a broken file in the third apical of the mesial canal tooth no. 46 blocking the apex. FIG. 32B shows the bypassing of the broken file and reaching the apex with the new instrument according to the present invention. FIG. 32C shows the fully hermetic obturation of the treated root canal.

III—Method of Penetrating Root Obstructions Resulting from Hhypercalcification

Figure 15A:
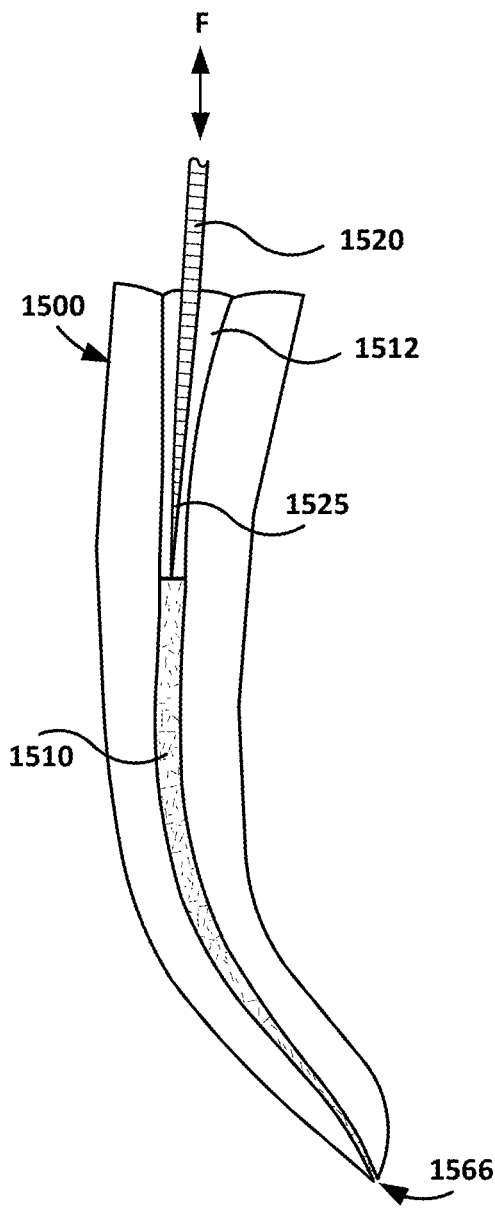
Figure 15B:
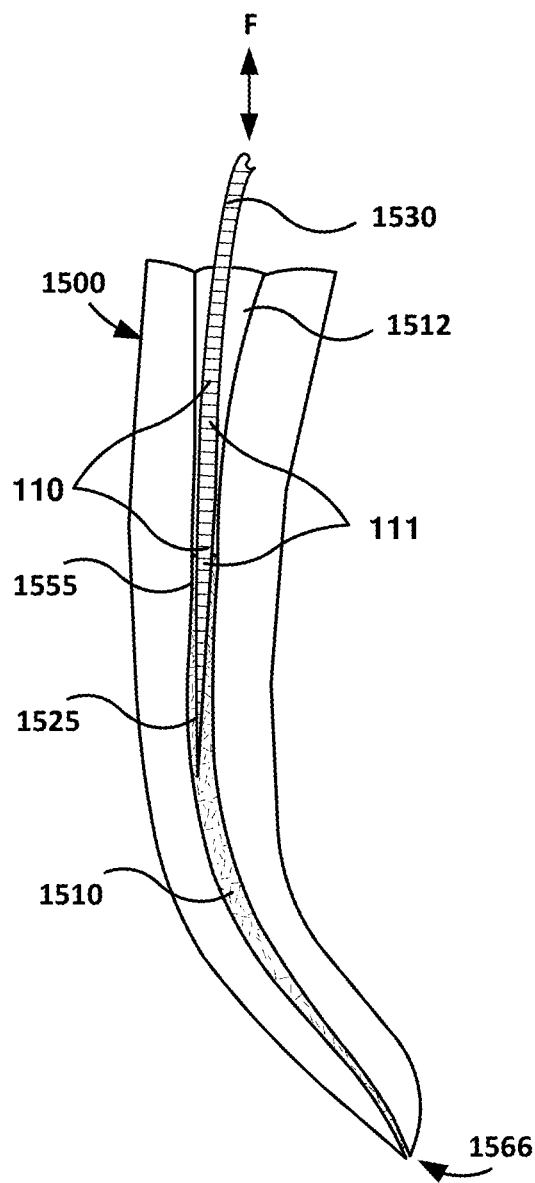
Figure 15C:
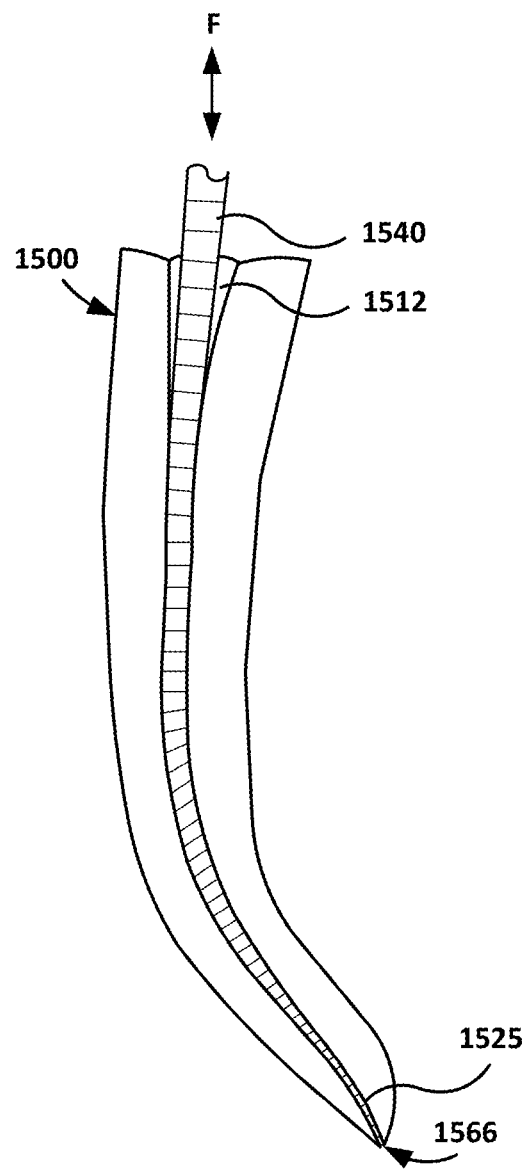
Figure 20A:
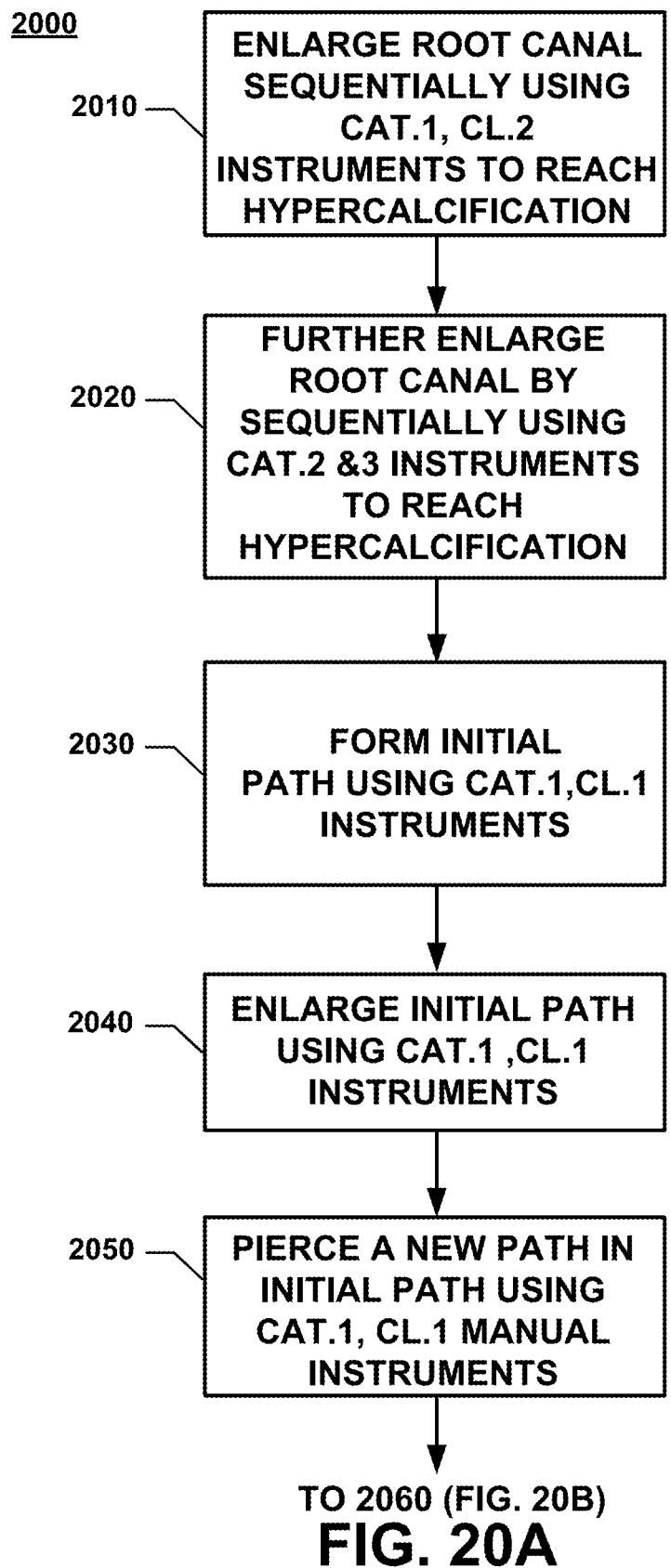
Figure 20B:
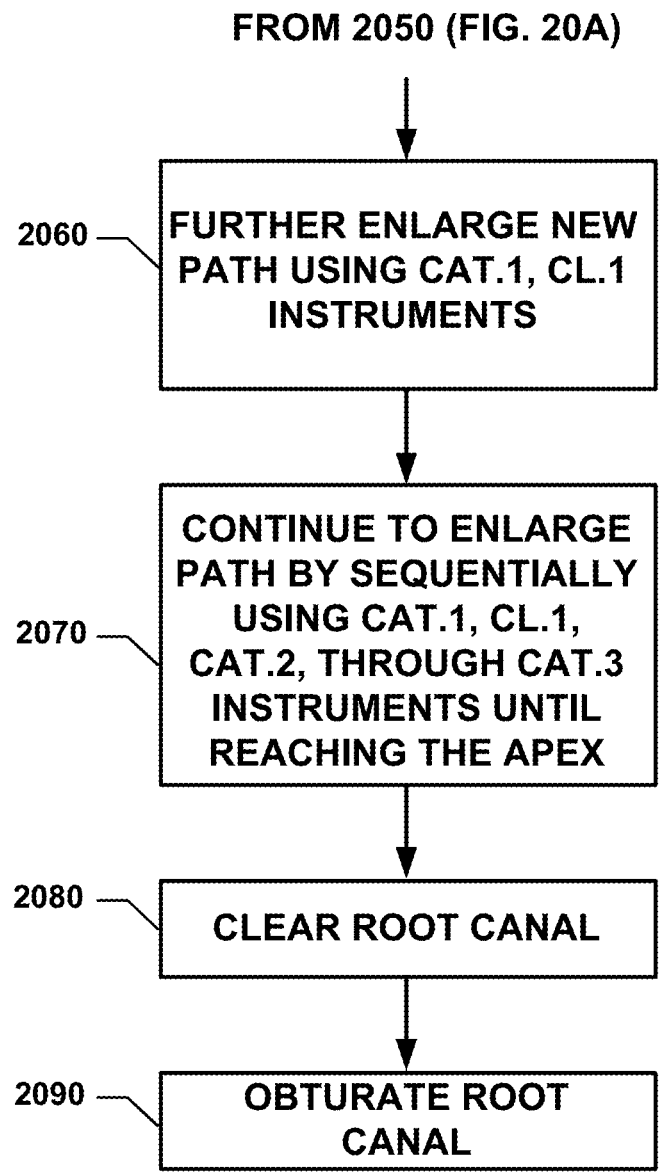

FIGS. 15A, 15B, and 15C illustrate an exemplary tooth 1500 having a root canal 1512 that is blocked or obstructed by hypercalcification 1510. With further reference to FIGS. 20A, 20B, the treatment method 2000 is performed according to the following steps:

As further illustrated in FIG. 15A, the endodontist enlarges, at step 2010 of FIG. 20A, the root canal 1512 of the tooth 1500 by starting with a manual instrument selected from the $1^{st}$ category, $2^{nd}$ class, No. 8, with an approximate 2% taper, in an increasing order to an instrument selected from the $1^{st}$ category, $2^{nd}$ class, No. 15, with an approximate 2% taper, exerting a manual force with a clockwise 90-degree rotation along the arrow F, until the tip 1525 of the instrument 1520 reaches the hypercalcification 1510.

The endodontist then further enlarges, at step 2020, the root canal 1512 using electrically rotating instruments 1520 selected from the $2^{nd}$ category, starting with No. 10 with an approximate 2% taper, in an increasing order to No. 20 with an approximate 2% taper, until reaching the hypercalcification.

Still at step 2020, the endodontist continues to enlarge the root canal 1512 using electrically rotating new instruments that are selected from the $3^{rd}$ category, using files from No. 20 to No. 25 with an approximate 4% taper, to No. 25 with an approximate 6% taper whenever possible. Preferred results were obtained with a No. 20 instrument with an approximate 4% taper, until reaching the hypercalcification 1510.

The endodontist then starts piercing the hypercalcification 1510 at step 2030, to form an initial path 1555 therewithin, using manual NiTi instruments 1530 selected from the $1^{st}$ category, $1^{st}$ class, No. 20 with an approximate 4% taper, and a cutting tip 1525. The endodontist exerts a manual force with a clockwise 90-degree rotation. The endodontist then withdraws the instrument 1530 by exerting an anti-clockwise rotation of the same angle. The relatively large cross-sectional surface of the cutting tip 1525 avoids opening a false canal when exerting a relatively high manual force.

The endodontist continues at step 2040 by enlarging the initial path 1555, using a manual NiTi instrument that is selected from the $1^{st}$ category, $1^{st}$ class, No. 20 having an approximate 4% taper with a non-cutting tip (e.g., 1633 B), in order to preserve the opened initial path 1555.

The endodontist then continues to step 2050, in order to enlarge the initial path 1555 and to pierce the remainder of the hypercalcification, by using a manual stainless steel instrument selected from the $1^{st}$ category, $1^{st}$ class, No. 20, with an approximate 2% taper and a cutting tip 1525. It is recommended to continue to manually enlarge the initial path 1555 using a manual stainless steel instrument selected from the $1^{st}$ category, $1^{st}$ class, No. 20 with an approximate 2% taper and a non-cutting tip (e.g., 1633 B).

At step 2060, the endodontist further enlarges the initial path 1555 by first using a manual NiTi instrument selected from the $1^{st}$ category, $1^{st}$ class, No. 20, with an approximate 4% taper and a cutting tip 1555, and then using a manual NiTi instrument also selected from the $1^{st}$ category, $1^{st}$ class, No. 20, with an approximate 4% taper and a non-cutting tip (e.g., 1633 B), so as to preserve the initial path 1555.

In the event the endodontist encounters difficulty in penetrating the root canal 1512, manual stainless steel instrument 1540 selected from the $1^{st}$ category, $1^{st}$ class, No.

20, with an approximate 2% taper and a cutting tip 1525 is used whenever feasible. Otherwise, the endodontist uses a manual stainless steel instrument 1540 selected from the $1^{st}$ category, $1^{st}$ class, No. 15, with an approximate 2% taper and a cutting tip 1525, in order to pierce a new path that is adjacent to the initial path 1555. This step is followed by the use of a manual stainless steel instrument 1540 selected from the $1^{st}$ category, $1^{st}$ class, No. 15, with an approximate 2% taper and a non-cutting tip, in order to preserve the new adjacent path. In case the instruments 1540 fail to open the required path, the endodontist uses smaller stainless steel instruments in the same sequence until reaching the apex 1566 of the root canal 1512 (FIG. 15C).

Once the initial path 1555 is enlarged, at step 2060, the initial path 1555 is gradually enlarged manually using sequentially hand operated stainless steel instruments with cutting and non-cutting tips from No. 8 or 10 until No. 20 of approximately 2% taper ($1^{st}$ category $1^{st}$ class). The introduction of the instrument with a cutting tip is followed by the use of the same instrument with a non-cutting tip. Alternatively, if possible, a NiTi instrument also selected from the $1^{st}$ category, $1^{st}$ class, No. 20 with an approximate 4% taper and a cutting tip 1525 followed by the same instrument with a non-cutting tip (e.g., 1633 B), may be introduced. As described earlier, the smooth surfaces or areas 111 enable the shaft of the instrument 1530 (FIG. 15B) to slide and minimize the friction between the instrument 1530 and the hypercalcification 1510, and will further help in the advancement of the instrument 1530 in the direction of the apex 1566.

Once the initial path 1555 has been enlarged to the desired dimensions, the endodontist then uses, at step 2070, electrically operated NiTi instruments 1540 selected from the $1^{st}$ category, $1^{st}$ class, and instruments of the $2^{nd}$ category, with a non-cutting tip (e.g., 1633 B), followed by the use of instruments 1540 of the $3^{rd}$ category, with a non-cutting tip. In performing this step 2070, the endodontist sequentially uses in increasing order the instruments 1540 starting with instruments selected from the $1^{st}$ category, $1^{st}$ class, No. 10 to No. 20 with an approximate 2% taper, and then, instruments from No. 20 to No. 25 of approximately 2% taper of the $2^{nd}$ category and finally instrument No. 20 or 25 with an approximate 4% taper of the $3^{rd}$ category at the apex 1566.

As illustrated at step 2080 and also in FIG. 14E, upon completion of step 2070 as described earlier, the endodontist clears the widened root canal of any debris, as is known in the field, in preparation for the final obturation step.

As illustrated at step 2090 and also in FIG. 14F, the endodontist obturates the root canal with the appropriate filling material 1446, as is known in the field.

According to the another embodiment of the present invention, it is possible to directly reach the apex 1566, after step 2060, by using electrically operated NiTi instruments selected from the $1^{st}$ category, $1^{st}$ class with a non-cutting tip (e.g., 1633 B), in increasing order from No. 10 with an approximate 2% taper to No. 20 with an approximate 4% taper, followed by instruments of the $2^{nd}$ and $3^{rd}$ categories.

According to yet another embodiment of the present invention, in less difficult cases, the endodontist may be able to directly reach the apex 1566, after step 2040, by using electrically operated NiTi instruments selected from the $1^{st}$ category, $1^{st}$ class with a non-cutting tip (e.g., 1633 B), starting by enlarging the piercing with a No. 20 instrument having an approximate 4% taper. The process is resumed by using, in increasing order, instruments selected from the $1^{st}$ category, $1^{st}$ class, from No. 10 with an approximate 2% taper, to No. 20 with an approximate 4% taper of the $1^{st}$ category, $1^{st}$ class with a non-cutting tip, followed by non-cutting tip instruments of the $2^{nd}$ and $3^{rd}$ categories, as deemed appropriate by the endodontist.

It is worth noting that the root canal is irrigated with sodium hypochloride and EDTA (Ethylenediaminetetraacetic acid) at each relevant step of process 2000.

The following X-Rays (FIGS. 33A through 36C) provide supporting illustrations of this novel process 2000:

FIG. 24A shows a broken file in tooth no. 46 blocking the totality of the root canal. FIG. 24B shows the bypassing of the broken file and the piercing of the hypercalcification and reaching the apex with the new instrument according to the present invention. FIG. 24C shows the fully hermetic obturation of the treated root canal.

Figure 33A:
Figure 33B:
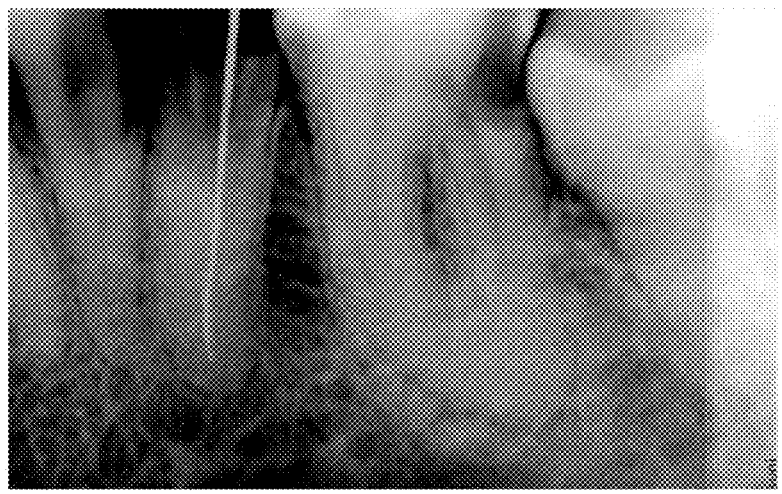
Figure 33C:
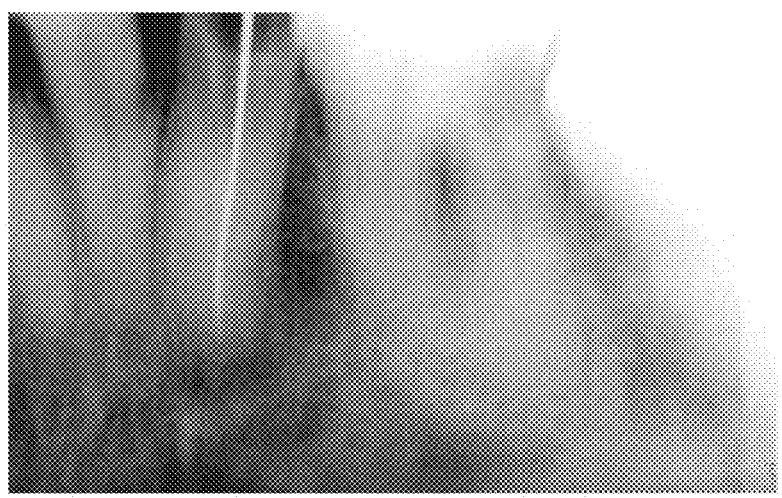
Figure 33D:
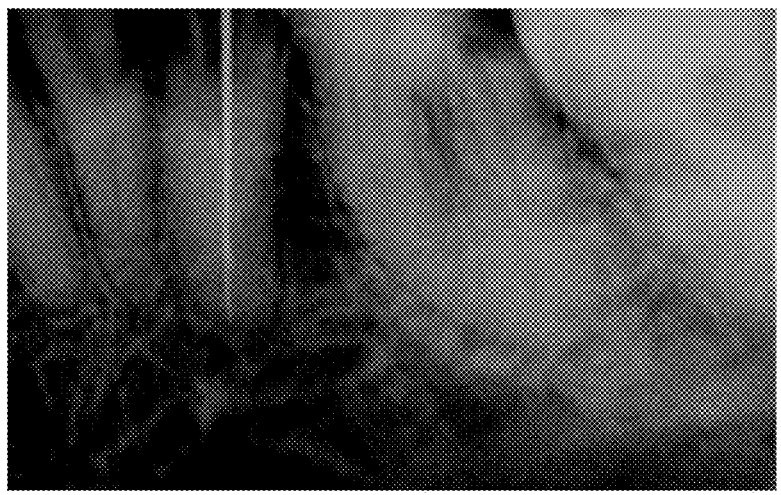

FIG. 33A shows an incomplete root treatment of tooth no. 35 due to hypercalcification blocking the third apical of the root canal. FIGS. 33B, 33C, and 33D show the piercing of the old resistant paste and progressively piercing the hypercalcification with the new instrument reaching the apex, according to the present invention.

Figure 34:

FIG. 34 shows a fully hermetic obturation of tooth no. 46 after piercing a hypercalcification and passing through an accentuated curved line.

Figure 35:
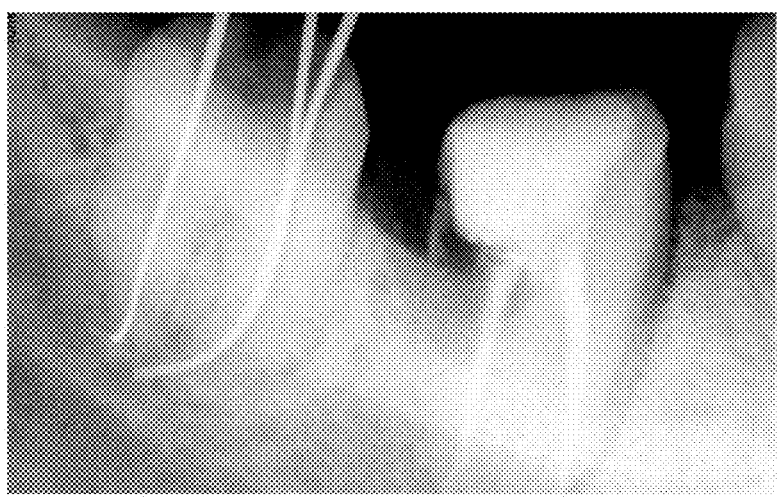

FIG. 35 shows a fully hermetic obturation of tooth no. 47 after piercing a hypercalcification and passing through an accentuated curved line.

Figure 36A:
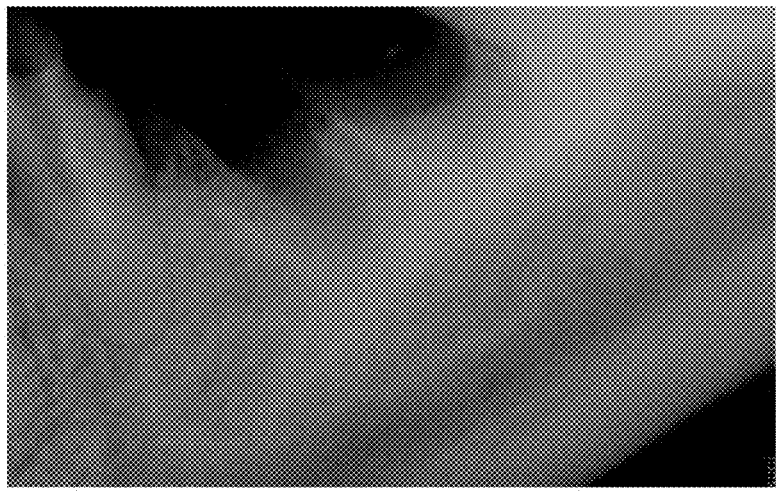
Figure 36B:
Figure 36C:
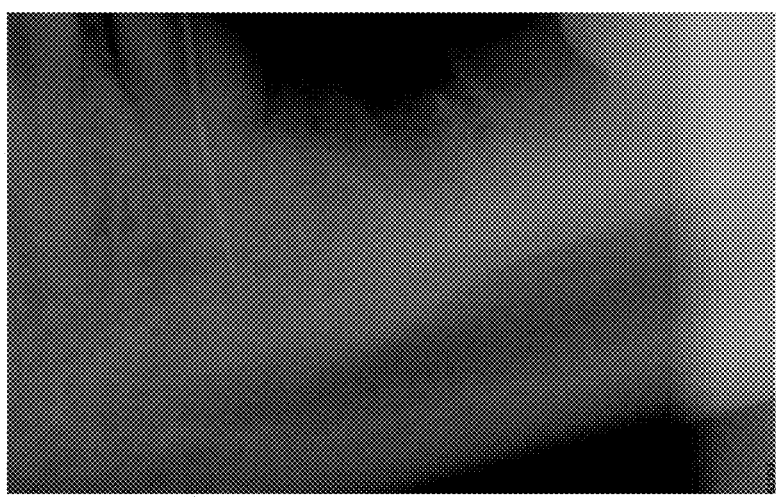

FIG. 36A shows a false canal and an incomplete root treatment of tooth no. 35 due to hypercalcification blocking about half the root canal. FIGS. 36B and 36C show the progressive piercing of the hypercalcification with the new instrument reaching the apex, according to the present invention.

IV—Method of Penetrating Root Obstructions Resulting from Curved Root Canals

As illustrated in FIGS. 13A, 13B, the instruments of the present invention may be used to penetrate root obstructions resulting from curved root canals. In this event, the instruments of the $2^{nd}$ category may be used followed by the instruments of the $3^{rd}$ category, until the apex of the root canal is reached, with at least an instrument No. 20 having an approximate 4% taper. In case of difficulty, instruments selected from the $1^{st}$ category, $2^{nd}$ class are used, starting in increasing order from No. 8 to No. 15, with an approximate 2% taper followed by the instruments of the $2^{nd}$ and $3^{rd}$ categories.

The following X-Rays (FIGS. 34, 35) provide supporting illustrations of this novel process:

FIG. 34 shows a fully hermetic obturation of tooth no. 46 after piercing a hypercalcification and passing through an accentuated curved line.

FIG. 35 shows a fully hermetic obturation of tooth no. 47 after piercing a hypercalcification and passing through an accentuated curved line.

V—Method of Bypassing Root Obstructions Resulting from a Shoulder

Figure 16A:
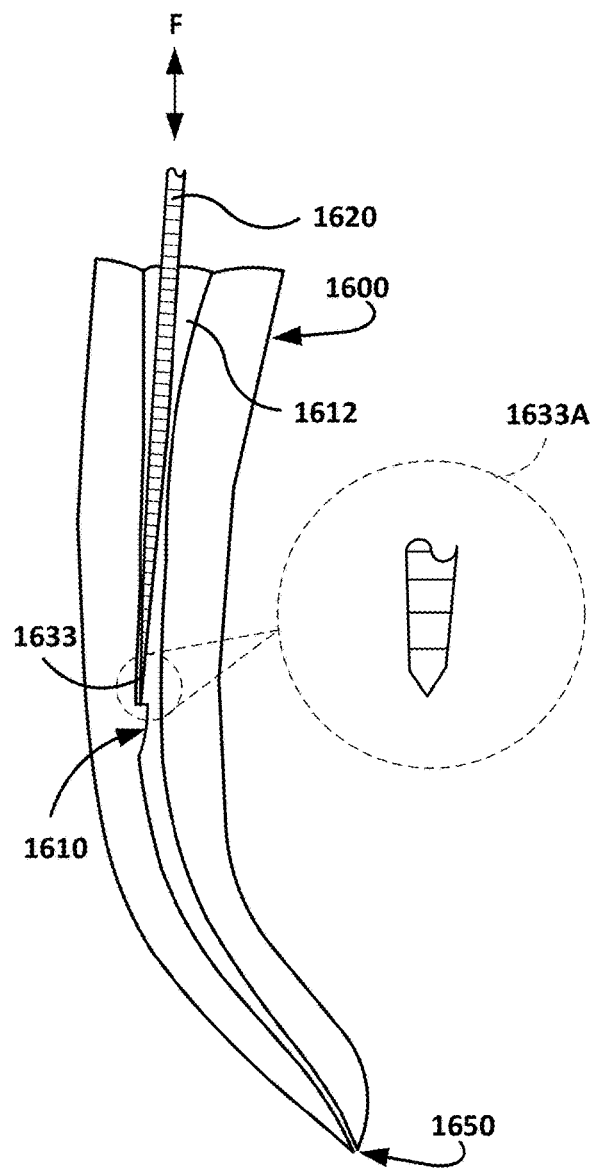
Figure 16B:
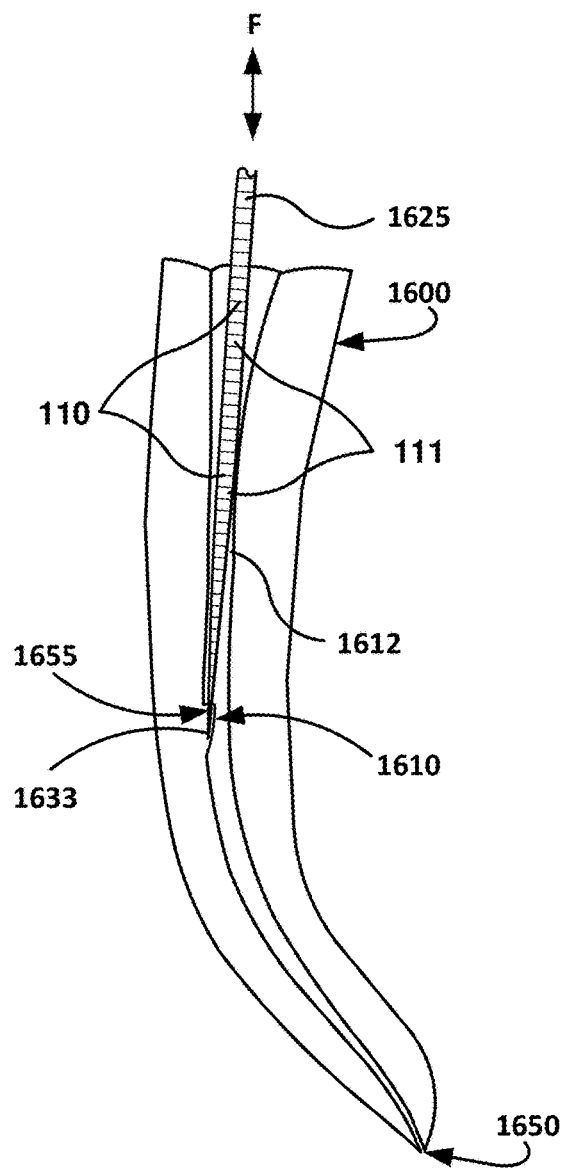
Figure 16C:
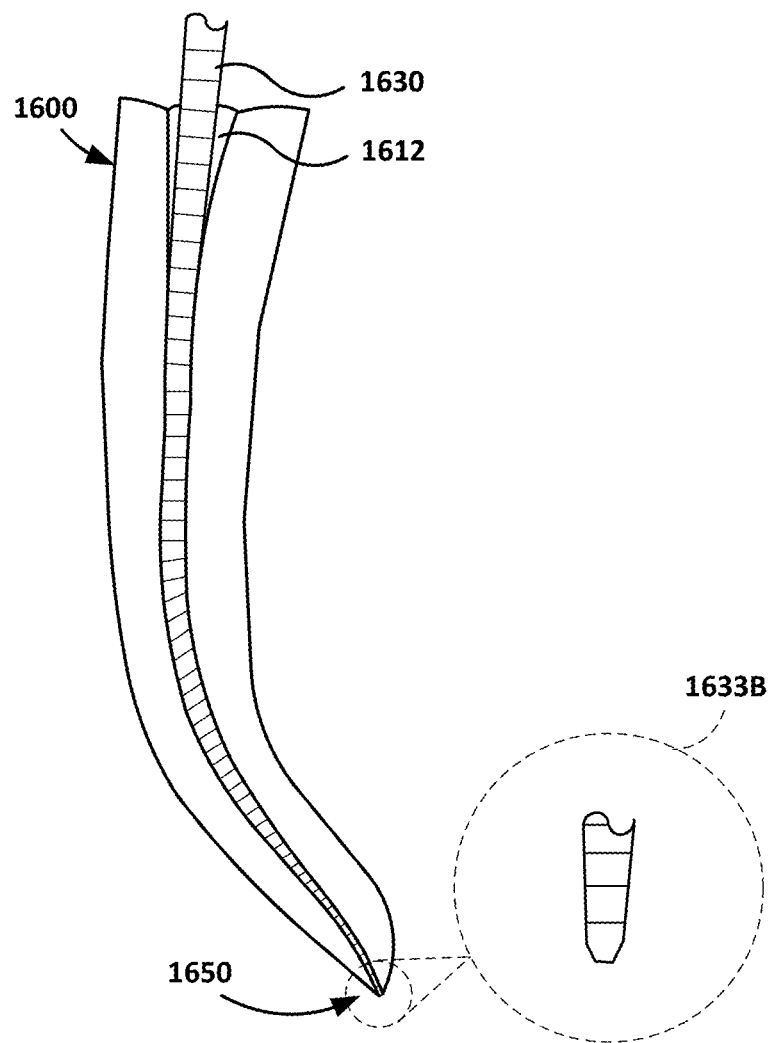
Figure 21A:
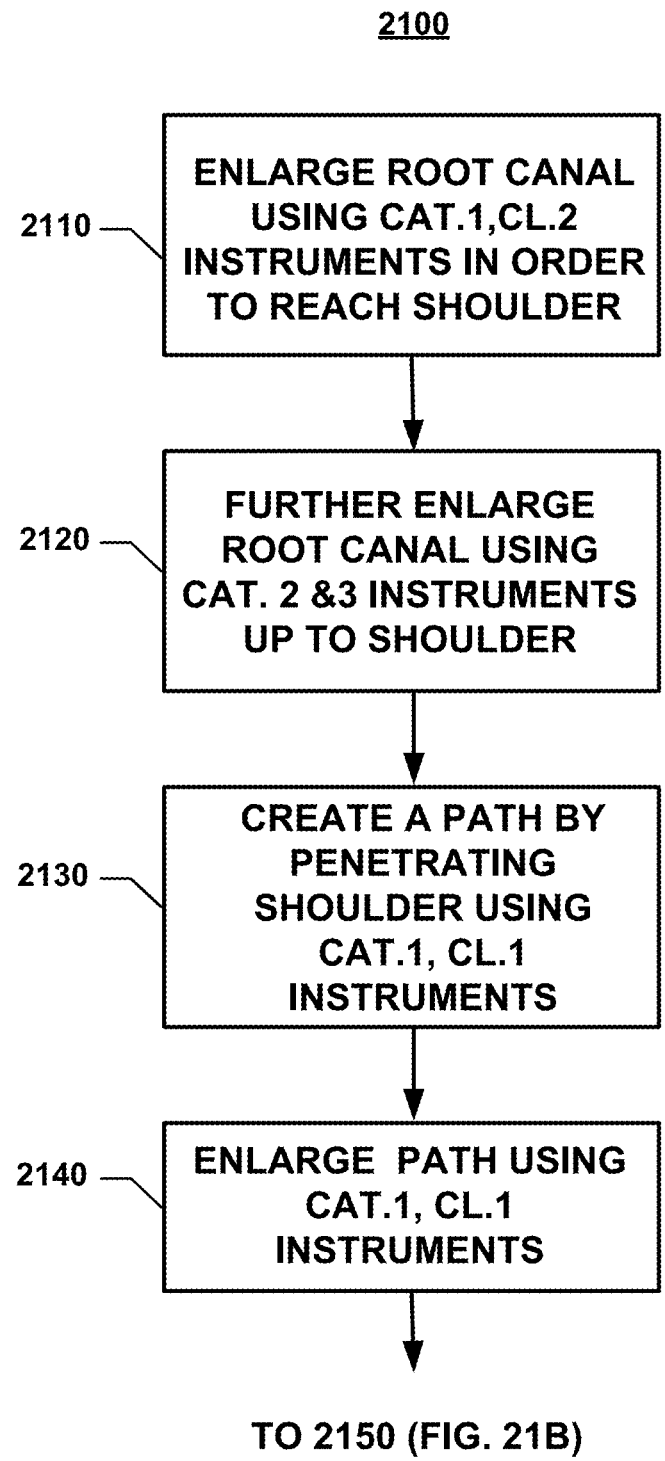
Figure 21B:
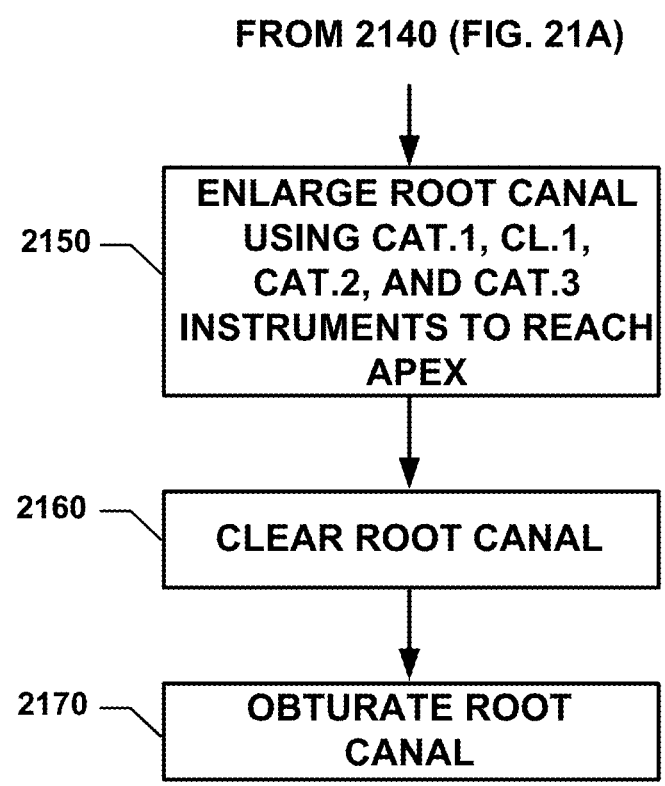

FIGS. 16A, 16B, and 16C illustrate an exemplary tooth 1600 having a root canal 1612 that is obstructed by a shoulder 1610. With further reference to FIGS. 21A and 21B, the treatment method 2100 is performed according to the following steps:

As further illustrated in FIG. 16A, the endodontist enlarges at step 2110 of FIG. 21A, the root canal 1612 of the tooth 1600 by using a manual instrument selected from the $1^{st}$ category, $2^{nd}$ class, No. 8 with an approximate 2% taper, in increasing order to No. 15 with an approximate 2% taper, in order to reach the shoulder 1610. For the purpose of illustration only, FIG. 16A shows an enlarged view of a cutting tip 1633A, while FIG. 16C shows an enlarged view of a non-cutting tip 1633B.

The endodontist then, at step 2120, further enlarges the root canal 1612 using electrically rotating instruments selected from the $2^{nd}$ category, starting with files No. 10 and an approximate 2% taper, in an increasing order to No. 20 with an approximate 2% taper, up to the shoulder 1610.

The endodontist continues to enlarge the root canal 1612 at step 2120, using electrically rotating instruments selected from the $3^{rd}$ category, starting with files No. 20 to 25 with an approximate 4% taper, and continuing with files No. 25 with an approximate 6% taper, whenever possible, until the shoulder 1610 is reached. Preferred results were obtained with a No. 20 instrument with an approximate 4% taper.

Once the portion of the root canal 1612 up to the shoulder 1610 has been widened to the desired dimensioned, the endodontist continues at step 2130 by creating a path 1655 through the shoulder 1610 using manual NiTi instruments 1620 selected from the $1^{st}$ category, $1^{st}$ class, No. 20 with an approximate 4% taper and a cutting tip 1633, by exerting a manual force in a push and pull motion along the arrow F. Thereafter, the instrument 1620 is withdrawn. The relatively large cross sectional surface of the cutting tip 1633A avoids opening a false canal when exerting a relatively high manual force.

At step 2140, the endodontist enlarges the path 1655 using a manual NiTi instrument selected from the $1^{st}$ category, $1^{st}$ class, No. 20 having an approximate 4% taper and a non-cutting tip 1633B in order to preserve the opened path 1655.

In case of difficulty in enlarging the path 1655, the endodontist uses a manual stainless steel instrument selected from the $1^{st}$ category, $1^{st}$ class, No. 20 having an approximate 2% taper with a cutting tip to penetrate the shoulder 1610 in a push and pull motion. Thereafter, it is recommended to manually enlarge the newly opened path 1655 using a manual stainless steel instrument selected from the $1^{st}$ category, $1^{st}$ class, No. 20 having an approximate 2% taper with a non-cutting tip 1633B.

Still at step 2140, the endodontist continues to enlarge the path 1655 using a manual NiTi instrument selected from the $1^{st}$ category, $1^{st}$ class, No. 20 having an approximate 4% taper and a cutting tip 1633. A manual NiTi instrument selected from the $1^{st}$ category, $1^{st}$ class, No. 20 and an approximate 4% taper with a non-cutting tip 1633B, may be used in order to preserve the newly opened path 1655.

In case of difficulty in penetrating the shoulder 1610, the endodontist uses a manual stainless steel instrument 1620 selected from the $1^{st}$ category, $1^{st}$ class, No. 15 having an approximate 2% taper and a cutting tip 1633, in order to penetrate the shoulder 1610. This step is followed by the use of a manual stainless steel instrument 1620 selected from the $1^{st}$ category, $1^{st}$ class, No. 15 having an approximate 2% taper with a non-cutting tip 1633B, in order to preserve the newly opened path 1655. In case the abovementioned instruments 1620 fail to open the required path 1655, the endodontist may use smaller stainless steel instruments 1620 in the same sequence until reaching the apex 1650.

Still at step 2140, the endodontist further enlarges the opened path 1655 manually until the introduction of stainless steel instruments selected from the $1^{st}$ category, $1^{st}$ class, No. 20 with an approximate 2% taper (alternatively NiTi instrument No. 20 with an approximate 4% taper) having a cutting tip 1633A and then a non-cutting tip 1633B, is made possible. As described earlier, the smooth surfaces or areas 111 enable the shaft of instrument 1625 (FIG. 16B) to slide around the shoulder 1610, to minimize the friction between the instrument 1625 and the shoulder 1610, and will further help in the advancement of the instrument 1625 in the direction of the apex 1650.

As further illustrated in FIG. 16C, once the path 1655 has been enlarged to the desired dimensions, the endodontist then uses, at step 2150, electrically operated NiTi instruments 1630 selected from the $1^{st}$ category, $1^{st}$ class, $2^{nd}$ category, with a non-cutting tip 1633B, followed by the use of a non-cutting tip instrument 1630 of the $3^{rd}$ category. In performing this step 2150, the endodontist sequentially uses, in increasing order, the instruments 1630 starting with instruments selected from the $1^{st}$ category, $1^{st}$ class, No. 10 to No. 20 with an approximate 2% taper, and then instruments from No. 20 to No. 25 of the $2^{nd}$ category and finally instrument No. 20 or 25 with an approximate 4% taper of the $3^{rd}$ category at the apex 1650.

As illustrated at step 2160 and also in FIG. 14E, upon completion of step 2140 as described earlier, the endodontist clears the widened root canal of any debris, as is known in the field, in preparation for the final obturation step.

As illustrated at step 2170 and also in FIG. 14F, the endodontist obturates the root canal with the appropriate filling material 1446, as is known in the field.

According to the another embodiment of the present invention, it is possible to directly reach the apex 1650, following step 2140, by using electrically operated instruments selected from the $1^{st}$ category, $1^{st}$ class, provided with non-cutting tips, in an increasing order from files No. 10 with an approximate 2% taper to files No. 20 with an approximate 4% taper, followed by instruments of the $2^{nd}$ and $3^{rd}$ categories as deemed appropriate by the endodontist.

According to yet another embodiment of the present invention, in less difficult cases, after enlarging the path 1655 by a manual NiTi instrument No. 20 ($1^{st}$ category, $1^{st}$ class) having an approximate 4% taper and a non-cutting tip (e.g., 1633 B) the endodontist, may be able to directly reach the apex 1650 by using electrically operated non-cutting tip NiTi instruments, starting by enlarging the path 1655 with a file No. 20 having an approximate 4% taper ($1^{st}$ category, $1^{st}$ class) then using in increasing order, non-cutting tip instruments selected from the $1^{st}$ category, $1^{st}$ class, from No. 10 to No. 20 having an approximate 2% taper and then No. 20 with an approximate 4% taper ($1^{st}$ category, $1^{st}$ class), and finally using instruments Nos. 20 to 25 having an approximate 2% taper of the $2^{nd}$ category followed by instruments No. 20 or 25 having a 4% taper of the $3^{rd}$ category.

It is worth noting that the root canal is irrigated with sodium hypochloride and EDTA (Ethylenediaminetetraacetic acid) at each relevant step of process 2100.

The following X-Rays (FIGS. 25A, 25B, 25C, 25D, 37A, 37B) provide supporting illustrations of this novel process 2100:

FIG. 25A shows a hypercalcification, a shoulder, and a broken file in the mesial canals of tooth no. 36. FIG. 25B shows the broken file. FIG. 25C shows the bypassing of the broken file, the penetration of the shoulder and the piercing of the hypercalcification in the $2^{nd}$ mesial canal and reaching the apex with the new instrument, according to the present invention. FIG. 25D shows the fully hermetic obturation of the treated root canal.

Figure 37A:
Figure 37B:

FIG. 37A shows a blockage in the mesial canal of tooth no. 16 due to a shoulder. FIG. 37B shows the elimination of the shoulder with the new instrument reaching the apex, according to the present invention.

Figure 22A:
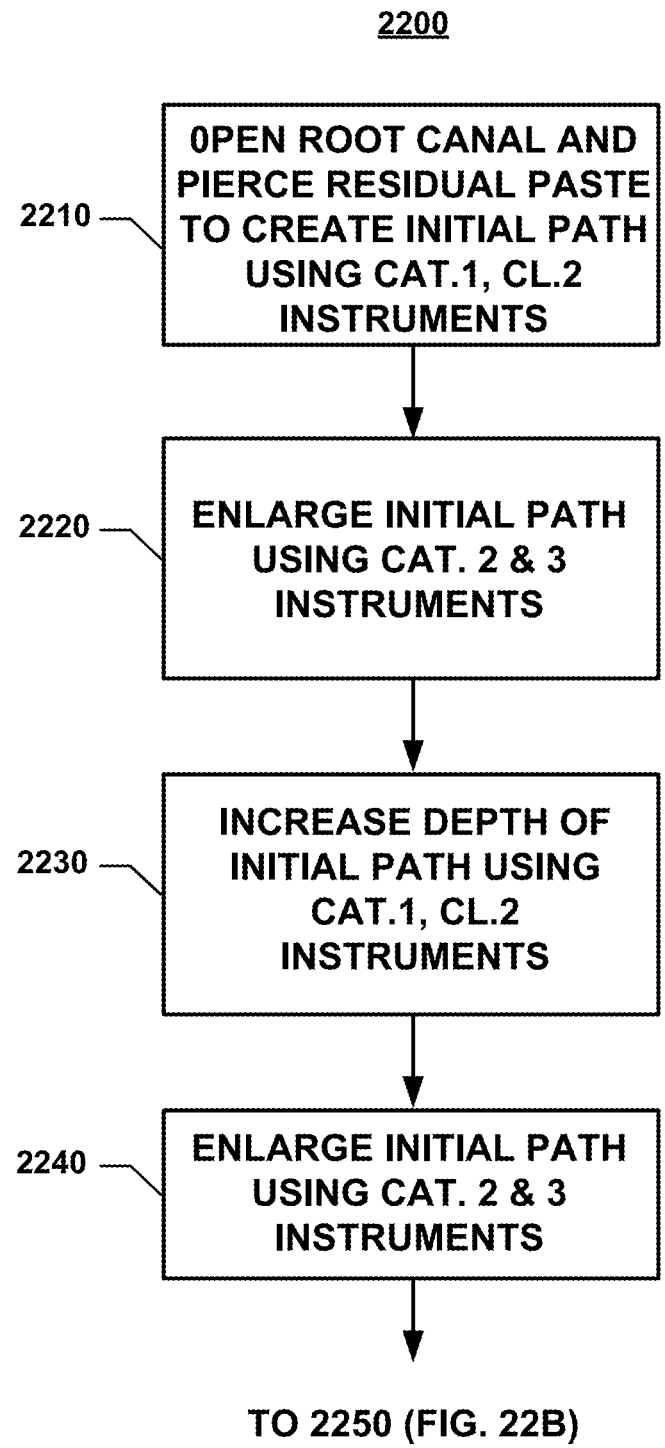
Figure 22B:
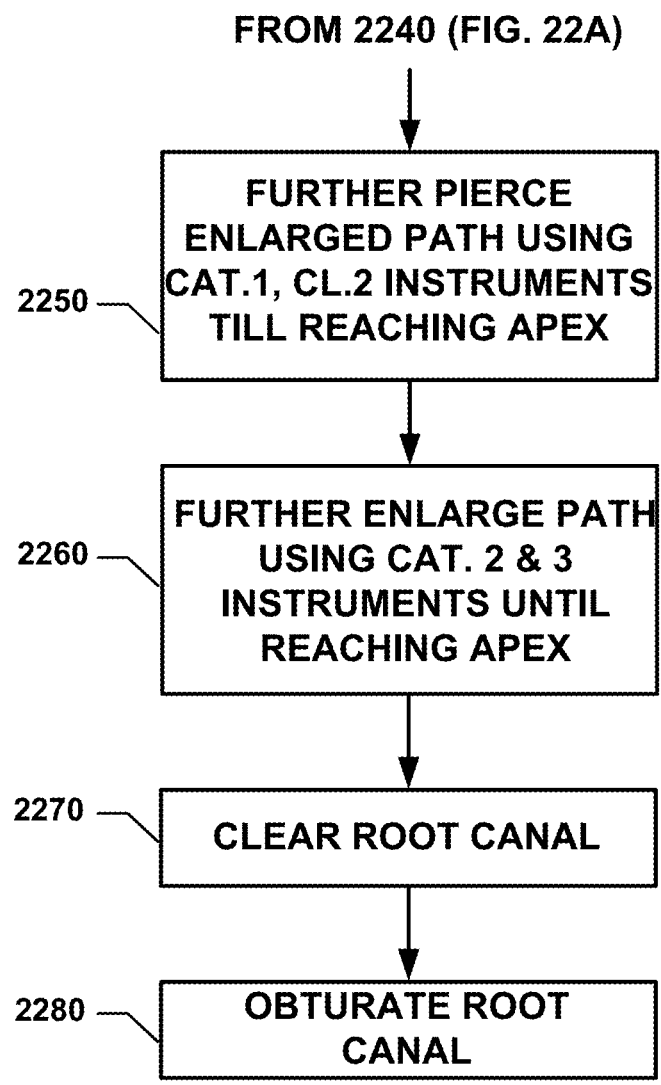

VI—Method of Penetrating Root Obstructions Resulting from a Previous Root Canal Treatment FIGS. 17A and 17B illustrate an exemplary tooth 1700 having a root canal 1712 that is blocked or obstructed by, for example a residual, hardened paste 1710 from a previous root canal treatment. With further reference to FIGS. 22A and 22B, the treatment method 2200 is performed according to the following steps:

As further illustrated in FIG. 17A, the endodontist opens the root canal 1712 at step 2210 of FIG. 22A using instruments 1720 selected from the $1^{st}$ category, $2^{nd}$ class, starting with file No. 10 with an approximate taper 2%, in order to create an initial path 1733 in the existing residual paste 1710, using an instrument 1725 with a cutting tip, to a depth of approximately 2 mm to 3 mm, using an appropriate softening agent.

At step 2220, the endodontist enlarges the opened initial path 1733 with instruments 1720 selected from the $2^{nd}$ and $3^{rd}$ categories.

At step 2230, the endodontist pierces again the residual paste 1710, through the initial path 1733, using an instrument 1720 selected from the $1^{st}$ category, $2^{nd}$ class, file No. 15, to an additional depth of approximately 2 mm-3 mm.

At step 2240, the endodontist enlarges the width of the initial path 1733 using instruments 1720 selected from the $2^{nd}$ and $3^{rd}$ categories. As described earlier, the smooth surfaces or areas 111 enable the shaft of the instrument 1725 (FIG. 17B) to slide within the paste 1710, to minimize the friction between the instrument 1725, the dental wall, and the paste 1710, to make the instrument 1710 able to pierce more resistant paste 1710, and to further help in the advancement of the instrument 1725 in the direction of the apex 1750.

Figure 17C:
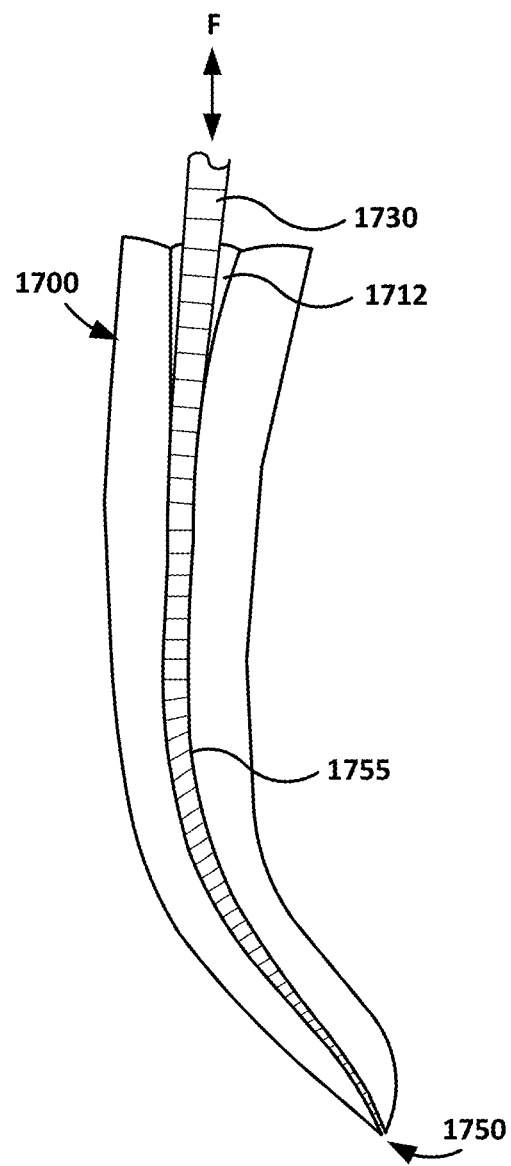

With further reference to FIG. 17C, and to step 2250 of FIG. 22B, the endodontist pierces again the widened initial path 1733 using an instrument 1730 selected from the $1^{st}$ category, $2^{nd}$ class, file No. 15, with a possible recourse to file No. 10 of the $1^{st}$ category, $2^{nd}$ class, until the apex 1750 is reached.

At step 2260, the endodontist enlarges the opened path 1755 with instruments selected from the $2^{nd}$ and $3^{rd}$ categories in preparation for the obturation step.

In the event an unexpected obstruction is faced inside the resistant paste, the aforementioned steps of process 2200 will be used depending on the nature of the encountered obstruction, i.e. fractured instrument, hypercalcification, curved root canal or shoulder.

It should be clear that if the obstruction within the root canal includes a resistant, residual paste 1710, the process 2000 described earlier in connection with FIGS. 20A, 20B relating to the piercing of the hypercalcification, can be used, in the same sequence from step 2030 through step 2070.

As illustrated at step 2270 and also in FIG. 14E, upon completion of step 2260 as described earlier, the endodontist clears the widened root canal of any debris, as is known in the field, in preparation for the final obturation step.

As illustrated at step 2280 and also in FIG. 14F, the endodontist obturates the root canal with the appropriate filling material 1446, as is known in the field.

It is worth noting that the root canal is irrigated with sodium hypochloride and EDTA (Ethylenediaminetetraacetic acid) at each relevant step of process 1900.

The following X-Rays (FIGS. 27A, 27B, 27C, 33A, 33B, 33C, 33D, 37A, 37B, 38A, 38B) provide supporting illustrations of this novel process 2200:

FIG. 27A shows three broken files with resistant paste in tooth no. 35 blocking the totality of the root canal. FIG. 27B shows the bypassing of the three broken files and the piercing of the resistant paste with the new instrument reaching the apex, according to the present invention. FIG. 27C shows the fully hermetic obturation of the root canal.

FIG. 33A shows an incomplete root treatment of tooth no. 35 due to hypercalcification blocking the third apical of the root canal. FIGS. 33B, 33C, and 33D show the piercing of the old resistant paste and progressively piercing the hypercalcification with the new instrument reaching the apex, according to the present invention.

FIG. 37A shows a blockage in the mesial canal of tooth no. 16 due to a shoulder and a resistant paste. FIG. 37B shows the elimination of the shoulder and the piercing of the resistant paste with the new instrument reaching the apex, according to the present invention.

Figure 38A:
Figure 38B:

FIG. 38A shows a false canal and a resistant paste in tooth no. 37. FIG. 38B shows the avoidance of the false canal and the piercing of the resistant paste with the new instrument reaching the apex, according to the present invention.

It is to be understood that the specific embodiments of the invention that have been described are merely illustrative of certain application of the principle of the present invention. Numerous modifications may be made to the present instruments and methods described herein without departing from the spirit and scope of the present invention.

What is claimed is:

1. A file for root canal treatment comprising:
a tapered shank for debriding a root canal;
wherein the shank includes a lateral surface along an axial length of the shank;
wherein the shank includes, along the lateral surface, a plurality of cylindro-conical sections that are inter-spaced with a plurality of spiral sections;
wherein the plurality of cylindro-conical sections are configured to debride a dentine wall of the root canal by:
1) Shaping an unobstructed path in the root canal,
2) bypassing an obstacle if present within the root canal, and
3) concurrently removing debridement debris from the dentine wall of the root canal;
wherein the plurality of spiral sections are disposed in inter-spaced succession of the plurality of cylindro-conical sections for further debriding the root canal by further shaping the dentine wall of the root canal that has already been debrided by the plurality of cylindro-conical sections;
wherein the plurality of cylindro-conical sections have a generally circular cross-section relative to the axial length of the shank, and include a plurality of striated grooves, and wherein each of said plurality of striated grooves includes at least one cutting edge;
wherein the generally circular cross-section of the plurality of cylindro-conical sections eliminate the use of acute angles or corners to avoid striking the dentine wall of the root canal and further provide the ability to resist torsion fatigue, or to preserve a circular dental canal anatomy, in order to attain a hermetical obturation of the root canal and to reduce risk of file breakage;
wherein the said at least one cutting edge of said each of the plurality of striated grooves are flush with the lateral surface of the shank for debriding the dentine wall by shaping the dentine wall of the root canal and allowing the plurality of striated grooves to collect debris resulting from the plurality of striated grooves shaping the dentine wall of the root canal.

2. The file according to claim 1, wherein the shank terminates in a conical, beveled or non-beveled cutting tip or a conical, beveled or non-beveled non-cutting tip.

3. The file according to claim 1, wherein the plurality of striated grooves include any one or more of: horizontal grooves, vertical grooves, or transversal grooves relative to the axial length of the shank.

4. The file according to claim 1, wherein the file is any one of: a hand operated instrument or an electrically operated instrument.

5. The file according to claim 4, wherein the shank has a taper that ranges between approximately 2% to 10%, and a length that ranges from 12 mm to 32 mm.

6. The file according to claim 5, wherein the shank is made from stainless steel with diameter numbers ranging from 10 to 20.

7. The file according to claim 5, wherein, for use with hand operated instrument, the shank is made from NiTi with diameter numbers ranging from 20 to 40.

8. The file according to claim 5, wherein, for use with an electrically operated instrument, the shank is made from NiTi with diameter numbers ranging from 10 to 40.

9. The file according to claim 1, wherein in at least some of said plurality of striated grooves, the at least one cutting edge includes two cutting edges.

10. The file according to claim 1, wherein the shank includes a tip that directly extends into a first cylindro-conical section of the plurality of cylindro-conical sections; and wherein the first cylindro-conical section directly extends into a first spiral section of the plurality of spiral sections.

11. The file according to claim 1, wherein the plurality of striated grooves are separated by smooth areas on the lateral surface of the shank.

12. The file according to claim 1, wherein the plurality of cylindro-conical sections is sandblasted.

13. The file according to claim 1, wherein the plurality of spiral sections is sandblasted.

14. The file according to claim 1, wherein the lateral surface of the shank is sandblasted.

15. The file according to claim 1, wherein the shank includes a tip that directly extends into a first spiral section of said plurality of spiral sections; the tip is configured to clean, debride, shape, probe, catheterize, and/or penetrate the root canal; wherein the first spiral section directly extends into a first cylindro-conical section of said plurality of cylindro-conical sections.

16. The file according to claim 15, wherein the tip is a conical cutting tip or a conical non-cutting tip.

17. The file according to claim 15, wherein the plurality of striated grooves include any one or more of: horizontal grooves, vertical grooves, or transversal grooves relative to the axial length of the shank.

18. The file according to claim 15, wherein the file is any one of: a hand operated instrument or an electrically operated instrument.

19. The file according to claim 18, wherein the shank is made from any one of: stainless steel with a diameter number ranging from 10 to 20; NiTi with a diameter number ranging from 20 to 40 for the hand operated instrument; or NiTi with a diameter number ranging from 10 to 40 for the electrically operated instrument; and wherein the shank has a taper that ranges between approximately 2% to 10%, and a length that ranges from approximately 12 mm to 32 mm.

* * * * *